US011333755B2

(12) United States Patent
Raillon

(10) Patent No.: US 11,333,755 B2
(45) Date of Patent: May 17, 2022

(54) OPTIMISED ACOUSTIC DETECTION SYSTEM FOR DETECTING VARIOUS UNDERWATER THREATS IN A SENSITIVE ZONE

(71) Applicant: THALES, Courbevoie (FR)

(72) Inventor: Louis Raillon, Sophia Antipolis (FR)

(73) Assignee: THALES, Courbevoie (FR)

( * ) Notice: Subject to any disclaimer, the term of this patent is extended or adjusted under 35 U.S.C. 154(b) by 389 days.

(21) Appl. No.: 16/472,016

(22) PCT Filed: Dec. 20, 2017

(86) PCT No.: PCT/EP2017/083828
§ 371 (c)(1),
(2) Date: Jun. 20, 2019

(87) PCT Pub. No.: WO2018/115127
PCT Pub. Date: Jun. 28, 2018

(65) Prior Publication Data
US 2020/0096632 A1 Mar. 26, 2020

(30) Foreign Application Priority Data
Dec. 20, 2016 (FR) ...................................... 1601810

(51) Int. Cl.
*G01S 15/00* (2020.01)
*G01S 15/42* (2006.01)
*G01S 7/539* (2006.01)

(52) U.S. Cl.
CPC ............ *G01S 15/003* (2013.01); *G01S 7/539* (2013.01); *G01S 15/42* (2013.01)

(58) Field of Classification Search
CPC ......... G01S 15/003; G01S 7/539; G01S 15/42
See application file for complete search history.

(56) References Cited

U.S. PATENT DOCUMENTS 7,457,198 B2 11/2008 Stein et al.
10,379,218 B1 * 8/2019 Spiesberger ............ G01S 15/58
(Continued)

FOREIGN PATENT DOCUMENTS

| AU | 2017384508 A1 * | 8/2019 | ........... G01S 15/003 |
| AU | 2017384510 A1 * | 8/2019 | ............. G01S 7/539 |

(Continued)

OTHER PUBLICATIONS

Translation of EP-1356450-B1 (Year: 2019).*
(Continued)

*Primary Examiner* — Daniel Pihulic
(74) *Attorney, Agent, or Firm* — BakerHostetler

(57) ABSTRACT

An acoustic detection system for detecting at least partly submerged targets in a sensitive area defined with respect to an infrastructure, the detection system includes at least one multistatic detection group, each multistatic detection group defining a detection area, and comprising: a submerged transmitter emitting at low frequencies; a plurality of submerged receivers comprising at least two receivers, each receiver of a given group forming, with the transmitter of the group, a bistatic pair, each bistatic pair generating an elementary detection area surrounding a blind zone, the detection area of the group being formed by all of the elementary detection areas of the receivers of the group, the receivers being arranged in at least one layer. For at least one group of the system, the form described by the receivers of at least one layer of the group is an at least partly circular form of given radius, the inter-receiver distance between two adjacent receivers of the layer depending on the distance between the transmitter of the group and the rectilinear segment linking the adjacent receivers of the layer, called reference transmitter-receiver distance.

15 Claims, 24 Drawing Sheets

(56) References Cited

U.S. PATENT DOCUMENTS

| | | | |
|---|---|---|---|
| 2008/0056069 A1* | 3/2008 | Doisy | G01V 1/006 367/138 |
| 2011/0007606 A1 | 1/2011 | Curtis | |
| 2019/0331792 A1* | 10/2019 | Raillon | G01S 15/42 |
| 2020/0096632 A1* | 3/2020 | Raillon | G01S 15/42 |

FOREIGN PATENT DOCUMENTS

| | | | | |
|---|---|---|---|---|
| CA | 3047824 A1 | * | 6/2018 | G01S 15/42 |
| CA | 3047825 A1 | * | 6/2018 | G01S 15/003 |
| EP | 1356450 B1 | * | 11/2006 | G10K 11/008 |
| EP | 3559696 A1 | * | 10/2019 | G01S 15/04 |
| EP | 3559697 A1 | * | 10/2019 | G01S 15/42 |
| FR | 3060762 B1 | * | 6/2020 | G01S 7/539 |
| FR | 3060761 B1 | * | 10/2020 | G01S 15/42 |
| GB | 2 240 847 A | | 8/1991 | |
| JP | 2004184268 A | * | 7/2004 | |
| JP | 2011038993 A | * | 2/2011 | |
| KR | 20150069910 A | | 6/2015 | |
| WO | WO-2016141915 A1 | * | 9/2016 | G10K 11/006 |
| WO | WO-2018115125 A1 | * | 6/2018 | G01S 15/003 |
| WO | WO-2018115127 A1 | * | 6/2018 | G01S 7/539 |

OTHER PUBLICATIONS

Erdinc, et al., "Multistatic Sensor Placement: A Tracking Approach", 2006 9th International Conference on Information Fusion, Jul. 1, 2006.

Kim, et al., "Performance comparison of target localization for active sonar systems", IEEE Transactions on Aerospace and Electronic Systems , vol. 44, Issue: 4, pp. 1371-1380, Oct. 1, 2008.

* cited by examiner

OPTIMISED ACOUSTIC DETECTION SYSTEM FOR DETECTING VARIOUS UNDERWATER THREATS IN A SENSITIVE ZONE

CROSS-REFERENCE TO RELATED APPLICATIONS

This application is a National Stage of International patent application PCT/EP2017/083828, filed on Dec. 20, 2017, which claims priority to foreign French patent application No. FR 1601810, filed on Dec. 20, 2016, the disclosures of which are incorporated by reference in their entirety.

FIELD OF THE INVENTION

The invention relates generally to acoustic detection systems, and in particular to an acoustic detection system for detecting various threatening targets, penetrating into a sensitive area defined with respect to an infrastructure to be protected.

BACKGROUND

Certain infrastructures that are accessible underwater may be exposed to various types of threat, such as underwater threats with or without divers, which are potentially propelled with a range capability and at a high speed. Such threats may for example deposit an explosive charge on the infrastructure. Examples of sensitive infrastructures comprise:
- infrastructures opening out onto a wide entrance of a military or civilian port, of a refinery or any other high-value coastal installation able to be threatened by a seaborne threat;
- offshore oil platforms;
- surface ship that remain stationary or mobile in an area, and having a low-frequency acoustic transmission capability.

Specific underwater surveillance devices are generally used to protect underwater access to such sensitive infrastructures.

For example, DDS (acronym for "diver detection sonar") systems may be used to acoustically detect threatening divers.

Modern anti-diver surveillance systems are typically based on monostatic high-frequency sonars. In general, such systems comprise one transmitter for each receiver, the collocated monostatic transmitter-receiver assembly detecting over a sector or better still over a circle of radius R equal to the monostatic range. For conventional DDS monostatic sonars, which are used to detect divers over several hundred meters, the duration of the pulse is generally less than 100 msec (milliseconds), thereby limiting the processing gain of such sonars. Moreover, such sonars are subject to absorption losses due to high operating frequencies. In practice, it is extremely difficult to use a plurality of "chained" anti-diver monostatic sonars because, if it is necessary to provide sonars that are close enough to one another in order to detect, each transmitter disrupts the neighboring receiver situated at a close distance, which would by contrast require the transmitters to be spaced. To solve this constraint, the result may be:
a reduction in the maximum possible transmission rate and therefore in the flow of information about the threat, and/or a reduction in the available band, each transmitter having to use a band different from its close neighbors, the band reduction creating a notable reduction in range within a range area that is more often than not limited by reverberation, especially for threats with a very low target index, such as divers.

Current detection systems do not make it possible to detect, with sufficient prior warning, a fast target (a "fast" target with traction assistance conventionally has a speed of approximately 2 to 3 knots, whereas a "slow" target without traction assistance conventionally has a speed of approximately 1 knot), at distances that are far enough away from the infrastructure to allow preventive actions (alarms, target interception, etc.) to be implemented before the threat reaches the infrastructure. For example, due to absorption at high frequency, it is not currently possible to detect threatening divers three times further away who are traveling three times faster (3 knots versus 1 knot) and who are equipped with a small traction device, who have both low noise in passive mode and a low target index in active mode.

SUMMARY OF THE INVENTION

The invention aims to improve the situation. To this end, it proposes an acoustic detection system for detecting at least partly submerged targets in a sensitive area defined with respect to an infrastructure, the detection system comprising at least one multistatic detection group. Each multistatic detection group defines a detection area, and comprises:
A submerged transmitter emitting at low frequencies;
A plurality of submerged receivers comprising at least two receivers, each receiver of a given group forming, with the transmitter of the group, a bistatic pair, each bistatic pair generating an elementary detection area surrounding a shaded area, the detection area of the group being formed by all of the elementary detection areas of the receivers of the group, said receivers being arranged in at least one layer.

The blind zone around each receiver in a given detection group may be at least partly covered by the elementary detection areas of the two neighboring receivers of the detection system.

Advantageously, for at least one group of the system, the form described by the receivers of at least one layer of the group is an at least partly circular form of given radius R, the inter-receiver distance $2a$ between two adjacent receivers of the layer depending on the distance D between the transmitter of the group and the rectilinear segment linking said adjacent receivers of the layer, called reference transmitter-receiver distance.

In another embodiment, the at least partly circular form described by at least one layer of receivers formed of at least two receivers may be centered substantially on the transmitter, the receivers of the layer having at least one axis of symmetry passing through the transmitter.

In particular, the product $R \cdot d_{inter}$ of the inter-receiver distance $d_{inter}$ between two adjacent receivers of the layer and the radius R of the form described by the receivers of the layer may be greater than or equal to the square $R_{mono}^2$ of the detection radius $R_{mono}$ of the equivalent monostatic sonar, for a target of minimum given index:

$$R_{mono}^2 \leq R \cdot d_{inter}$$

The limit $R_{mono}^2$ corresponds to the limit below which there is no longer any significant gain on the overall area of coverage or the coverage of the shaded areas.

In one embodiment, the inter-receiver distance $d_{inter}$ between two adjacent receivers of the layer by the radius R of the form described by the receivers of said layer may be less than or equal to double the square of the detection radius $R_{mono}$ of the equivalent monostatic sonar $2 \cdot R_{mono}^2$ divided by the distance D from the transmitter to the segment formed by these two receivers, for a target of minimum given index:

$$d_{inter} \leq 2 \cdot R_{mono}^2 / D$$

This condition makes it possible to improve the protection by preventing a threat from being able to penetrate not only into the circle formed by the receivers but also pass through the segments linking two adjacent receivers without being detected. In one embodiment, the detection system comprises at least one group, the receivers of the layer of the group, of at least partly circular form, being arranged on a circle of radius R equal to the detection radius $R_{mono}$ of an equivalent monostatic sonar, for a target of minimum given index, the layer of the group comprising 6 receivers forming a regular hexagon with a side equal to the radius of the circle, the maximum multistatic range from the transmitter being equal to the product of the radius of the circle R and the golden ratio. For any target having the minimum given index and situated inside this circle, the target may be detected by at least two receivers.

In one embodiment, each receiver is configured so as to receive signals in a frequency band lower than 30 kHz.

In some embodiments, the detection system may comprise at least two groups, the elementary detection areas of at least some of the end receivers of a given detection group at least partly overlapping with the end receivers of an adjacent detection group.

The detection system may comprise at least one shared common receiver belonging simultaneously to at least two adjacent groups.

In one embodiment, the detection system may comprise at least one sensor chosen from among the group consisting of a magnetic sensor, an acoustic sensor, a non-acoustic sensor, and in that it comprises a classification unit configured so as to use information derived from the signals of the sensor or sensors to classify the target.

In particular, the signals of at least some of the receivers may be used by the classification unit to classify the detected targets, each receiver being configured so as to operate at least acoustically simultaneously in passive and active mode, each receiver in passive mode processing frequencies lower than the frequencies processed in active mode, a passive acoustic classification being performed by slaving the active tracking, the acoustic or non-acoustic classification range being at least equal to half the maximum distance between two neighboring receivers, so as to perform classification at least when the target passes between them.

In one embodiment, the detection system may comprise at least one group having at least two layers of receivers, the receiver layers being arranged at different reference transmitter-receiver distances.

The detection system may comprise layers of receivers that are linear or at least partly circular and concentric, the linear layers comprising receivers aligned substantially in a line, some receivers being shared between two groups.

In the embodiments in which the center of the circles described by the concentric layers of a given group coincides substantially with the transmitter, for propagation losses equal to K times the logarithm of the distance of the propagation paths TL, the ratio between the product $d_{inter1} R_1$ of the inter-receiver distance associated with a layer and the radius $R_1$ of this layer and the product $d_{inter2} R_2$ of the inter-receiver distance $d_{inter2}$ associated with another layer and the radius $R_2$ of this other layer may be determined according to the maximum detection index deviation $\Delta(TS)$ of the possible targets:

$$2K \log((d_{inter2} \cdot R_2)/(d_{inter1} \cdot R_1)) = \Delta(TS)$$

In one embodiment, the detection system may comprise at least one multistatic group, the transmitter of the group being a low-frequency transmitter, of hull sonar of a surface ship type, the receivers being positioned around the surface ship and communicating with the surface ship in radio mode.

In one embodiment, the detection system may comprise a group whose transmitter (31) is not omnidirectional. In order to determine the positioning of each receiver RXi, the detection radius of the equivalent monostatic sonar may then be a function of the angle $\theta_i$ denoting the angle of insonification of the transmitter toward the receiver $RX_i$ with respect to the direction of maximum transmission of the transmitter.

The embodiments of the invention thus provide a modular distributed system for the acoustic underwater detection of threats to a sensitive infrastructure: they make it possible to geographically distribute various interacting multistatic detection groups (distributed system);

they make it possible to optimize the number and/or the form of the multistatic detection groups (modularity).

The detection system forms a wide protective barrier suited to all potential threats, depending on the range of predictable conditions of the given environment, regardless of the speed and the size of the threats.

The system according to the embodiments of the invention makes it possible to detect all types of threat, such as for example motorized or non-motorized divers at distances greater than existing systems, but also SDVs (acronym for the expression swimmer delivery vehicle), underwater drones or AUVs (acronym for autonomous underwater vehicles), and even torpedoes or mini submarines/midgets at distances inaccessible to high-frequency systems (in particular greater than 2 km). Although it is not limited to such applications, the invention makes it possible to continuously detect fast threats while at the same time offering a sufficient reaction time to put interventions in place (for example of the order of 10 minutes for a reaction with in-situ human intervention or a much shorter time for a remotely controlled intervention, in the face of certain threats such as torpedoes or very fast threats).

Other features and advantages of the invention will become apparent with the aid of the following description and the figures of the appended drawings, in which:

DETAILED DESCRIPTION

According to some embodiments according to the invention, what is proposed is an acoustic detection system (also called a "surveillance system" below) configured so as to detect at least partly submerged targets in a sensitive area defined with respect to an infrastructure, the detection system comprising at least one multistatic detection group, each multistatic detection group defining a detection area, and comprising:

a submerged transmitter;

a plurality of submerged receivers comprising at least two receivers (RX), each receiver of a given group forming, with the transmitter (TX) of the group, a bistatic pair {TX, RX}.

Each bistatic pair {TX, RX} generates an elementary detection area (320) surrounding a blind zone, the detection area of the group being formed by all of the elementary detection areas of the receivers of the group.

In some embodiments, the blind zone (also called "blind area" or "area of non-detection") of each receiver in a given detection group is at least partly covered by the elementary detection areas of the neighbouring receivers of the detection system, the neighbouring receivers being able to be receivers of the same group or of a neighbouring group.

The "blind zone" of a given bistatic pair corresponds to an area of non-detection, but is surrounded by the detection area of the transmitter/receiver bistatic pair under consideration.

The receivers of each group may be arranged in at least one layer.

In one embodiment, for at least one group of the detection system, the receivers of at least one layer of the group describe a linear form, the receivers of the reference pair being symmetrical about an axis of symmetry passing through the transmitter. The position of the receivers may be determined iteratively, the position of a given receiver depending on the position of the previous receiver situated between the given receiver and the axis of symmetry.

In another embodiment, for at least one group of the system, the form described by the receivers of at least one layer of the group is an at least partly circular form of given radius R, the inter-receiver distance between two adjacent receivers of the layer depending on the distance D between the transmitter of the group and the rectilinear segment linking the adjacent receivers of the layer, called "reference transmitter-receiver distance". The at least partly circular form may be centered substantially on the transmitter 31 of the group or at another point.

It should be noted that, even though they are described together below, some features of the invention may exhibit advantages when they are considered separately.

Figure 1:
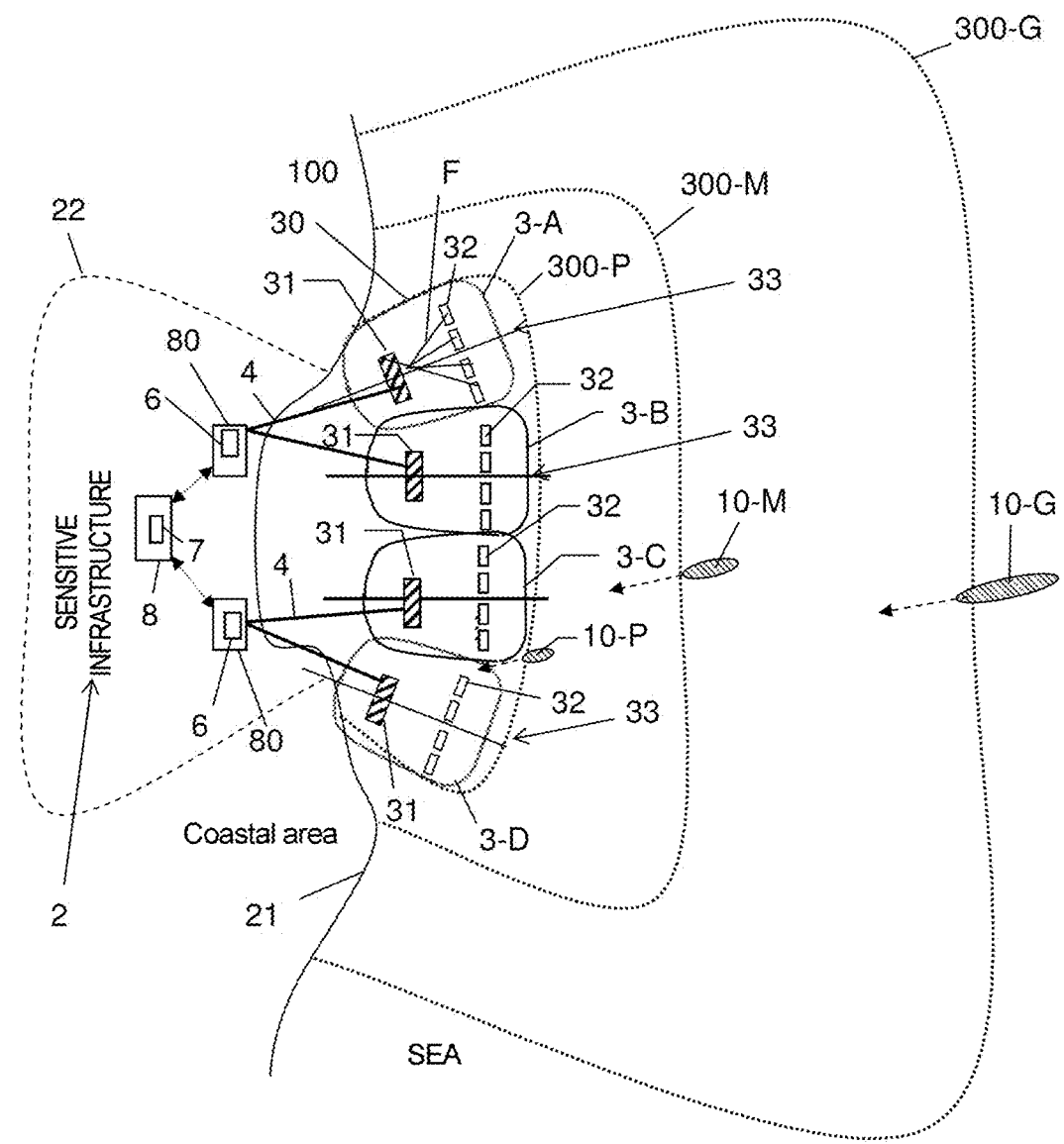
FIG. 1 schematically shows an acoustic detection system according to some embodiments.

FIG. 1 schematically shows an acoustic detection system 100 for detecting a submerged target 10 (also called "threat" below) in a sensitive area defined with respect to an infrastructure 2 (also called "sensitive infrastructure" below). The infrastructure 2 may be any type of civilian or military, industrial or tourist infrastructure accessible by water, that is to say any infrastructure 2 situated near a submerged area able to be used by a threat to access the infrastructure or be directed against the infrastructure or against the people located on the infrastructure. The sensitive area associated with the infrastructure may thus comprise part of the area situated upstream of or around the infrastructure. The term "infrastructure" as used here is not limited to a building, but incorporates any sensitive land area (for example an oil platform, a military or civilian port, a high-value asset, etc.). The sensitive infrastructure 2 may be:

defined partly or fully by a marine boundary 21 (for example partly or fully for an island or fully for a platform), or by a coastal area and a land border 22, which may be monitored by various land means, such as physical barriers forming a fence.

The detection system 100 may be used as a surveillance system in some applications of the invention.

The target 10 may have any size and any speed. The target 10 may be for example a propelled underwater threat, such as a propelled diver, a drone, etc. The target 10 may have a large size and/or a high speed and have a significant payload capacity. The acoustic detection system 100 according to the invention makes it possible to detect such threats far upstream of the infrastructure 2, thus offering a sufficient reaction time to neutralize the threat before it reaches the infrastructure and/or trigger alerts.

According to one aspect of the invention, the system 100 (also called "multistatic system" below) comprises at least one multistatic detection group 3, each multistatic detection group 3 defining a detection area 30. The barrier length of the detection area 30 of the multistatic detection group 3 along the receivers 32 may depend on the number and/or on the spacing between the receivers 32. The detection area 30 of the multistatic detection group 3 may also have a range with respect to the coast 21 to be protected (land/water border) that depends on the threat to be detected. It should be noted that the depiction of the detection areas 30 and 300 in FIG. 1 is schematic.

All of the detection groups 3 jointly form a detection area 300, the extent of which depends on the type of threat. For example, as shown in FIG. 1:

detection area 300-P for a small diver threat, which is typically slow;

detection area 300-M for a threat of a diver equipped with traction assistance or a medium-sized propulsion device or else a drone threat;

detection area 300-G for a threat of a large underwater device (possibly having a speed higher than the speed of the previous threats).

The multistatic system 100 according to some embodiments may make it possible to achieve:

a range, defined by the limit of the detection area 300-P with respect to the transmitter 31, that is greater than the reference range of a conventional DDS sonar of comparable power for a diver having a typical speed of 1 knot, a range, defined by the limit of the detection area 300-M with respect to the transmitter 31, that is at least 2 to 3 times greater than the reference range of a conventional DDS sonar for a device traveling at a typical speed of up to 3 knots, a range, defined by the limit of the detection area 300-G with respect to the transmitter 31, that is at least 5 to 10 times greater than the reference range of a conventional DDS sonar for a large device able to travel at up to 5 knots or more.

The range increase may thus be virtually proportional to the speed of the typical threats, thereby allowing a virtually constant reaction time before the threat reaches the infrastructure to be protected.

Although it is not limited to such embodiments, the remainder of the description will be given primarily with reference to a diver threat (the detection area 300 then corresponding to the area 300-P), this threat corresponding to the worst one of the threats and determining the size of the detection system.

The detection system may comprise one or more multistatic groups 3. In the example of FIG. 1, the system 100 comprises 4 multistatic groups:

two groups 3-B and 3-C at the center of the system; and two end detection groups 3-A and 3-D adjacent to the two central groups (i.e. situated on either side of the central group).

The line formed by the receivers 32 of the central groups 3-B and 3-C might not be parallel to the coast, in particular at the ends of the line of receivers 32. The lines formed by the two end groups 3-A and 3-D may be inclined toward the infrastructure 2, at their free ends. The multistatic groups 3 may thus surround the part situated upstream of the infrastructure to be protected (strip of coast for example) while forming a tight barrier at a sufficient distance to allow time to react against the threat.

Figure 2:
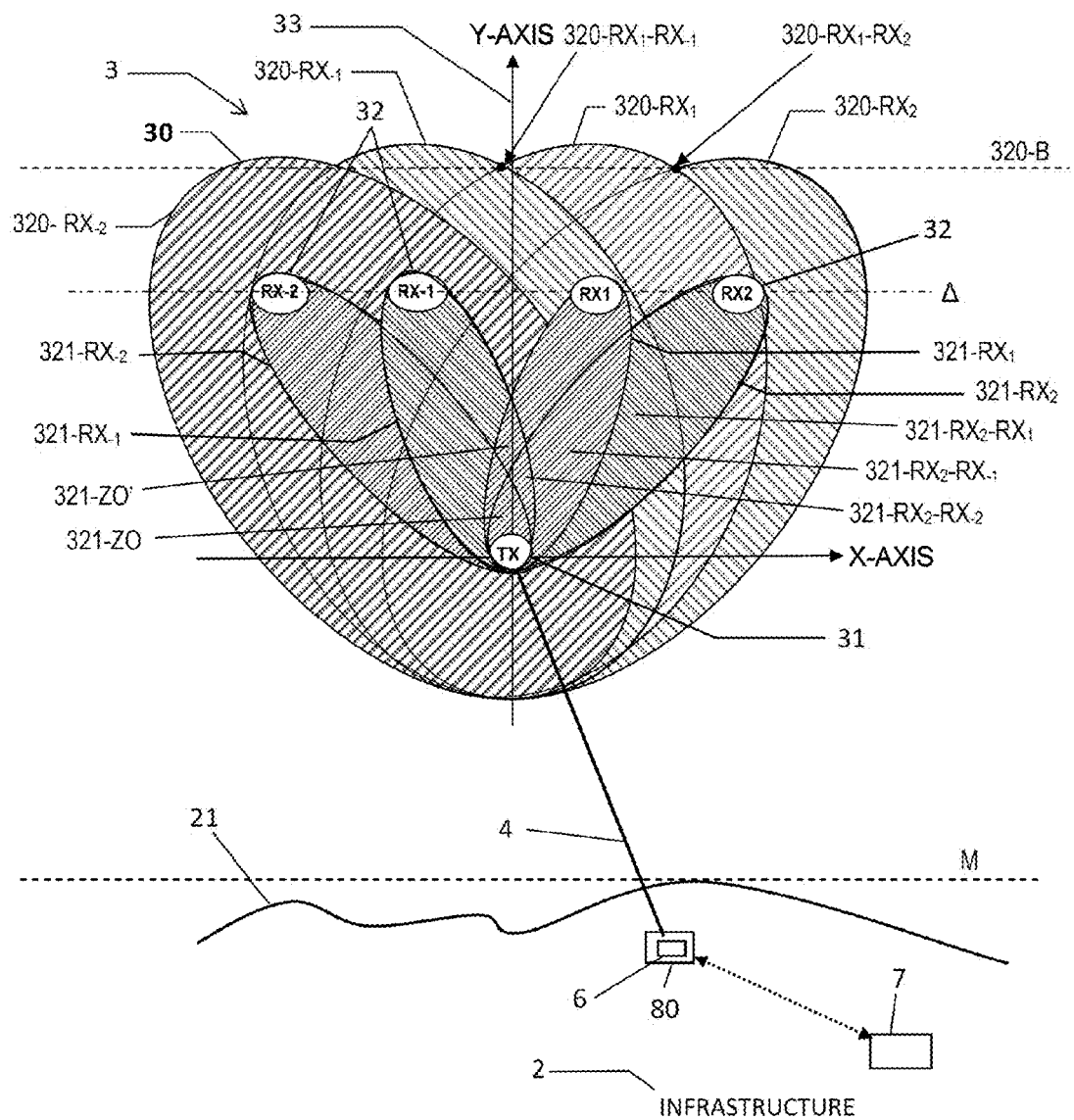
FIG. 2 shows various detection areas of a multistatic detection group with 4 receivers, according to some embodiments.

FIG. 2 shows a multistatic detection group according to some embodiments. As shown in FIG. 2, each multistatic detection group 3 may comprise:

a submerged transmitter 31 transmitting at low frequencies;

a plurality of submerged receivers 32 comprising at least two receivers.

In some embodiments, the transmitter 31 may be arranged between the sensitive infrastructure 2 and the receivers 32. In other embodiments, the detection system may comprise at least one group having at least two layers of receivers 32, at least one of the layers of receivers being arranged between the coast 21 and the transmitter 31.

Each receiver 32 (RX) of a given group 3 forms, with the transmitter 31 (TX) of the group, a bistatic pair {TX, RX}. Each bistatic pair {TX, RX} generates an elementary detection area 320 surrounding a blind zone 321.

The detection area 30 of each multistatic group 3 is thus formed by all of the elementary detection areas 320 of the receivers 32 contained in the group 3.

The term "submerged" as used here denotes an element (transmitter, receiver, target, etc.) at least partly submerged in water, such as for example in a marine environment (the element under consideration possibly being underwater or on the surface).

As shown in FIG. 2, each group 3 comprises at least one layer of receivers 32 ($RX_1$, $RX_2$, $RX_{-1}$, $RX_{-2}$) arranged in a particular form.

The form described by the receivers of all of the multistatic detection groups may be a multilinear form (piecewise linear). In particular, the form described by the receivers 32 of one and the same multistatic group may be a linear form comprising linear portions or may include at least one curve, the group comprising at least two receivers $RX_{-1}$ and $RX_1$, called "reference receivers" (and forming a pair of receivers called "reference pair"), which are symmetrical with one another about an axis of symmetry 33 (coincident with the Y-axis in FIG. 2) passing through the transmitter 31.

In the example of FIG. 2, the layer of receivers is of linear form and all of the receivers 32 of the linear layer of receivers are symmetrical about the axis of symmetry 33 (in other words the layer has an axis of symmetry about this axis 33).

In the remainder of the description in relation to linear configurations of layers, reference will primarily be made to linear layers having symmetry about this axis 33 (i.e. all of the receivers of the linear layers being symmetrical about the axis 33), by way of non-limiting example.

The relative distances between the receivers 32 may be chosen such that the detection area 30 of each multistatic group 3 detects the threat that is the most difficult to detect.

Each receiver 32 may comprise a multi-sensor antenna configured so as to reject, through adaptive processing, the transmission coming locally from the transmitter 31, and the close reverberation surrounding it, so as to receive the reception of the echo. In some embodiments, the antenna may comprise an additional processing capability called "RX as TX" (indicating that the reception RX of the echo may take place at the same time as the reception, on RX, of the transmission TX).

For very slow threats, such as divers that are conventionally difficult to detect using Doppler, and in the event of limitation through reverberation, in some embodiments, the receivers 32 may advantageously be far from the transmitter 31. Specifically, for a threat 10 at a constant distance from a receiver 32, the level of the echo drops with the transmitter/receiver distance. However, the disruption caused by the reverberation also drops, this tending to compensate the detection capability (signal to noise), as long as ambient noise is not limiting.

In the remainder of the description and notably for the formulae in relation to the positioning of the receivers 32, it will therefore be considered that the positioning of the receivers 32 with respect to the transmitter 31 of the group is sufficient for the reverberation to have become sufficiently low with respect to the ambient noise at the location under consideration and at the processing output. Such a property may be achieved for example by choosing an transmitter 31 that is adjusted, in terms of horizontal sector, according to the geometry of the site to be protected, at a narrow elevation and in a wide transmission band so as to allow a reverberation lower than the noise at the output of the processing of the transmission codes received by the reception antennas. By optimizing the design (geometric form, number of transducers or sensors, etc.) of the transmitter and/or of the receiver, the positioning of the receivers 32 that guarantees the maximum bistatic range on the most critical threat is with noise limitation.

For threats that are easily detectable using Doppler, in some embodiments, the receivers 32 may advantageously be spaced for as long as the echo from the target that is the most difficult to detect using Doppler emerges sufficiently from the noise.

To form a surveillance system, each group may comprise an transmitter 31 and receivers 32 whose performances are optimized according to certain optimization parameters, such as a high number of sensors of the reception antenna of each receiver 32, allowing a more directive antenna in order to reject noise and reverberation.

In addition, for threats that are detectable using Doppler, these optimization parameters may comprise:
a more powerful transmitter 31; and/or
a longer transmission pulse duration, including up to a pulse duration creating a blind zone ("blanking") at the distance of the target, which is possible by achieving a rejection capability of the direct path of the transmitter 31 by receivers 32 that allow operation in "RX as TX" mode.

Indeed, in the embodiment in which the transmission pulse duration is increased, the duration of the transmission pulse T normally prevents detection over a distance $D_{menace} = cT/2$ ($D_{menace}$ denoting the distance from the threat to the receiver 32 and c denoting the speed of sound in meters per second). It should be noted that, in conventional monostatic implementations, it is impossible to have a very long pulse because the transmitter is collocated with or too close to the receiver in monostatic detectors to be able to receive during transmission. Such long transmission durations T, even greater than 2R/c, where R is the range according to this multistatic, in an embodiment of the invention, make it possible to detect not just fast targets at distances far from the infrastructure, but also small targets that are close in "RX as TX" mode.

The receivers 32 may comprise various types of antenna according to certain application criteria: for example according to whether it is preferable to double the power of the transmitter 31, and/or the number of hydrophones of the N receivers of the group, and/or to increase the duration of the pulse, and/or the processing capability, etc. In one preferred embodiment, the receivers 32 of a group are identical.

Each receiver 32 in the example of FIG. 2 creates an elementary detection area 320 and a blind zone 321 of substantially elliptical form, the blind zone of a given receiver 32 corresponding to the area in which the receiver 32 is not able to detect a target and which is surrounded by the detection area of the receiver.

Advantageously, the blind zone 321 of each receiver 32 in a given detection group 3 is mostly covered by the elementary detection areas 320 of the neighbouring receivers. In the example of FIG. 2, the blind zone 321-$RX_2$ of the receiver $RX_2$ is covered almost completely by:
the elementary detection area 320-$RX_1$ of the neighbouring receiver $RX_1$, although limited by its own blind zone 321-$RX_1$, covers the blind zone 321-$RX_2$ over a large portion 321-$RX_2$-$RX_1$;
the detection area 320-$RX_{-1}$ of the receiver $RX_{-1}$, although limited by its own blind zone 321-$RX_{-1}$, adds coverage to the blind zone 321-$RX_2$ through the area 321-$RX_2$-$RX_{-1}$;
the detection area 320-$RX_{-2}$ of the receiver $RX_{-2}$ furthest from $RX_2$, although limited by its own blind zone 321-$RX_{-2}$, adds more coverage in addition to the two previous ones through the area 321-$RX_2$-$RX_{-2}$.

As a result, all that remains as area of non-detection of the group 3 is the blind zone in the form of a teardrop 321-ZO. The detection area of the group 3 is therefore virtually gap-free within the range limits of the worst threat.

It should be noted that a similar result would be achieved even using: just the two receivers $RX_1$ and $RX_{-1}$, with an area of non-detection 321-ZO corresponding to the larger area 321-ZO'; 6 or more than 6 receivers 32, with a smaller area of non-detection 321-ZO.

The area of non-detection 321-ZO is thus smaller the greater the number of receivers.

The inter-receiver distance (i.e. between two adjacent receivers) of one and the same group 3 may advantageously be irregular so as to form an overlap between the bistatic detection areas of the various receivers, such that the range defined by the detection area 300 of the group 3 makes it possible to always detect the furthest possible distance away.

Using 320-$RX_1$-$RX_{-1}$ to denote the point of overlap furthest from the transmitter 31 between the detection area 320-$RX_1$ and 320-$RX_{-1}$ of the receivers $RX_1$ and $RX_{-1}$, and similarly using 320-$RX_1$-$RX_2$ to denote the point of overlap furthest from the transmitter 31 between 320-$RX_1$ and 320-$RX_2$, the line 320-B passing through these two points of overlap 320-$RX_1$-$RX_{-1}$ and 320-$RX_1$-$RX_2$ defines the line of minimum primo-detection of the multistatic group 3.

The line of primo-detection 320-B determines the maximum time $T_{reac}$ to react against the threat. The maximum time $T_{reac}$ depends on the distance $D_{min}$ (also called safety distance) between the line 320-B and the line M defining the infrastructure, and on the speed $V_{menace}$ of the threat 10. In particular, the threat 10 does not have time to reach the infrastructure 2 if: $D_{min} > (V_{menace}/T_{reac})$. The detection system thus ensures that a threat is not able to cross the line M before it has been processed (application of a reaction means) within the time $T_{reac}$.

This important feature according to the embodiments of the invention makes it possible to form a detection barrier with a thickness that is as constant as possible beyond the line or the curve formed by linking the receivers 32 of the detection group 3.

The detection system may comprise a juxtaposition of one or more multistatic groups 3 whose detection areas at least partly overlap, thereby making it possible to form a barrier around or along the sensitive area to be protected against submerged threats.

The transmitter 31 ("TX") of each multistatic group 3 may have fixed latitude/longitude coordinates, and have a vertical height sufficient to achieve an elevational directivity with a desired narrowness, at an immersion allowing the furthest insonification, for the bathycelerimetry under consideration. The transmitter may be positioned by default on the floor or be positioned at a depth able to be optimized according to gradients of celerity that impacts the propagation. For example, it may be positioned on the seabed offshore from the sensitive area to be protected when the sensitive infrastructure is arranged near or in the sea. When the sensitive infrastructure 2 is a platform in the open sea, the transmitter 31 may be arranged close to the platform, and with adjustable immersion along a mast or by way of a winch. The transmission frequency band is chosen according to the application. In some embodiments, the transmission frequency range may advantageously be less than 30 kHz.

Advantageously, the transmitter 31 may be configured so as to insonify at least the overall surface area of the entire group 3.

The receivers 32 ("RX") may be installed in various ways depending on the environment. For example, they may be arranged at a fixed horizontal position, and positioned on the seabed, offshore from the sensitive area to be protected, generally situated further offshore than the transmitter 31.

The distance between the transmitter 31 of each group and the sensitive area to be protected 2 may be chosen so as to allow a power supply from a power source 6 and a transmission of data between the elements of a group (31, 32) and a device 7 for processing and using the detection system 100.

The system may comprise one or more power sources 6 situated in power supply machine rooms 80 (shelters). Power may be supplied for example by way of a cable 4 connecting the transmitter 31 to the power source 6 for power supply purposes. A machine room 80 may be provided in order to supply power to a transmitter group 31. For example, in the embodiment of FIG. 1, a machine room 80 comprises a power source 6 for supplying power to two transmitters 31 each linked to the common machine room 80 by a cable 4.

Each receiver 32 of a given group 3 may be linked by at least one electro-optical cable passing through the transmitter 31 of the group, the cable being able to be separate or common to all of the receivers 32 of the group. It is thus possible to have a single harness grouping together all of the cables of one and the same group to be protected or buried in the seabed.

The machine rooms 80 may be arranged in the sensitive area. The number of machine rooms 80 and their layout may be chosen so as to optimize the wiring distance (4) with respect to the transmitters 31 of the various groups.

In one embodiment, a portion of the processing of the signals may be performed in these rooms 80, the processing device 7 then merging the data from the various rooms in order to finalize processing.

The machine rooms 80 may transmit the pre-processed data to the processing device 7 through any communication means, for example in secure radio mode or a secure wired network (wiring in the sensitive area).

The data may be transmitted between the elements (31, 32) of the groups 3 and the processing device 7 using a transmission network. In one exemplary embodiment, the transmitter 31 may be situated a few kilometers away from the infrastructure 2 (for example 2 km). In some embodiments, the processing device 7 may be located in a surveillance center for the sensitive area.

Although the example of FIG. 1 shows two machine rooms 80, a person skilled in the art will understand that the invention is not limited to two machine rooms, and may include a different number of rooms depending on the application of the invention.

The part of the electric power source 6 for supplying power to the receivers 32 may be positioned just at the transmitter 31 and distributed. As a variant, the electric power source 6 may be distributed on each receiver (in particular for low consumption). The distributed part of the power source in a given receiver may supply power to a preamplifier with digitization, framing and optical transmission.

It should be noted that in embodiments in which the technology of the sensors is acousto-optic, an optical fiber may be used as a substitution for the electric power supply.

The data may be transmitted between the processing and usage device 7 and the elements of the multistatic groups (transmitters 31, receivers 32) for example:

by optical fiber, the optical fiber having for example a small diameter and being arranged on the seabed, thereby offering the advantage of discrete remote transmission while at the same time offering a very long distance distribution capability (typically greater than 10 km);

by surface radio, thereby allowing autonomy for the receivers 32 over a duration dependent on the battery, which may be rechargeable through an electrical connection to the buoy containing the surface radio block: the receivers 32 may then be jettisoned or replaced quickly using for example a surface carrier or a helicopter, without the constraint of cables.

The detection system 100 according to the embodiments offers numerous advantages over conventional monostatic based systems (both TX and RX). In particular, it requires only a few power cables (power supply cables for the transmitters 31). Furthermore, due to the advantageous distance of the transmitters 31 from the coast in comparison with the monostatic solution with a given maximum range, and the total length of the power supply cables, which are more numerous as they have to supply power to each of the conventional monostatic systems, the total length of the high-power power supply cables (linked to all the transmitters) in the monostatic solution, for one and the same detection surface area, is far greater than the necessary length of the cables for supplying power to the transmitters 31 with respect to the coast, according to some embodiments of the invention.

Moreover, in a conventional monostatic system, two receivers used as a monostatic barrier form beams towards one to another in order to detect a threat crossing the barrier.

A given receiver of the conventional monostatic system is therefore blinded by the transmission from the transmitter of the receiver facing it, which is relatively close. The receivers 32 of the multistatic groups 3 according to the embodiments of the invention do not require a transmission strategy to be provided. They are able to receive the transmissions, neighbouring receivers being not disrupted, regardless of the threat 10. They also do not require to split the available frequency band of the transmitter into sub-bands.

Specifically, in one embodiment of the invention, each receiver 32 may be geometrically at a distance from the transmitter 31 that is sufficient to be capable of operating in an "RX as TX" mode, that is to say to keep the ability to receive a detection of the echo even during the reception of the transmission from the transmitter 31 of its own group 3. It is thus disrupted even less by a transmitter 31 of a neighbouring group, at a generally greater distance.

The temporal transmission strategy between the various transmitters 31 is therefore not restricted, and the transmitters 31 may all optimally use the maximum and common band for a common design, which is an additional advantage in comparison with the conventional multi-monostatic solution.

It should be noted that, if the neighbouring transmissions do not prevent detections within a given group 3, they may introduce ambiguities if the transmitted codes are exactly the same. To rectify such ambiguities, orthogonal transmission codes may be used by the detection system 100.

The detection system 100 according to the invention notably allows decoupling between the chosen distance between the transmitters 31 of neighbouring multistatic groups 3 with respect to the chosen distances between the receivers 32 of a given group, the number of receivers 32 being able to vary. It is thus possible to adjust the transmitter/receiver distances such that the ranges on the most difficult targets to detect are not limited by reverberation, and therefore also that the distances between two transmitters are relatively large. Conventional monostatic implementations do not allow these distances to be adjusted in this way. In some embodiments, the system 100 may comprise at least one multistatic group 3 whose geometric configuration is configured so as to detect the most critical threats passing between:
a receiver 32, situated at one end of the group (each group comprises two end receivers situated on either side of the group), and a receiver of a neighbouring multistatic group (adjacent to the group under consideration);
between any two neighbouring receivers 32 of the group 3 under consideration,
for a duration sufficient to trigger a reliable alert, regardless of the noise conditions able to be contemplated in the area to be protected (even in the most critical conditions).

The directivity of the antennas of the receivers 32 may be more or less effective against noise and/or the level of reverberation on the most critical threat, depending on the detection performance required for a given spacing between two receivers. The inter-receiver distance between the receivers of one and the same group 3 may be chosen so as to optimize the overall cost of the detection system, and/or the complexity of the processing and/or the wiring, by increasing the size of the antenna and/or the number of antennas.

The receivers 32 may be low-consumption acoustic reception antennas allowing good directivity within the reception range of the active mode and/or of the low frequency useful for passive acoustic detection/classification.

The receivers 32 may be arranged in various geometries.

In one embodiment, the detection system may comprise at least one multistatic group 3, the receivers 32 of this multistatic group being arranged in at least one layer, the layers comprising at least one linear layer. The form described by the receivers of such a linear layer of the group is a form substantially defining a line, the inter-receiver distance between two adjacent receivers of the layer depending on the distance D between the transmitter (31) of the group and the line linking the receivers of the layer, called reference transmitter-receiver distance.

In particular, in some embodiments in which the layers of the multistatic groups of the detection system are linear, the receivers of all of the groups 3 of the detection system may be arranged in a substantially linear configuration, at least some of the adjacent groups comprising linear portions that are substantially aligned (for example groups 3-B and 3-C) and/or in a substantially "multilinear" configuration (also called "piecewise linear" configuration), at least some of the groups comprising non-aligned linear portions (for example groups 3-A and 3-B or groups 3-C and 3-D), as illustrated in FIG. 1. In a multilinear configuration, the groups of the detection system 100 comprise at least one linear layer, the receivers 32 of the linear layer being arranged substantially in a line Δ spaced from the transmitter 31 of the group by a given distance, called "reference transmitter/receiver distance" (distance between the transmitter 31 of the group and the point of intersection between the line Δ and the segment passing through the transmitter 31 and perpendicular to the line Δ).

In the embodiments in which one or more groups comprise at least one linear layer, such groups may furthermore comprise other receivers arranged in another form, such as for example receivers arranged in an at least partly circular form.

In the embodiments in which the detection system comprises at least one layer having a piecewise linear or at least partly circular configuration centered substantially on the transmitter, the reference receivers of the layer have at least one axis of symmetry passing through the transmitter on which the distance D may be determined depending on the desired position of the point of overlap of the detection areas of two adjacent receivers that is furthest from the transmitter. This position may be situated either outside the circle or on the circle or on the middle of the segment joining these two receivers. All of these points of overlap form the area of primo-detection in the form of a curved or piecewise linear line, which is often the item of input data of a surveillance problem to be solved.

In FIG. 2, the receivers of one and the same group are arranged in at least one straight line segment on a continuous line Δ (i.e. the line Δ passes through the receivers 32). In a multilinear barrier configuration (i.e. formed of lines of aligned or non-aligned receivers), the number and the arrangement of the receivers 32 per group, the number of multistatic groups, the arrangement of the multistatic groups may be chosen such that the line or lines of receivers Δ extend upstream of the infrastructure (and of the transmitters 31) and on either side thereof (i.e. the line or lines of receivers form linear barriers on either side of the infrastructure 2).

Figure 3:
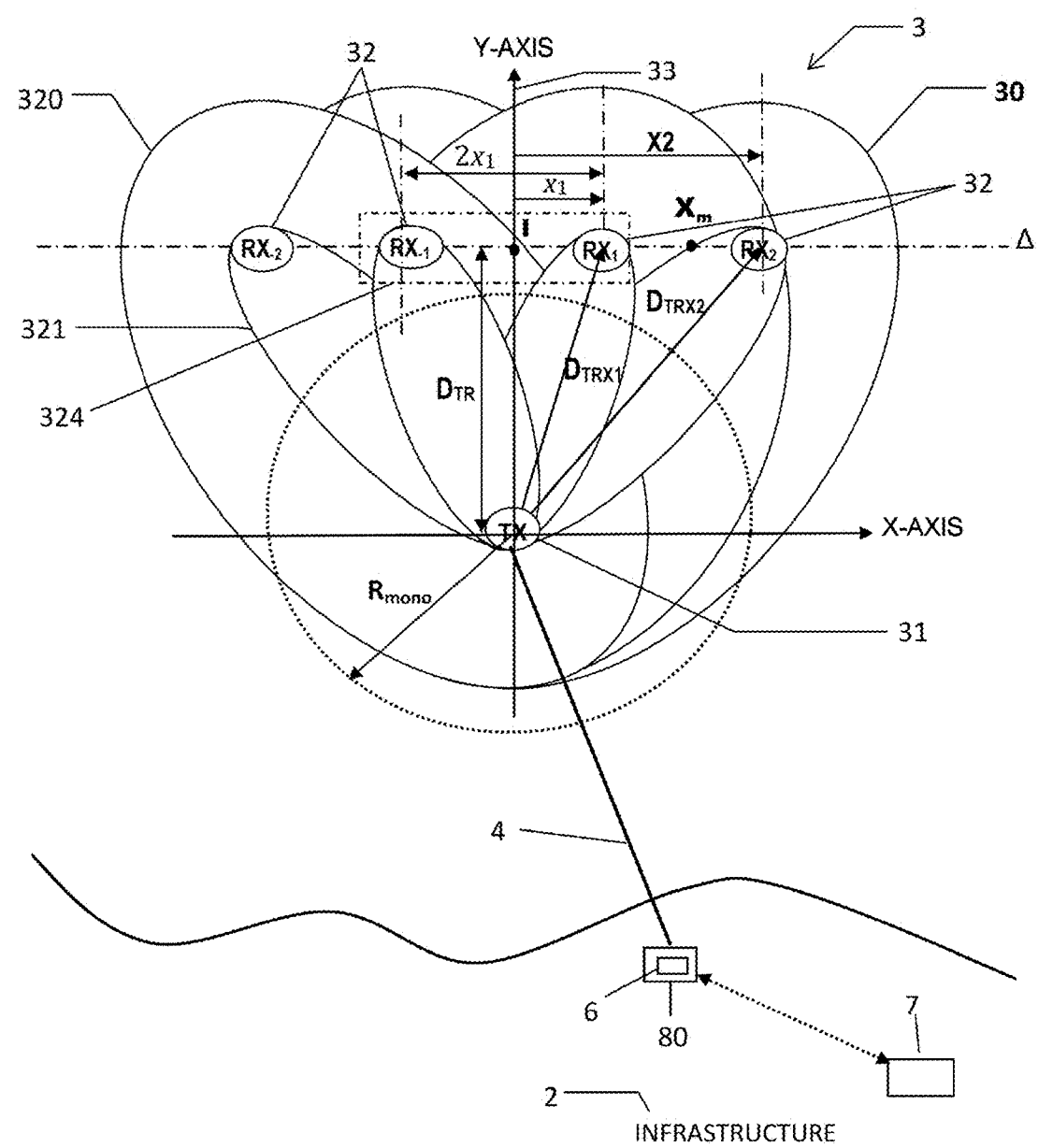
FIG. 3 is a simplified view of the multistatic group with 4 receivers of FIG. 2, according to some embodiments.

FIG. 3 shows a multistatic detection group with 4 receivers, according to some embodiments, positioned with respect to a reference frame (X, Y). FIG. 3 shows the coordinates used to characterize the position of the receivers 32 of the multistatic group 3 arranged in a multilinear configuration with respect to the transmitter 31. The Y-axis coincides with the axis of symmetry 33 of the multistatic group 3 that passes through the transmitter 31, the X-axis being perpendicular to the Y-axis. The reference frame (X, Y) is centered on a point O coinciding with the location of the transmitter. The notation $X_{-i}$ and $X_i$ (or $x_{-1}$ and $x_i$) will be used to denote the abscissae $X_{-i}$ and $X_i$ (respectively $x_{-i}$ and $x_i$) of two receivers $RX_{-i}$ and $RX_i$ that are symmetrical about the axis of symmetry 33 (the absolute value of the abscissa $X_{-i}$ being equal to $X_i$ by symmetry). By convention, the index i associated with a receiver increases as a function of the distance of the receiver 32 from the axis of symmetry 33. The notation $x_i$ (positive abscissa) will thus also denote the distance between each of the two symmetrical receivers $RX_{-i}$ or $RX_i$ and the axis of symmetry 33. The notation $R_i$ (respectively $R_{-i}$) may also be used to denote the geometric position of a receiver $RX_i$ (respectively $RX_{-i}$).

In a multilinear configuration, the distance between the transmitter 31 and the line formed by the receivers 32 of the multistatic detection group 3 is denoted $D_{TR}$ as illustrated in FIG. 3.

In one embodiment, the intra-receiver distance may decrease as the distance of the receivers 32 from the axis of symmetry 33 increases, the distance $2X_1=2a$ between the two receivers $RX_{-1}$ and $RX_1$ closest to the axis of symmetry (called "reference receivers") then being the greatest.

The distance $D_{TRX_i}$ represents the distance between the transmitter TX and the receiver $RX_i$. The circle of radius $R_{mono}$ represents the performance that a monostatic system formed from a receiver collocated with the transmitter TX would have.

In a multilinear configuration of the receivers, the transmitter 31 is configured so as to insonify, as far as possible, a column of water around and as far as possible beyond the barrier segment formed offshore from the group formed by the N receivers 32.

Figure 4:
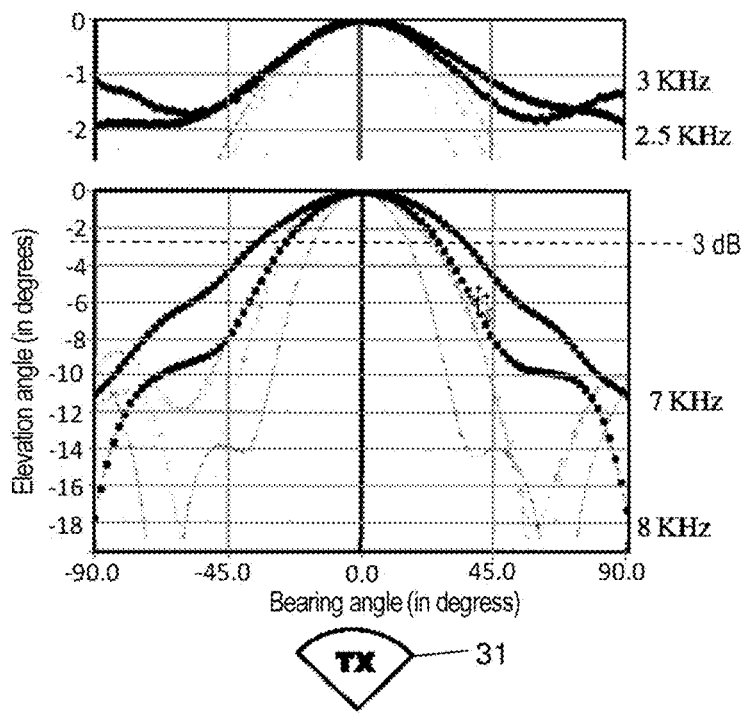
FIG. 4 is a graph illustrating the horizontal bearing directivity of an transmitter consisting of a vertically positioned column, according to one exemplary embodiment.

FIG. 4 is a graph illustrating the horizontal transmitter bearing directivity of a vertically positioned column, according to one exemplary embodiment for a detection system 100 with a multilinear and not completely circular configuration. Such a type of transmitter has a limited sectoral bearing aperture, but potentially more suitable than an omnidirectional transmitter. As illustrated in FIG. 4, the transmitter 31 may have a wide sectoral bearing aperture toward the sea, for example at least +/−45° and preferably at least +/−60° width, even at 6 dB from the maximum in the axis, as shown in the graphs of FIG. 4. FIG. 4 notably shows that the transmitter 31 insonifies its entire group 3 over approximately:

plus or minus 80 degrees at 3 kHz and at plus or minus 2 dB, and plus or minus 45 degrees at 8 dB and at 8 kHz.

Figure 5:
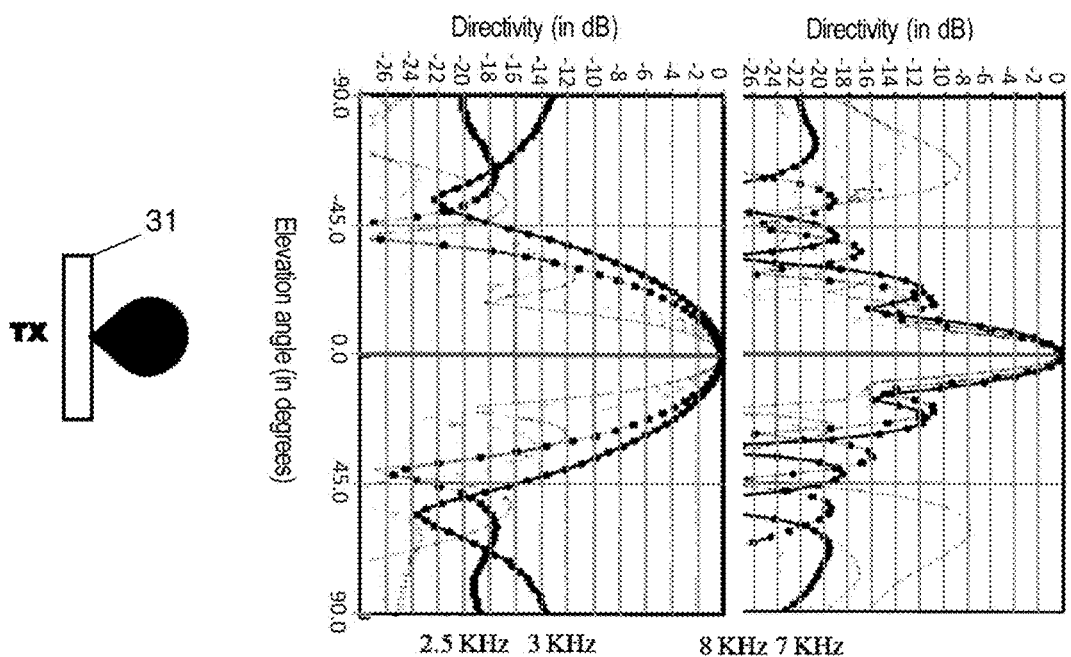
FIG. 5 is a graph illustrating the elevational directivity of the same transmitter consisting of a vertically positioned column, according to one exemplary embodiment.

FIG. 5 is a graph illustrating the transmitter elevational directivity of a vertically positioned column, according to one exemplary embodiment of the detection system. As shown in FIG. 5, the transmitter may have a very narrow elevational directivity. FIG. 5 notably shows an transmitter 31 with a vertical column of transducers for a narrow elevation. At 3 kHz and at −3 dB, the transmitter 31 insonifies at plus or minus 20 degrees. At 8 kHz and at −8 dB, the transmitter 31 insonifies at plus or minus 10 degrees.

Such features make it possible to limit the number of multipaths reverberating on the interfaces, while at the same time focusing the energy for propagations around the horizontal with low grazing (typically less than +/−10° width at 3 dB).

The transmitter 31 may advantageously be formed of a vertical column of transducers, for example positioned vertically on the floor on a support allowing possible elevational correction of the gradient of the floor, which may be advantageous for promoting the furthest possible insonification when the elevational transmission beamwidth is narrow, and for limiting reverberation of the floor.

Figure 6:
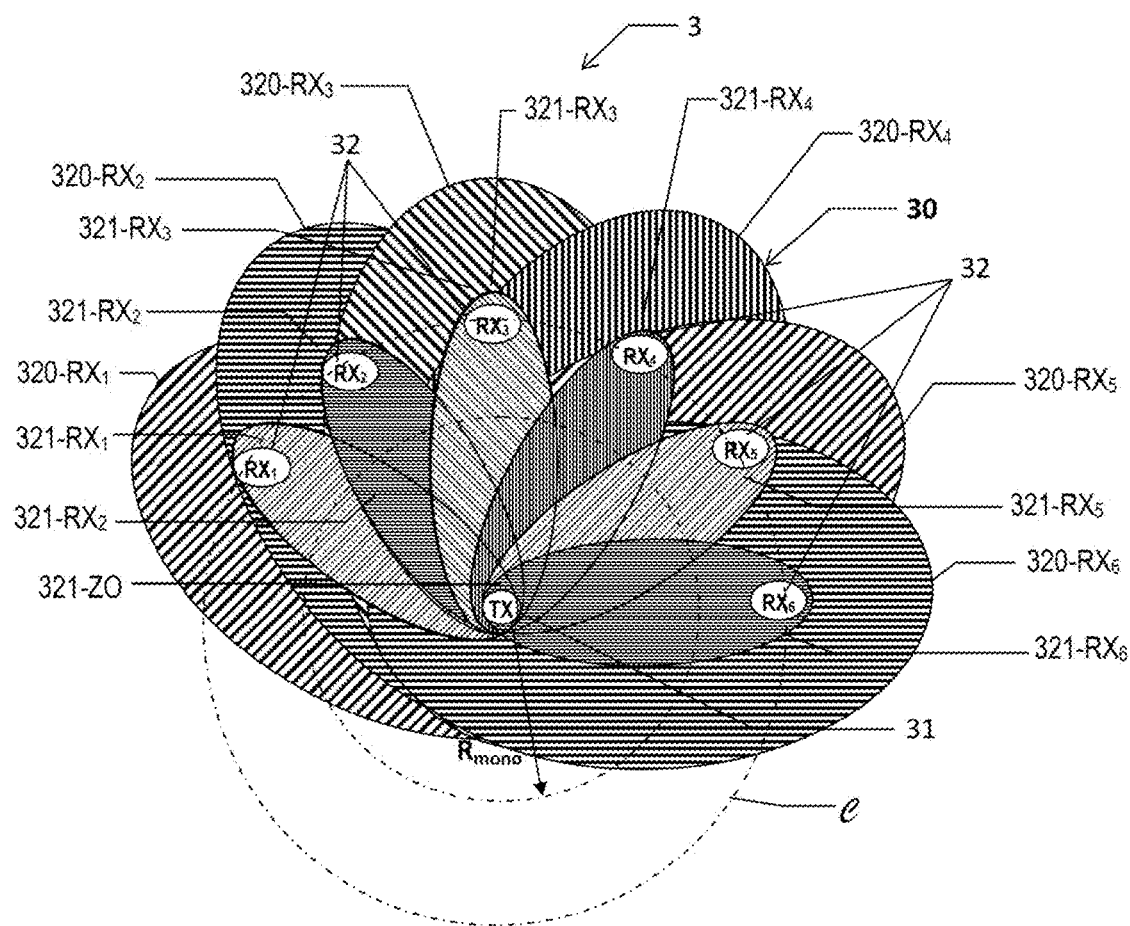
FIG. 6 shows the multistatic detection system according to a partly circular configuration with 6 receivers, according to one exemplary embodiment.

FIG. 6 shows the multistatic detection system 100 according to a circular configuration of the receivers 32. In such an embodiment, the system comprises at least one multistatic group 3 having one or more layers of receivers 32, the layers comprising at least one layer with what is called a "circular" configuration. The receivers of the layer with a circular configuration are arranged in an at least partly circular form (the receivers may describe a whole circle or a portion of a circle). The receivers 32 of such a layer may be arranged in at least one circular arc $\mathcal{C}$. In some embodiments, the center of the circular arc $\mathcal{C}$ may coincide substantially with the location of the transmitter 31. In such an embodiment, a single multistatic group 3 may be used, the transmitter 31 being able to insonify over a wide sector, which is advantageously single and omnidirectional if the area to be protected is completely circular, as is the case for an oil platform for example.

In a circular configuration, the transmitter 31 may be configured so as to insonify up to 360° and as far as possible, in a frequency band that is as wide as possible. For an omnidirectional transmitter, in what is called the low or medium frequency range (typically below 20 or 30 kHz), the free flooded rings (FFR) may be used to form vertical antennas with a thin elevational beam, FFR rings of different sizes being able to be interspersed.

In the embodiments in which one or more groups comprise at least one circular layer, such groups may furthermore comprise other receivers arranged in another form, inside or not inside the circular form, such as for example lines of receivers (receivers arranged in lines), the lines of receivers being able to be aligned with one another or not aligned with one another.

In the circular layer configurations of the multistatic group, the notation $d_{inter}=2x_i=2a$ may be used to denote the inter-receiver distance between two adjacent receivers $RX_i$ and $RX_{i+1}$ of a layer with a circular configuration. By convention, in the circular layer configurations, the index i associated with a receiver 32 increases along the circular or partly circular form. The notation $R_i$ may also be used to denote the geometric position of a receiver $RX_i$, whereas the geometric position of the transmitter 31 may be denoted by 0.

The transmitter 31 of a group with circular configuration may be arranged close to the infrastructure 2 or on said infrastructure such that the circular form described by the receivers 32 at least partly surrounds the infrastructure 2 so as to cover the sensitive area, thereby also minimizing the power cable length. The sensitive area of the infrastructure 2 includes the area for accessing the infrastructure by sea.

At a shallow depth, a pressurized cylinder may be associated with the transmitter 31, if the water level is insufficient, thereby making it possible to avoid cavitation in the desired transmission. In the case of a platform or oil drilling barge infrastructure 2 situated at a medium or deep depth, the elements of the detection system (transmitters 31, receiver 32) may be installed at an intermediate depth depending on the bathycelerimetry or on the floor by default, thereby making it possible to insonify threats that are relatively close to the surface.

Figure 7A:
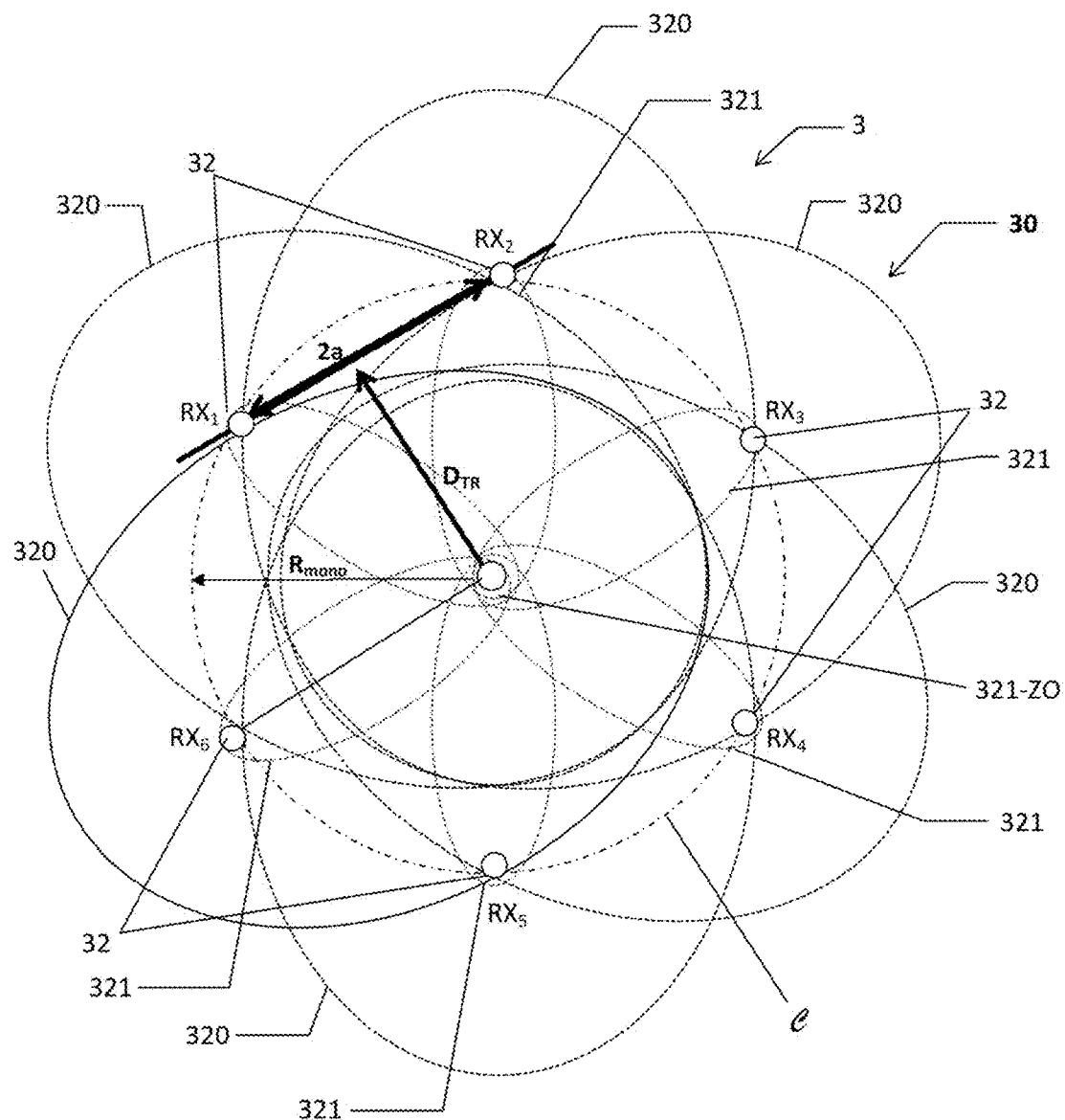
FIG. 7A shows one particular embodiment of the detection system with a completely circular configuration according to one exemplary embodiment with 6 receivers.

FIG. 7A shows one particular embodiment of the detection system with a completely circular configuration.

As shown in FIG. 7A, the sensitive area may be paved using a larger or smaller number of receivers 32 chosen according to the most critical threat to be detected, so as to ensure at least one continuous detection area. In the embodiment of FIG. 7A, each receiver 32 detects over an identical detection oval 320 from which the ellipse 321 corresponding to the blind zone ("blanking") of the receiver is removed ("blanking"), all of the receivers 32 being positioned on a circle $\mathcal{C}$ of radius $R_\mathcal{C}$ centered on the transmitter 31. The transmitter 31 may or may not be different of radius $R_{mono}$, the radius $R_{mono}$ corresponding to the equivalent monostatic range for a transmitter coupled to a single receiver equivalent to those of the monostatic group but collocated in the center. For example, in accordance with hexagonal paving as shown in FIG. 7A, in which the radius $R_\mathcal{C}$ is equal to the equivalent monostatic range $R_{mono}$, it is possible to obtain a detection area defined by the overall surface area of the 6 ovals, which is continuous and virtually free from blind zones because elementary detection areas are cross-covering them.

All that remains not covered is the blind zone in the form of a teardrop 321-ZO, which is the only area of non-detection of the entire multistatic group. Virtually gap-free detection within the range limits of the worst threat is therefore achieved.

The circle $\mathcal{C}$ of radius $R_\mathcal{C}$ may be smaller than the equivalent monostatic range $R_{mono}$ so as to bring the receivers closer to one another or to reduce the number thereof. By reducing the distance 2a between the receivers for a given number of receivers 32, each Cassini oval defining an elementary detection area is able to cover the elementary detection areas and/or the blind zones of the neighbouring receivers more and more, thereby making it possible to create more and more detection redundancy and to cover more and more receiver blind zones.

As a variant, the circle $\mathcal{C}$ of radius $R_\mathcal{C}$ may by contrast be larger than the equivalent monostatic range $R_{mono}$ so as to increase the limit range of each Cassini oval, thereby increasing the distance 2a between the receivers, or thereby possibly requiring the number of receivers to be increased. By increasing the distance 2a between two adjacent receivers for a given number of receivers 32, each Cassini oval defining an elementary detection area covers the elementary detection areas and/or blind zones of the neighbouring receivers less and less, thereby limiting detection redundancy, and thereby possibly resulting in the presence of blind zones of non-detection within the overall detection limits or up to limiting the tightness of the protection.

The detection radius $R_\mathcal{C}$ may be equal to the equivalent monostatic range $R_{mono}$ ($R_\mathcal{C}=R_{mono}$) in a hexagonal configuration, as shown in FIG. 7A. This advantageously makes it possible for each Cassini oval defining an elementary detection area to pass just geometrically through the position of its two neighbouring receivers. Specifically, due to the hexagonal paving, the triangle formed by the transmitter 31 at the center and the two receivers RX1 and RX2, for example, is equilateral. This results in an equality in the products of the distances of the following sides, that is to say:

$$TX\text{-}RX_2 * RX_2\text{-}RX_1 = TX\text{-}RX_1 * TX\text{-}RX_1$$

The bistatic path of the echo of a threat with a target index assumed to be constant, situated at $RX_2$ and received by $RX_1$ on the circle $\mathcal{C}$, therefore has overall losses equivalent to the outward/return path of an equivalent monostatic sonar of range $R_{mono}$ that would be at the center.

The hexagonal configuration of FIG. 7A with $R_\mathcal{C}=R_{mono}$ therefore allows an overlap redundancy of one or more receivers for continuity of operation in the event of a fault, on the condition that each of these receivers is surrounded by 2 functioning receivers, the area formed by the circle of radius $R_\mathcal{C}=R_{mono}$ then remaining a completely covered detection area.

With or without such faulty receiver, the detection area is thus completely full, without any gaps, the only blind zone corresponding to the intersection of all of the ellipses 321-ZO, which is particularly small around the transmitter, and has very little impact on the detection in an operational mode.

The circular multistatic barrier configuration of the invention exhibits numerous advantages over the conventional multi-monostatic solution, including: it offers geometric distribution of the barrier of the receivers 32 with the single transmitter 31 close to the power sources 6, thereby allowing:

- a distributed detection area to facilitate triggering of an alert with better prior warning;
- ease of installation of the distributed receivers, the receivers being able to have low power requirements and use any type of means for transmitting data with the processing device 7;
- positioning of the receivers 32 far from the infrastructure 2 to be protected, which may be in a very noisy acoustic environment, while at the same time being able to detect a target in multistatic mode, even around the transmitter 31, and without it being necessary to position a receiver in a noisy area;
- For the worst threats of divers in a closed circuit who have a very low target index TS (acronym for target strength), especially when they are equipped with a small low-TS motorized means in order to increase their speed and therefore their range, it is possible to detect such targets with an transmission code of long duration T so as to have good Doppler resolution, whereas conventional monostatic systems are blind over long durations over a circle cT/2, the multistatic system allowing it to "RX as TX"
- a better redundancy capability as far as the limit formed by the receivers themselves, even if a receiver 32 (RX) is defective;
- the complete or at least partial elimination of the blind zones in the "RX as TX" mode.

The detection groups 3 of one and the same detection system may have receiver configurations of similar or different form, depending on the application.

Throughout the rest of the description, the following notations will be used:

SL: acronym for "Source Level", denoting the sound level of the target. The SL corresponds to the noise transmitted by the target to be detected (in dB)

TL: acronym for "Transmission Loss", denoting the propagation loss (in dB)

TL(TM): denotes the propagation losses between the transmitter (transmitter 31) and a threat 10 (in dB)

TL(MR): denotes the propagation losses in dB between a threat (10) and a receiver 32 (in dB);

R: denotes the detection Range in km, that is to say the distance up to which the detection system detects a target;

DT: acronym for "Detection Threshold", denoting the detection threshold→the detection system 100 is able to detect when the noise level of the target is sufficiently high with respect to this threshold (threshold in dB);
PL: acronym for "Processing Losses", denoting the processing losses in dB due to processing imperfections;
DI: acronym for "Directivity Index", denoting the directivity index of the reception antenna (expressed in dB); the directivity represents the spatial filtering of the receptivity of the antenna in a given direction and represents the spatial gain of the antenna on the ambient noise;
TS: acronym for "Target Strength", denoting the target index at the reflection of the pulse and therefore returning an echo (in dB);
NL: for "Noise Level", denoting the ambient noise level in dB such as, for example, the ambient noise at sea that may be generated by marine traffic, wave noise, biological noise, etc.
T: denotes the Temporal duration of the transmitted transmitted code in seconds.

Using the above notations, the signal-to-noise ratio is that of the echo that enters a receiver 32 in relation to the noise in the path (beam) that points in the correct direction. It is assumed that the distance DTR is sufficient such that the direct path of the transmission on the receiver does not saturate it and does not prevent the echo from being detected, and that the reverberation has become low in relation to ambient noise.

The equivalent monostatic detection range is characterized by a radius R. For the most critical threats 10 (assuming for example that TS=−20 dB) where c denotes the speed of sound in meters per second, and $$SL+TS+DI-2TL(R)-NL+10 \log T-PL > DT$$

For example, in one exemplary embodiment in which the elements (transmitter/receivers) of the detection system 100 are arranged in a shallow-depth marine environment at a negative gradient of −0.4 m/s over a water level of 20 meters, for a "low" frequency of 6.5 kHz and a depth adding linear distance losses in addition to absorption, the distance losses of a Marsh & Schulkin model are typically (in dB):

$$TL(R)=3+17.5 \log R+1.9*R/1000,$$

where R in meters is between 100 meters (5 times the water level) and 4 km (arch effect), with a notable influence of the floor reflection loss, since absorption only accounts for 0.45 dB/km here.

The detection condition becomes:

$$SL+DI+10 \log T > 2*(17.5 \log(Rm)+1.9Rkm)+NL+20+5+15$$

The sizing compromise of the transmitter in terms of power and of the directivity index of the receiver may be calculated, in this example from:

$$SL+DI+10 \log T > 2*(17.5 \log(Rm)+1.9Rkm)+NL+40$$

For a desired range R over TS=−20 dB of 750 m, for a barrier that has to detect a target even with a very high level of sea noise, for a frequency of 6.5 kHz, a level of Knudsen sea noise of NL=56.2 dB, this gives:

$$SL+DI+10 \log T > 103.4+96.2, \text{ that is to say } SL+DI+10 \log T > 200 \text{ dB}$$

This technologically low value may be surprising in comparison with the characteristics of conventional systems. This is due to the fact that, around 80 KHz, nothing but the absorption per km is of the order of 20 to 24 dB/km, depending on the type of floor. At least 15 to 18 dB for an outward path and the same again in dB for a return path, that is to say around 33 dB, is therefore added. The noise in 17 log f has dropped only by 17 log(80/6.5)=18.5 dB.

In medium to low frequencies, the detection system according to the invention therefore has the advantage, for one and the same pulse duration, of having an SL+DI less demanding than the parameter SL+DI that is necessary at conventional high frequencies.

Thus, in a shallow-depth tropical environment for example, even for ranges that are conventionally able to be achieved (750 m) by current DDS on the worst threats, it is advantageous at SL+DI, with the same pulse duration, to reduce the frequency. Such a frequency reduction is even more useful for detecting faster and larger targets at a greater distance: specifically, the optimum frequency decreases further as long as the TS remains of the same order toward low frequencies, that is to say that the wavelength is not too great in comparison with the size of the elements of the threat forming a good echo.

The blind zone 321 of a receiver 32 is larger the longer the duration of the transmitted pulse. In one embodiment with a multilinear configuration, such as for example illustrated in FIG. 2 or in FIG. 3 described above, the positioning of the receivers may make it possible to achieve a tight barrier of set thickness that is sufficient for a slow target that constitutes the smallest of the threats, the triggering of an alert and the sending of a reaction means. The area of non-detection between the transmitter 31 and a receiver 32 may require relocation through local intervention of a reaction sent in situ (the Cassini ovals are separated for the corresponding threat with a very low target index).

According to some embodiments, it is possible to improve the detection range by increasing the pulse duration, without increasing the blind zone, using an "RX as TX" operating mode (the receivers 32 are able to receive during transmission). This is particularly advantageous when the target is faster or equipped with a propulsion system (for example from 2 to 3 knots or 6 knots), such as for example a larger vehicle in which the diver or divers are protected from the flow of water created by forward displacement.

In some embodiments with a circular configuration, such as for example shown in FIG. 7A, the detection system 100 makes it possible to perform a tuning on the basis of the performance of each receiver 32 so that the blind zone 321 of each receiver is at least partly covered by the detection area of the two neighbouring receivers 32, thereby making it possible to achieve a detection area of the detection system without blind areas, the detection area incorporating the sensitive area associated with the infrastructure 2. Such tuning may comprise adjusting the transmission pulse, for example with a high pulse duration in order to avoid increasing the parameter SL and/or DI. Such a long pulse is possible without this generating large blind zones, by using particular transmission codes and a capability of reception during transmission ("RX as TX") associated with such codes. The FM transmission codes may be for example codes for which the echo is received at a frequency different enough from the direct path of the transmitter, with or without Doppler, due to the simple temporal delay of the echo with respect to the direct path. The processing device 7 may also implement adaptive processing in order to reject the (highest) level of the direct path in comparison with that of the echo. This results in a sufficient rejection RJtot. In a surveillance application using a target intervention system in the event of target detection, the target 10 may be detected without it being necessary to relocate the target intervention system, the intervention device being able to travel toward the target at maximum speed while at the same time being continuously directed. In the case of a fast target such as a torpedo for example, the intervention device may be a destruction device (hard kill) that is continuously directed toward the target, without the presence of the intervention device having a transmission blinding effect of the target detection.

In configurations of the detection system 100 that allow continuity of operation in the event of a fault with or of destruction of a receiver 32 or of several non-adjacent receivers, the neighbouring receivers of the defective receiver may be positioned close enough so as to continue to guarantee tightness of the protection in the event of a defective receiver surrounded by 2 operational receivers, that is to say so that any threat passing through the straight line or curve of the receivers is detected. This is the case for FIGS. 2, 3, 6 and 7, but not FIGS. 8 to 20. Such a group is said to be fault-robust.

In the example of FIG. 7A, it is possible to calculate the necessary total rejection RJtot as follows:

$$RJtot > TL1 + TL2 - TS - TL(D) + PL + DT$$ TL(D) representing the propagation loss of the path over the distance D between the transmitter TX and a given receiver RX In FIG. 7A, it should be noted that a limit detection of the pair TX/RX1 passes just through RX2. By definition, the detection limit curve is such that TL1+TL2=Constant Assuming that the threat is situated at RX2, it becomes: TL1+TL2=2TL(D), because the group comprising the transmitter TX (31) and the receivers RX1 and RX2 (32) form an equilateral triangle. D in this case denotes the radius of the circle passing through all of the receivers.

The losses of the lateral bistatic path passing through the threat to arrive at RX2 are then equal to the outward/return losses going toward RX1, which therefore also corresponds to the monostatic range $R_{mono}$ for a target whose TS is assumed to be identical in these two cases
It thereby becomes:

$$RJtot > TL(D) - TS + PL + DT$$

For example, depending on D and for the case TS=−20 dB under consideration, the following numerical values may be obtained:
for D=500 m, RJtot>17.5 log 500+1.9*0.5+40=47.2+0.95+ 40=88.18 dB;
for D=1000 m, RJtot>17.5 log 1000+1.9+40=52.5+1.9+ 40=94.4 dB.

For a detection system comprising 12 receivers 32 rather than 6, the second maximum bistatic path (RX1–RX2) is divided by 2 in relation to D, thereby simplifying the rejection (approximately 6 dB gain), but doubling the number of receivers 32 per kilometer (km):

for D=500 m, RJtot>17.5 log 250+1.9*0.25+ 40=41.9+0.47+40=82.4 dB;

for D=1000 m, RJtot>17.5 log 500+1.9*0.5+ 40=47.2+0.95+40=88.2 dB.

It should be noted that, in order to achieve such rejection capabilities characterized by RJtot, using some transmission codes (for example some instantaneous frequency codes sweeping the band throughout the entire pulse, in particular frequency modulation codes), the detection system 100 may operate in "RX as TX" mode (the receivers 32 may begin to receive even while the transmitter 31 is transmitting) and therefore have a blind zone around each receiver that is virtually negligible and of the order of the compressed pulse, thereby allowing long pulses that promote detection.

The transmission signal transmitted by the transmitter 31 comprises pulses of length T. In some embodiments, the pulses transmitted by the transmitter 31 may be modulated with Doppler transmission codes in order to improve the accuracy of the measurement of the Doppler of the echoes received by a moving target 10. The use of such Doppler transmission codes promotes additional Doppler rejection of the reverberation and of the direct path, when the target has a Doppler higher than the Doppler spread of the reverberation.

The transmitter/receiver distance D between the transmitter TX (31) of a group and a receiver RX (32) of the group may be chosen so as to correspond to the performance of an equivalent monostatic sonar (comprising the transmitter TX and a receiver RX), as a function of the parameters SL, DI and 10 log T, in the most critical distance loss TL and noise loss NL environmental conditions, the equation of the equivalent monostatic sonar being:

$$SL + DI + 10 \log T > 2TL(D) + NL + PL + DT$$

In the case of configurations that are fully or partly non-circular, but with multistatic groups comprising receivers forming one or more lines, the orders of magnitude of the rejections are comparable, but the optimum location of the receivers mode of the invention may not be regular.

In a multilinear configuration of a detection group of the detection system, the receivers 32 of the group 3 under consideration may comprise at least one reference pair (for example the pairs $(RX_{-1}, RX_1)$) and may comprise receivers 32 that are adjacent to and equidistant from the transmitter 31 (reference receivers). The receivers $RX_{-1}$ and $RX_1$ of the reference pair are linked by a segment Δ situated at a distance from the transmitter $D_{TR}$, called reference transmitter-receiver distance ($D_{TR}$) hereinafter.

In such an embodiment, the position of a given receiver, denoted $X_i$ (or $X_{-i}$), with respect to the axis of symmetry, in each group 3, depends on the distance $D_{TR}$ of the transmitter 31 from the segment Δ and on the position of the previous receiver $X_{i-1}$ (or respectively $X_{-(i+1)}$) with respect to the axis of symmetry in the group, for i (respectively −i) different from the index of the reference pair.

Figure 7B:
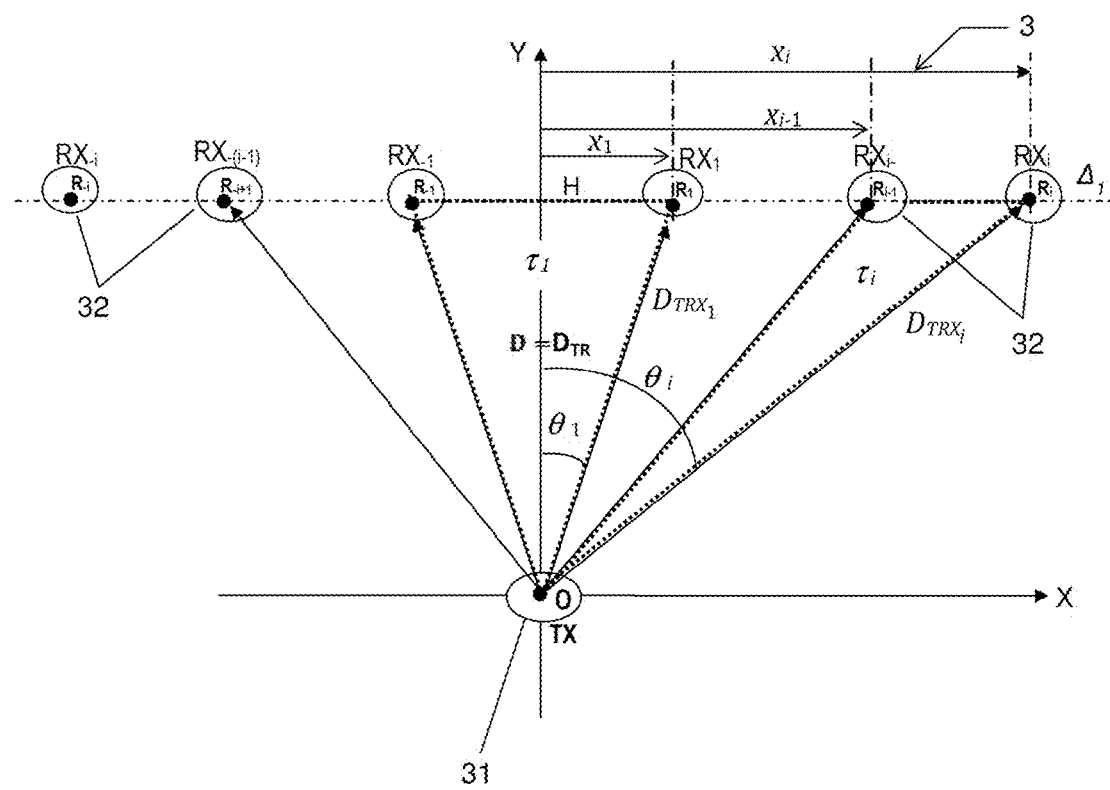
FIG. 7B is a simplified geometric view of a linear layer of receivers of a multistatic group with 2i receivers.

Thus, considering for example the example of FIG. 3 and with reference to the notations indicated in FIG. 7B:
the position of the receiver $X_2$ with respect to the axis of symmetry Y depends on the reference transmitter-receiver distance $D_{TR}$ and on the position of the previous receiver $X_1$ with respect to the axis of symmetry;
the position of the receiver $X_{-2}$ with respect to the axis of symmetry Y depends on the reference transmitter-receiver distance $D_{TR}$ and on the position of the previous receiver $X_{-1}$ with respect to the axis of symmetry.

The expression "previous receiver with respect to the axis of symmetry with respect to a given receiver" as used here denotes the receiver adjacent to the given receiver and situated between the given receiver and the axis of symmetry.

Such an arrangement of receivers makes it possible to achieve a substantially constant detection thickness beyond the line formed by the receivers. Moreover, the detection area of each detection group 3 forms a detection barrier whose length depends on the reference transmitter-receiver distance $D_{TR}$. The distances between the receivers 32 of one and the same group may be calculated according to the invention so as to make it possible to detect the threats that are most difficult to detect (in terms of size and speed of travel) at the latest at the line of receivers. Advantageously, the detection area of a detection group 3 at least partly covers the area extending between the transmitter 31 of the group 3 and the receivers 32, thereby making it possible to track the target in some embodiments.

The multistatic detection system 100 according to the embodiments of the invention makes it possible to have distributed receivers in the embodiments with a circular barrier, and transmitters that are distributed to a small extent in the embodiments with a multilinear barrier.

With reference to the notations indicated in FIG. 3 and in FIG. 7B, which show the inter-receiver and intra-receiver distances for a multilinear configuration of the receivers, the receivers 32 of the reference pair 324 $\{RX_{-1}, RX_1\}$ are separated from one another by a reference inter-receiver distance denoted $2x_1$, $x_1$ being the distance of one receiver of the pair ($RX_{-1}$ or $RX_1$) from the axis of symmetry ($x_1$ also denoted hereinafter a, that is to say $a=x_1$). In one embodiment, the reference inter-receiver distance $2x_1$ is a function of the reference transmitter-receiver distance $D_{TRX}$, and of the factor of merit (FOM) of an equivalent monostatic sonar representing the minimum range $R_{mono}$ of an equivalent monostatic sonar considering all of the possible threats (including the most difficult threat to detect, in the most difficult potential environmental conditions).

As used here, an equivalent monostatic sonar denotes the monostatic sonar that would be formed by the transmitter 31 and a collocated receiver 32.

In the embodiments in which the detection group 3 has a multilinear configuration, the linear form described by a multistatic group has an axis of symmetry Y and the reference pair is formed by the receivers that are symmetrical about the axis of symmetry of the group on the same line and that are the closest to the axis of symmetry: $RX_{-1}$ and $RX_1$. The reference inter-receiver distance $2a$ then corresponds to the distance between the receivers of the reference pair $\{RX_{-1}$ and $RX_1\}$.

In some embodiments, each multistatic group, associated with a linear configuration of the receivers, may comprise an even number of receivers that are symmetrical about the axis of symmetry Y (in particular for the most central groups).

As a variant, in the embodiments in which the detection group 3 has a circular or semicircular configuration (as illustrated in FIGS. 6 and 7 for example), all of the adjacent receivers are equidistant from the transmitter 31 (the distance between a receiver 32 and the transmitter is equal to the radius of the circular form), and the circular form described by a multistatic group has a plurality of axes of symmetry D1, D2, . . . Dn, an axis Di passing through the transmitter 31 and through the middle of each segment linking two adjacent receivers. The detection group 3 then comprises as many reference pairs as pairs of adjacent receivers. In such an embodiment, the reference inter-receiver distance $d_{inter}$32 2a corresponds to the length of the segment linking two adjacent receivers of one and the same group.

In some embodiments, at least some of the multistatic groups having a circular configuration of the receivers may comprise an even number of receivers that are symmetrical about each axis of symmetry Di of the circular form (notably the most central groups).

In some embodiments, the reference inter-receiver distance $d_{inter}$=2a may be determined from the square $R_{mono}^2$ of the detection radius $R_{mono}$ of the equivalent monostatic sonar divided by the distance $D_{TRX_1}$ between the transmitter and one of the receivers ($RX_{-1}$ or $RX_1$) of the reference pair 324.

The multistatic detection is achieved on the basis of the 2 paths:

$$SL+TS+DI-TL(TM)-TL(MR)-NL+10 \log T-PL>DT$$

The bistatic path distances of maximum acceptable propagation for forming a tight detection barrier for the most critical threats having a minimum target index $TS_{min}$ may then be written:

$$TL(TM)+TL(MR)<FOM_{min}, \text{ with}$$

$$FOM_{min}=SL+TS_{min}+DI-NL+10 \log T-PL-DT.$$

The parameter $FOM_{min}$ denotes the minimum factor of merit and represents the performance of a monostatic sonar (for a given transmitter TX and receiver RX) in a given environment, characterized by a noise level NL, with given processing (T and PL and DT) in order to detect the most critical threat ($TS_{min}$).

A monostatic sonar uses an transmitter TX and a receiver RX at the same location, so that the two paths TM (transmitter-receiver path) and MR (threat-receiver path) are coincident. The range radius of the sonar $R_{mono}$ on the target is then such that:

$$2 TL(R_{mono})=FOM_{min}$$

The expression "equivalent monostatic sonar" as used here makes reference to a monostatic sonar formed of one and the same transmitter TX and of one of the same receiver RX (TX and RX being located at one and the same point for a monostatic sonar) as those used in the multistatic groups 3 according to some embodiments of the invention, situated in one and the same environment as the transmission/reception elements of the detection system 100, with consideration to a threat of the same TS, and whose detection range is a circle of radius $R_{mono}$. All of the positions of the threat M (10) beyond which the threat is not detected satisfy the following bistatic detection equation, considering such an equivalent monostatic sonar:

$$TL(TM)+TL(MR)=2 TL(R_{mono}).$$

This equation determines the Cassini ovals.

In an embodiment of the detection system 100 using a multilinear configuration (as shown for example in FIGS. 2 and 3 for example), considering that the threat 10 denoted M has the coordinates (x, y) with respect to the transmitter 31 in the reference frame $\{X, Y\}$ under consideration, using $x_1$ to denote the abscissa of RX1 and assuming that the propagation losses are stratified horizontally for the sake of simplicity (and therefore dependent solely on the distance), it becomes:

$$TL(\sqrt{x^2+y^2})+TL(\sqrt{(x-x1)^2+(y-D_{TR})^2}))<2 TL(R_{mono})$$

Such a condition defines the condition to be satisfied so that RX1 detects the threat M. Considering a frequency and detection distances that are low enough to neglect absorption, the equation of the limit range curve becomes:

$$K \log(\sqrt{(x^2+y^2)})+K \log(\sqrt{(x-x1)^2+(y-D_{TR})^2})=\text{Constant}$$

This equation defines a condition to be satisfied in order to guarantee the tightness of the detection barrier for the lowest threats. It determines Cassini ovals as possible detection points for the threat M(x, y) by the receiver $RX_1$ of coordinates (x1, $D_{TR}$).

It should be noted that this equation may apply in a similar manner to all of the receivers $RX_i$ of index i of the group 3, apart from a receiver $RX_0$ that could be situated on the axis of symmetry (such a central receiver would have a larger range, but would not have a particular advantage, as long as the thickness of the barrier is sufficient at all points). In the preferred embodiments, at the isotropic middle, each multistatic group 3 comprises only pairs of receivers, without a central receiver.

In addition, the receivers RXi may be arranged so as to satisfy another detection condition according to which a receiver RXi is not arranged in its blind zone (blanking), which is determined by:

$$D_{TM}+D_{MR}>D_{TRXi}+cT_{sat},$$

with $D_{TRXi}=\sqrt{(x-x_i)^2+(y-D_{TR})^2}$

Throughout the rest of the description, the following notations will be used:

$$D_{TRXi_{sat}}=D_{TRXi}+cT_{sat},$$

$T_{sat}$ denotes the duration during which the reception, on the receiver RXi, of the transmission pulse saturates the processing output, whether spatially or due to the ambiguity function of the code that is used:
- In conventional processing, the duration $T_{sat}$ may be equal to T when the level received by the receiver 32 of the direct path of the transmission is much greater than a threat echo, even close, thus preventing the echo from being received;
- In adaptive processing, using processing and particular transmission codes, it is possible to achieve both very good compression at the output of the coherent processing and very good rejection, thereby making it possible to detect an echo in a direction other than that of the transmitter 31, even during reception of the transmission. In such an embodiment, the system 100 is designed to receive during transmission itself ("RX as TX"). Even though the duration of the compressed pulse at the processing output of the direct path may be very short, there are generally a plurality of paths from the transmitter 31. The duration $T_{sat}$ is thus non-negligible but far shorter than for conventional processing.

The above formulae thus define the TX and RX center ellipses. In the remainder of the description, it will be assumed that each ellipse associated with a receiver RX (32) passes substantially close to the transmitter TX and to the receiver RX, in the embodiments in which the system operates in "TX as RX" mode.

Such a detection system 100 offers numerous advantages over a conventional multi-monostatic solution, including the following advantages: the shape of the detection range area is independent of the distance between the transmitter TX (31) and the boundary of the marine area on which the infrastructure is arranged (the coast for example);
the supply of power to the transmitter may require just a single power cable;

Moreover, it is possible to set the distance $D_{TR}$ in order to achieve a barrier of sufficient thickness and that makes it possible to trigger an alert in advance for a sufficient reaction time, for example in order to neutralize the target; it should be noted that fast threats 10 equipped with a larger device have a higher target index TS and are detected earlier by the detection system, over a large target index TS range, by virtue of the low frequencies of the transmitter 31.

The distance between receivers 32 may be optimized by decreasing it enough so that even low threats 10 are not able to pass through the barrier without being detected either by at least one of the receivers or by both receivers depending on the desired security level in terms of fault robustness; in the case of two receivers, this also allows better location accuracy, while at the same time guaranteeing a target Doppler on at least one of the two receivers.

The threat echoes may be received on a receiver even during the direct reception of the transmission of long pulses (far longer than 100 ms (milliseconds)) on this receiver ("RX as TX"), thereby allowing a Doppler that is thinner the longer the pulse.

The geometric configuration of the receivers 32 may be optimized in order to achieve a linear barrier that is robust to defects (faults or destruction for example) of one or more non-adjacent receivers, the receivers neighbouring an adjacent receiver 32 ensuring continuity of service by virtue of the at least partial coverage of the elementary detection area 320 of the defective detector by the elementary detection areas of the neighbouring receivers 32.

In a configuration of the receivers/transmitters of the system in which the Cassini oval of $RX_{-1}$ passes through $RX_1$ in "RX as TX" mode in adaptive processing or with a sufficient margin $cT_{sat}/2$ in conventional processing, this condition makes it possible not to have any blind zone in the central part between the first receivers $RX_{-1}$ and $RX_1$. Such a configuration may be expressed through the fact that the point $RX_1$ of coordinates $(x_1, D_{TR})$ has to belong to the range equation of $RX_{-1}$. The equation of the Cassini oval of $RX_{-1}$ is:

$$TL(TM)+TL(MRX_{-1})<2\ TL(R_{mono}), \text{ that is to say}$$

$$K\log((x^2+y^2)^{0.5})+K\log((x-x_{-1})^2+(y-D_{TR})^2)^{0.5})<2K\log(R_{mono}).$$

In order to be able to detect a threat M of coordinates $(x_1, D_{TR})$ (in "RX as TX" mode) on the Cassini oval of $RX_{-1}$, it becomes:

$$\log((x_1^2+D_{TR}^2)^{0.5})+\log((x_1-x_{-1})^2+(D_{TR}-D_{TR})^2)^{0.5})=2\log(R_{mono}), \text{ that is to say}$$

$$\log((x_1^2+D_{TR}^2)^{0.5})+\log((x_1-x_{-1})^2)^{0.5})=2\log(R_{mono}), \text{ that is to say}$$

$$\log(D_{TRX_1})+\log(2x_1)=2\log R_{mono}.$$

Therefore, the abscissa $x_1$ may be determined from the following equation giving the abscissa of the first receiver for a system minimizing the blind zones and allowing fault robustness:

$$D_{TRX_1} \cdot 2x_1 = R_{mono}^2 \qquad (1)$$

The detection system 100 according to some embodiments may advantageously satisfy such an equation in order to be able to effectively detect the worst threats (i.e. threats that are the most difficult to detect) in extreme environmental conditions for which the range of the equivalent monostatic sonar is $R_{mono}$, the reference inter-receiver distance $2a$ corresponding to double the absolute value ($|x_1|$) of the abscissa $x_1$ of each receiver of the reference pair from the axis of symmetry, that is to say $2a=2|x_1|$.

As $D_{TRX_1}$ depends on the unknown $x_1$, equation (1) may also be written in the form:

$$2x_1\sqrt{(D^2+x_1^2)}=R_{mono}^2 \qquad (2)$$

Using $\theta_1$ to denote the angle corresponding to the angle between the axis of symmetry and the segment joining the transmitter TX and the receiver RX1 of the reference pair, equation (2) may also be expressed by equation (3) below:

$$D=\cos(\theta_1)*D_{TRX_1}, \text{ with } D=D_{TRX}; \text{ and}$$

$$2x_1 D/\cos(\theta_1)=R_{mono}^2 \qquad (3)$$

Equation (3) may be interpreted geometrically in terms of surface area.

FIG. 7B is a simplified geometric view of a linear layer of receivers of a multistatic group 3, with a multilinear configuration. FIG. 7B notably shows the angle $\theta_1$ corresponding to the angle between the axis of symmetry and the segment joining the transmitter TX (31) and the receiver $RX_1$.

As shown in FIG. 7B, the product $x_1 D$ of equation 3 corresponds to the product of the base length $x_1$ by the height D of the triangle $\mathcal{T}1$, whose apexes are the points O, $R_1$, and $R_{-1}$ defined as follows:

- the point O denotes the origin of the X- and Y-axes and coincides substantially with the transmitter TX (31) of the group 3 under consideration;
- the point $R_1$ substantially denotes the location of the receiver $RX_1$ of the reference pair (situated to the right of the axis of symmetry);
- the point $R_{-1}$ substantially denotes the location of the receiver $RX_{-1}$ of the reference pair (situated to the left of the axis of symmetry).

In addition, for the group under consideration, the angle $\theta_1$ corresponds to the insonification aperture angle of the transmitter TX toward the receiver RX1 of the reference pair that is situated to the right of the axis of symmetry of the group. The surface area of this triangle $\mathcal{T}1$ of apexes 0, $R_1$ and $R_{-1}$, denoted $\mathcal{A}ire(\mathcal{T}1)$, corresponds to half the product of the base of the triangle and the height ((Base*Height)/2), that is to say $2x_1 D/2$ ($\mathcal{A}ire(\mathcal{T}1)) = 2x_1 D/2$), which corresponds to half the term $2x_1 D$ of equation (3). Equation (3) may therefore be reworded as follows in equation (4):

$$\mathcal{A}ire(\mathcal{T}1)/\cos(\theta_1) = R_{mono}^2/2 \quad (4)$$

Equation (4) is equivalent to equations (1), (2) and (3). The right-hand term of equation (4) corresponds to half the surface area of a square $\mathcal{S}$ of side $R_{mono}$ ($\mathcal{A}ire(\mathcal{S}) = R_{mono}^2$).

Thus, according to some embodiments, for a given group, the surface area $\mathcal{A}ire(\mathcal{T}1)$ of a reference triangle formed by the transmitter 31 of the group and the two receivers $RX_1$, $RX_{-1}$ of the reference pair of the group divided by the cosine of the half aperture angle $\theta_1$ of the triangle on the transmitter 31 may be equal to half the surface area $\mathcal{A}ire(\mathcal{S})$ of a square $\mathcal{S}$ having a side equal to the minimum range of the equivalent monostatic sonar $R_{mono}$. Such an arrangement of the detection system 100 makes it possible to achieve maximum coverage of the blind zones of the receivers of the group with fault redundancy, and to detect the worst threats (the most difficult threats to detect) in extreme environmental conditions (i.e. worst environmental conditions) for which the range of the equivalent monostatic sonar is equal to $R_{mono}$.

Moreover, by posing $X = x_1^2$, equation (2) may be expressed in the form of a second-degree double-square equation as $X:4X(D^2 + X) = R_{mono}^4$.

That is to say:

$$x_1 = \frac{D}{\sqrt{2}} \cdot \sqrt{\sqrt{1 + \left(\frac{R_{mono}}{D}\right)^4} - 1} \quad (5)$$

Thus, the distance $x_1$ of a receiver of said reference pair from the axis of symmetry may be determined using equation (5) in order to guarantee maximum coverage of the blind zones of the receivers of the group under consideration with fault redundancy, and detect the worst threats in the worst environmental conditions.

The distance $x_1$ of a receiver of the reference pair from the axis of symmetry 33 may thus be up to at most the value given by equation (5).

It should be noted that, depending on the value of $D = D_{TR}$ with respect to $R_{mono}$:

- If $D < R_{mono}$, the spacing between either one of the 2 receivers {RX1, RX-1} of the reference pair and the axis of symmetry 33 is increasingly large;
- If $D = \sqrt{3}/2 * R_{mono}$, D corresponds to the distance $D_{TR}$ of the chord of a hexagon inscribed in the circle of radius $R_{mono}$ (as shown in FIG. 7A); $x_1$ then satisfies $$x_1 = \frac{D}{\sqrt{3}} - R_{mono}/2;$$

- If $D = R_{mono}$, the distance between the transmitter TX of the group and the line formed by the receivers 32 is equal to $x_1 = 0.455D$, that is to say $2x_1 = 0.96D$;
- If $= 2\sqrt{3} * R_{mono}$, then $$x_1 = \frac{D}{2\sqrt{2}}$$

and a smaller spacing is achieved between either one of the two receivers of the reference pair and the axis of symmetry 33 of the group, whereas the protective barrier is further from the transmitter;

- If $D > R_{mono}$, an increasingly small spacing is achieved between either one of the two receivers of the reference pair and the axis of symmetry 33 of the group, whereas the protective barrier is increasingly far from the transmitter, thereby satisfying the compromise between range and barrier surface area that are optimum for the detection of the worst threats.

It should be noted that the particular case D=0 corresponds to a situation in which the transmitter and the two receivers of the reference pair are aligned. In this case D=0, equation (5) is not undetermined, because it may be written in an equivalent manner:

$$x_1 = \frac{1}{\sqrt{2}} \cdot \sqrt{\sqrt{D^4 + R_{mono}^4} - D^2},$$

thereby giving:

$$x_1 = \frac{R_{mono}}{\sqrt{2}}$$

It is thus verified that two receivers aligned with the transmitter, spaced from one another by this value, indeed have the property of having detection areas that cover one another. Specifically, the length of the first path for going from TX to $RX_{-1}$ is equal to $$\frac{R_{mono}}{\sqrt{2}},$$

whereas the length of the second path for going from the threat (located on the receiver $RX_{-1}$) to $RX_1$ is equal to $$2 \cdot \frac{R_{mono}}{\sqrt{2}},$$

that is to say a product equal to $R_{mono}^2$ corresponding to the performance of the system.

In the embodiments in which a detection group has a multilinear configuration, the distance of a given receiver $RX_i$, different from the receivers $RX_1$ and $RX_{-1}$ of the reference pair, from the axis of symmetry 33 of the group may advantageously depend on the distance of the receiver $RX_{i-1}$ adjacent to this given receiver $RX_i$ from the axis of symmetry, the adjacent receiver $RX_{i-1}$ being situated between the given receiver $RX_i$ and the axis of symmetry ($RX_{i-1}$ is thus the receiver adjacent to $RX_i$, which is closer to the axis of symmetry than $RX_i$). Moreover, in such an embodiment, the inter-receiver distance between two receivers of the group reduces when moving away from the axis of symmetry 33.

In particular, the abscissa $x_i$ of each other receiver 32 of the system 10 may then be determined iteratively from the abscissa of the previous adjacent receiver $x_{i-1}$, situated on the same side of the group 3 with respect to the axis of symmetry 33 (in this case, i being positive or negative depending on the chosen notation convention and i−1 being different from the index of the reference pair (|i−1|≠1)), from the square $R_{mono}^2$ of the detection radius $R_{mono}$ of the equivalent monostatic sonar and from the distance $D_{TRX}$ between the transmitter and the point X denoting the point situated in the middle of the segment $[RX_{-1}RX_1]$.

In particular, the position of the receiver $RX_2$ may be such that the receiver $RX_1$, with its Cassini oval, at least partly covers the blind zone of $RX_2$. The equation of the Cassini oval of $RX_1$ is:

$$K \log((x^2+y^2)^{0.5}) + K \log((x-x_1)^2+(y-D_{TR})^2)^{0.5}) < 2 K \log(R_{mono}).$$

In order to be able to detect a threat M (in "RX as TX" mode) of coordinates $(x_2, D_{TR})$ on the Cassini oval of $RX_1$, the minimum condition is:

$$\log((x_2^2+D_{TR}^2)^{0.5})+\log((x_2-x_1)^2+(D_{TR}-D_{TR})^2)^{0.5})=2 \log(R_{mono}), \text{ that is to say}$$

$$\log((x_2^2+D_{TR}^2)^{0.5})+\log((x_2-x_1)^2)^{0.5})=2 \log(R_{mono}), \text{ that is to say}$$

$$\log(D_{TRX_2})+\log(x_2-x_1)=2 \log R_{mono}.$$

It thus becomes:

$$D_{TRX_2} \cdot (x_2-x_1)=R_{mono}^2 \tag{6},$$

with as initial condition on $x_1=R_{mono}^2/D_{TRX_1}$ and $D_{TRX_2}$ denoting the distance between the transmitter 31 and the receiver $RX_2$.

More generally, the abscissa $x_i$ of the i-th receiver $RX_i$ may be determined iteratively from the following equation, according to which the product between the distance $D_{TRX_i}$ and the difference $(x_i-x_{i-1})$ between the abscissa $x_i$ of the i-th receiver $RX_i$ and the abscissa $x_{i-1}$ of the (i−1)-th receiver $RX_{i-1}$ is at most equal to the square of the radius of the equivalent monostatic sonar $R_{mono}^2$:

$$D_{TRX_i}(x_i-x_{i-1})=R_{mono}^2 \tag{7}$$

$D_{TRX_i}$ denoting the distance between the transmitter and the receiver $RX_i$.

Using $\theta_i$ to denote the angle corresponding to the angle between the axis of symmetry 33 of the group under consideration and the segment passing through the transmitter TX and the receiver $RX_i$, it becomes $D=\cos(\theta_i)*D_{TRX_i}$ with $D=D_{TR}$, such that equation (7) may be reworded according to equation (8) below:

$$(x_i-x_{i-1})D/\cos(\theta_i)=R_{mono}^2 \tag{8}$$

Equation (8) may be interpreted in terms of surface area, considering a triangle $\mathcal{T}_i$ whose apexes coincide substantially with the elements TX, $RX_i$ and $RX_{i-1}$. Specifically, making reference again to FIG. 7B, the triangle $\mathcal{T}_i$ is defined by the points 0, $R_{i-1}$ and $R_i$ such that:
- the point O denotes the origin of the X- and Y-axes and coincides substantially with the transmitter TX (31) of the group 3 under consideration;
- the point $R_i$ substantially denotes the location of the receiver $RX_i$ (situated to the right of the axis of symmetry);
- the point $R_{-1}$ substantially denotes the location of the neighbouring receiver $RX_{i-1}$ (receiver adjacent to $RX_i$ situated between the axis of symmetry and $RX_i$).

The surface area of the triangle $\mathcal{T}_i$, denoted $\mathcal{A}ire(\mathcal{T}1)$, corresponds to the product of the base $(x_i-x_{i-1})$ and the height D of the triangle $\mathcal{T}_i$ divided by 2, that is to say $((x_i-x_{i-1})D/2)$, that is to say to half the product $(x_i-x_{i-1})D$ of the left-hand term of equation (8). The angle $\theta_i$ denotes the insonification aperture angle of the transmitter toward $RX_i$. Equation (8) may therefore be reworded as following equation (9):

$$\mathcal{A}ire(\mathcal{T}1)/\cos(\theta_i)=R_{mono}^2/2 \tag{9}$$

Equation (9) is equivalent to equation (8). The right-hand term of equation (9) corresponds to half the surface area of a square $\mathcal{S}$ of side $R_{mono}$ ($\mathcal{A}ire(\mathcal{S})=R_{mono}^2$).

Thus, according to some embodiments, for a given group, the surface area, $\mathcal{A}ire(\mathcal{T}1)$ of a reference triangle $\mathcal{T}_i$ formed by the transmitter 31 of the group and the two adjacent receivers $RX_i$, $RX_{-i}$ (different from the receivers of the reference pair of the group) divided by the cosine of the half aperture angle $\theta_i$ of the triangle $\mathcal{T}_i$ on the transmitter 31 may be equal to half the surface area $\mathcal{A}ire(\mathcal{S})$ of a square $\mathcal{S}$ having a side equal to the minimum range of the equivalent monostatic sonar $R_{mono}$. Such an arrangement of the detection system 100 makes it possible to achieve maximum coverage of the blind zones of the group under consideration, with fault redundancy, and to detect the worst threats in the worst environmental conditions for which the range of the equivalent monostatic sonar is $R_{mono}$.

The positioning of the receivers other than the receivers of the reference pair of the group may thus be such that the term $\mathcal{A}ire(\mathcal{T}1)/\cos(\theta_i)$ is constant. As $D_{TRX_i}$ depends on the unknown $x=x_i$, it is possible to solve the equation numerically, by using the following equation (10):

$$x^4-2x_{i-1} \cdot x^3+(D^2+x_{i-1}^2) \cdot x^2-2D^2 \cdot x_{i-1} \cdot x+D^2 \cdot x_{i-1}^2-R_{mono}^2=0 \tag{10},$$

with as initial condition on $x_1=R_{mono}^2/D_{TRX_1}$.

By positioning the receivers, other than the receivers of the reference pair, according to equation (10), the blind zones are minimized and the detection system is robust to faults.

The receivers $RX_i$ on each side of the axis of symmetry may thus be positioned iteratively starting from the position of the first receiver ($|i|=1$), and then by iteratively placing each receiver $RX_i$ according to the previous receiver $RX_{i-1}$ with respect to the axis of symmetry, by solving equation (10) above. The positioning of the receivers $RX_i$, other than the receivers of the reference pair $RX_1$ and $RX_{-1}$, thus depends on the position of either one of the receivers of the reference pair.

In an iterative positioning mode, the difference $(x_i - x_{i-1})$ between the abscissa $x_i$ of the i-th receiver $RX_i$ and the abscissa $x_{i-1}$ of the (i−1)-th receiver $RX_{i-1}$ may therefore be calculated iteratively from $x_1$, all of the distances $x_i$ for i=2 to n being iteratively determined for a set of 2n receivers, the last distance $x_n$ being able to be determined from the equation $D_{TRX_n} \cdot (x_n - x_{n-1}) = R_{mono}^2$.

Each following receiver $RX_i$ is thus associated with a triangle $\mathcal{T}_i$ similar to the triangle of FIG. 7B having a surface area $\mathcal{A}ire(\mathcal{T}1)$ in a similar way. The positioning of a given receiver $RX_i$, other than the receivers of the reference pair, thus depends only on the position of the previous neighbouring receiver $RX_{i-1}$ (between the axis of symmetry 33 and the receiver under consideration) and on the bearing aperture angle $\theta_i$ of the transmitter to the receivers i, and may therefore be performed iteratively. Advantageously, in applications of the invention requiring the same property of redundancy and absence of detection gap between all of the receivers, the positioning of the receivers $RX_i$ is such that the term $\mathcal{A}ire(\mathcal{T}1)/\cos(\theta_i)$ is equal to a constant value A regardless of the index i, the value A being the same for all of the receivers, and corresponding to the value $R_{mono}^2/2$ (that is to say $A = R_{mono}^2/2$).

Thus, in some embodiments, for a linear configuration of at least one receiver layer of the group, the receivers $RX_i$ of this layer may be arranged such that the following relationship is satisfied:

$$\mathcal{A}ire(\mathcal{T}1)_{/\cos(\theta_1)} = \mathcal{A}ire(\mathcal{T}1)_{/\cos(\theta_i)} = \mathcal{A}ire(\mathcal{T}n)_{/\cos(\theta_n)} = A = R_{mono}^2/2 \quad (11)$$

If the detection area 300 of the detection system 100 satisfies the same property of redundancy and absence of detection gap throughout, it is notably possible to use equation 11 to determine the value of the minimum necessary detection radius of the equivalent monostatic sonar $R_{mono} = \sqrt{2 \cdot \mathcal{A}ire(\mathcal{T}i)/\cos(\theta_i)}$ regardless of the index i of the receiver under consideration.

Such an intra-receiver spacing makes it possible to detect any type of threat 10, even the most critical ones (in terms of size and speed), in a continuous barrier and without a blind zone, with a sufficient reaction time, given the maximum speed of the threat, and that even guarantees continuity of operation in the event of a defect with a receiver 32, if the defective receiver is surrounded by 2 operating receivers. The detection area corresponding to the position of this defective receiver then forms the detection limit. Specifically, according to equation 11, the detection areas of two neighbouring receivers along the axis of the receivers overlap there. The line formed by the receivers then therefore forms the detection limit.

If the transmitter 31 is not omnidirectional but has bearing directivity toward the sea (as illustrated for example by FIG. 4), it should be noted that such directivity may furthermore be taken into account in order to determine the optimized corresponding distance between the receivers. Any linear or partly circular layer may advantageously use a directive transmitter. By contrast, any completely circular layer may advantageously use an omnidirectional transmitter. The width of the elevational lobe is narrower than that of the bearing lobe in order to perform elevational insonification as far as possible, without excessively creating reverberation at the interfaces, while at the same time insonifying a sector with a wide bearing. A suitable directive transmitter may thus be higher than it is wide. Such a transmitter may be modeled, as in the figures, by a rectangle of vertical length and smaller horizontal width, typically a vertically positioned transmission column of width l.

The bearing directivity is represented by a cardinal sine denoted sin c such that:

$$\sin c(\Theta) = \sin(\Theta)/\Theta \text{ With: } \Theta = (\pi l/\lambda)\cdot\sin(\theta)$$

The loss at 3 dB corresponding to $\sin c = 1\sqrt{2}$ is approximately $\Theta = 0.44\pi$.

The transmission level $SL(\theta)$ therefore reduces with respect to its maximum level in the axis according to:

$$SL(\theta) = SL0 + 10 \log(\sin c^2(\Theta)) = SL0 + 20 \log\left(\left|\sin c\left(\frac{\pi * 0.44 \sin\theta}{\sin(\theta_{3dB})}\right)\right|\right) \quad (12)$$

The value of $\theta_{3\,dB}$, if it is reached $+/-\pi/2$, is such that: $\sin(\theta_{3\,dB}) = 0.44\lambda/l$ for a geometric average frequency between fmin and fmax.

For this center frequency, equation (12) then becomes, for a propagation in K log R, that is to say:

$$K \log OR_1 + K \log 2x_1 = K \log R_{mono}^2 + 10 \log(\sin c^2\Theta_1)$$

It should be noted that, to determine the inter-receiver distance $x_1$, taking into account the bearing directivity of the transmitter and a propagation in K log R, it is enough to replace $R_{mono}$ with a lower equivalent monostatic range taking into account the reduced insonification $R_{mono}(\theta_1)$, such that:

$$R_{mono}(\theta_1) = R_{mono} \cdot |\sin c(\Theta_1)|^{20/K} \text{ With } \Theta_1 = \quad (13)$$

$$\pi l/\lambda \sin(\theta_1) \text{ or } \Theta_1 = \frac{\pi * 0.44 \sin\theta}{\sin(\theta_{3dB})}$$

As this directivity is still however relatively wide, and used mainly to insonify in its main lobe, it is possible to determine an approximation of the cardinal sine of the theoretical directivity by a cosine lobe of the bearing aperture angle, that is to say:

$$SL = SL0 + 10 \log(\cos^2(\pi/4 \cdot \theta/\theta_{3\,dB}))$$

On the graph of FIG. 5 for example, it is possible to observe a bearing aperture angle $\theta_{3\,dB}$ at 3 dB of the order of $\pi/4$ for 6.5 kHz.

For this center frequency, equation (12) then becomes:

$$K \log OR_1 + K \log 2x_1 = K \log R_{mono}^2 + 10\cdot\log(\cos^2(\pi/4\cdot\theta/\theta_{3\,dB}))$$

It is observed, if the propagation is in 20 log R, that is to say K=20 and $\theta_{3\,dB} = \pi/4$, that equation (13) may be further simplified as follows:

$$OR_1 + 2x_1 = R_{mono}^2 \cos(\theta_1) \quad (14)$$

with $OR_1 = (x_1^2 + D^2)^{1/2}$ and $\cos(\theta_1) = D/OR_1$

By posing $X=x_1/D$ and $\rho_m=R_{mono}/D$, the equation becomes:

$$X^3+X-\rho_m^2 32\ 0 \tag{15}$$

There is a unique real solution for reduced third-degree equation (15) that is advantageously analytical:

$$X = x_1/D = \left(\frac{\rho^2 m}{4}+\sqrt{\frac{1}{27}+\frac{\rho^2 m}{16}}\right)^{1/3} - \left(\frac{\rho^2 m}{4}-\sqrt{\frac{1}{27}+\frac{\rho^2 m}{16}}\right)^{1/3} \tag{16}$$

In the particular case in which $$\rho_m = \frac{R_{mono}}{D} = \frac{\sqrt{3}}{2},$$

for which without directivity on transmission $X=0.5$, it becomes:

$$x_1/D = \left(\frac{3}{16}+\sqrt{\frac{1}{27}+\left(\frac{3}{16}\right)^2}\right)^{1/3} - \left(\frac{3}{16}-\sqrt{\frac{1}{27}+\left(\frac{3}{16}\right)^2}\right)^{1/3} = 0.337$$

The difference in spacing between the receivers of the pair of reference receivers, between an embodiment with directivity on transmission and an embodiment without directivity on transmission, is therefore notable and may be determined using the above equations using equations 12 to 16.

According to some embodiments, each detection group 3 may comprise a plurality of layers 300 of receivers (also called "lines" of receivers in linear layer configurations) having a similar general form.

The detection system 100 may comprise at least one group having at least two layers of receivers, each receiver layer being associated with a different reference transmitter-receiver distance $D_{TR}$.

The spacing between two adjacent receivers increases with the reference transmitter-receiver distance associated with the layer. Thus, the larger the reference transmitter-receiver distance $D_{TR}$ for a receiver layer, the larger the inter-receiver distance may be, the layers furthest from the transmitter 31 having the largest inter-receiver distances (distance between two adjacent receivers) and, conversely, the layers closest to the transmitter 31 having the smallest inter-receiver distances (distance between two adjacent receivers). Such an arrangement makes it possible notably to address threats 10 of various indexes with a single detection system.

In some embodiments, the detection system may comprise linear layers of receivers and/or circular layers of receivers, a linear layer comprising receivers that are substantially aligned in a line, a circular layer comprising receivers describing an at least partly circular form.

In one particular embodiment, the group 3 may comprise at least one first linear layer arranged between the transmitter and the infrastructure and at least one second linear layer, the transmitter being arranged between the second linear layer of receivers and the first linear layer of receivers.

Figure 8A:
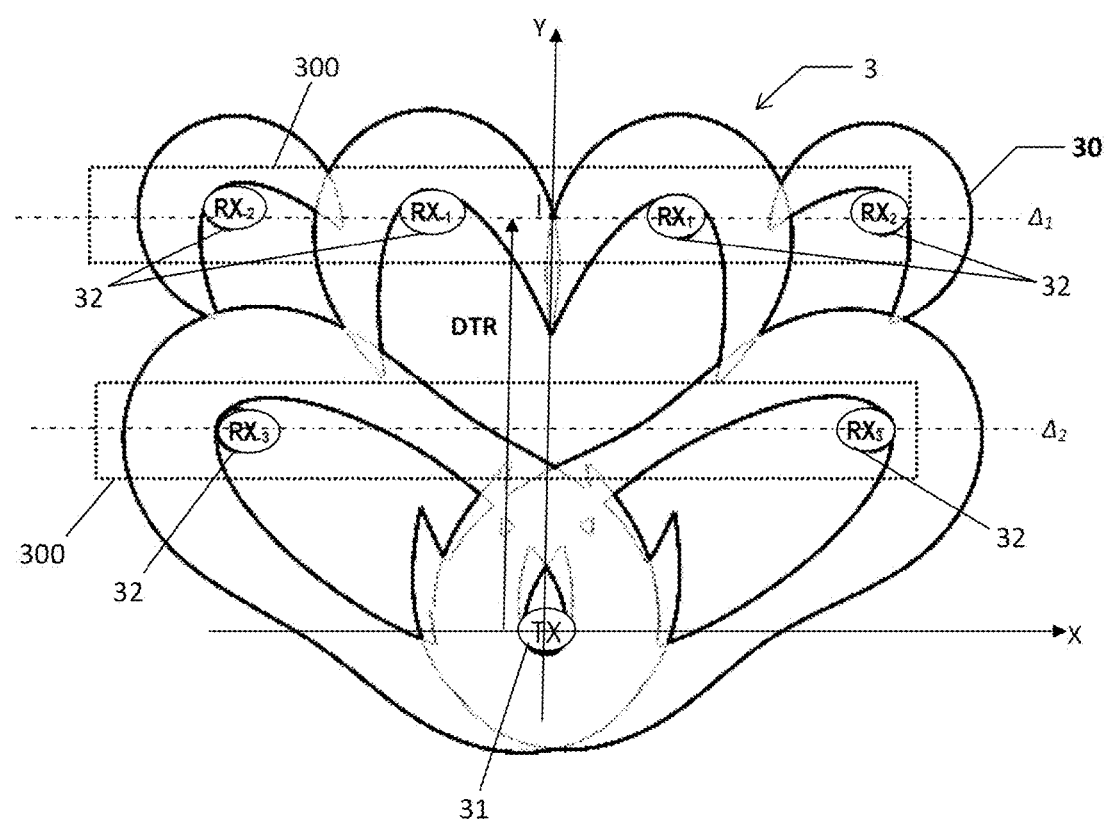
FIG. 8A shows a multilayer detection group having a multilinear configuration, according to one exemplary embodiment with 2 layers of receivers, enabling a tight detection area with only internal detection gaps, without fault redundancy.

FIG. 8A shows a multilayer detection group having a multilinear configuration, according to one exemplary embodiment. In the example of FIG. 8A, the detection group with a multilinear configuration comprises a plurality of lines $\Delta_k$ of receivers that are substantially parallel with one another, each receiver line forming one of the layers of the group. Such a configuration of receivers gives a tight overall detection area 300, with an advantageous spacing of the receivers 32 given their limited range on the corresponding threat, even though the detection area has detection gaps. Such a receiver configuration does not allow continuity of service in the event of a defect with a receiver. However, the second linear layer of receivers on the straight line $\Delta_2$, in comparison with the configuration of FIG. 10, makes it possible to be able to detect a threat after the threat has passed through the straight line $\Delta_2$. This configuration furthermore makes it possible to achieve a single overall limit detection area 300 that is closed and is not formed of areas that are separate from one another, thereby facilitating the orientation of the reaction to be implemented against the threat and/or the relocation of the threat.

Figure 8B:
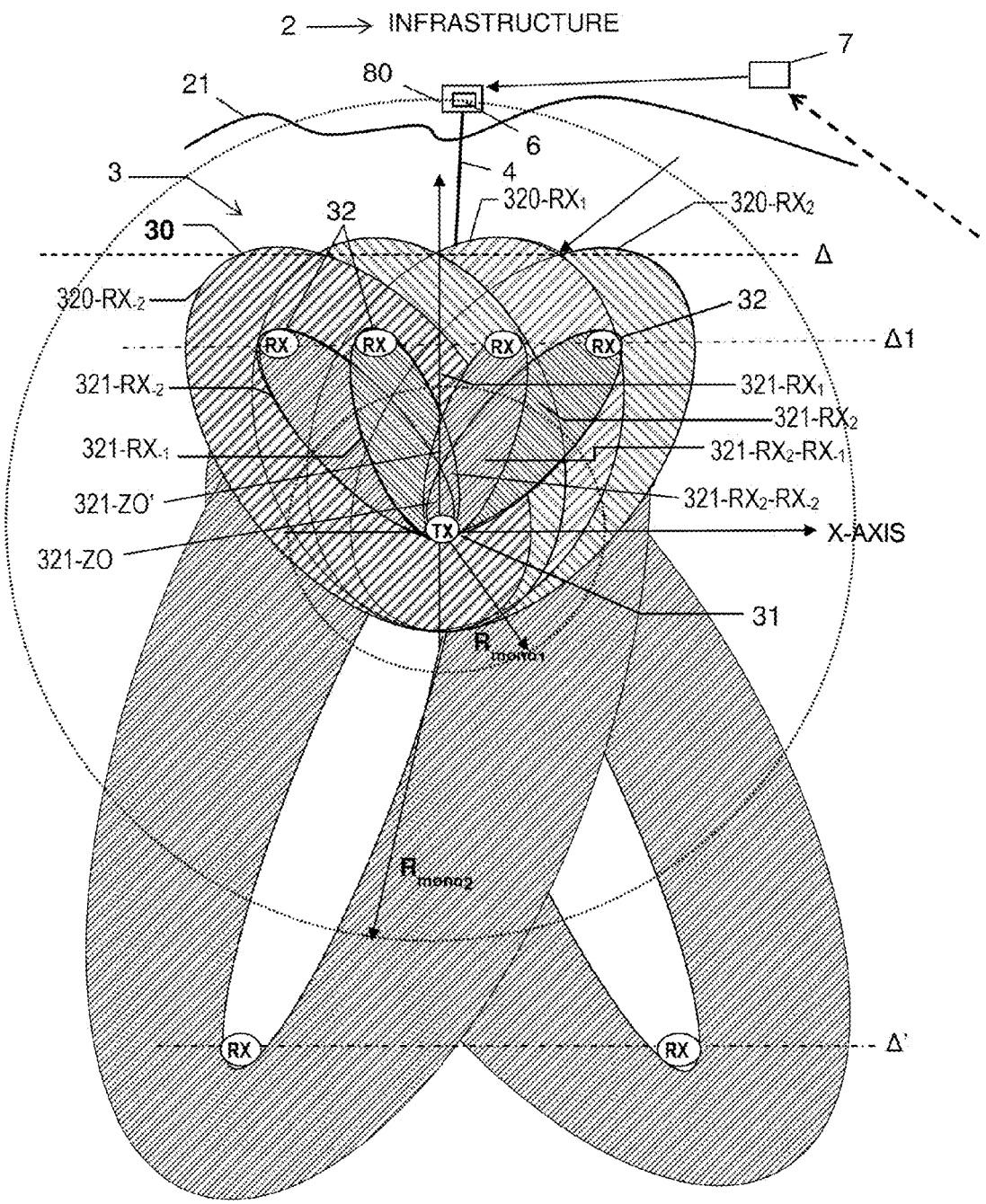
FIG. 8B shows a multilayer detection group having a multilinear configuration, according to one exemplary embodiment with 2 layers of receivers.

FIG. 8B illustrates a multilayer detection group having a multilinear configuration, according to one exemplary embodiment. In the example of this FIG. 8B, the detection group with a multilinear configuration comprises at least two lines $\Delta 1$ and $\Delta'$ of receivers 32 that are substantially parallel with one another, each receiver line $\Delta 1$ and $\Delta'$ forming one of the layers of the group and advantageously being able to be situated on either side of the transmitter 31 with respect to the area to be protected, in particular if the propagation conditions differ while moving gradually away from the coast 21 or from the area 2 to be protected. Thus, the first linear layer $\Delta'$ is arranged between the transmitter 31 and the coast 21 and the second linear layer $\Delta 1$ is arranged downstream of the transmitter 31 toward the sea, and therefore generally at a greater depth, with a slope between the two lines of receivers. The transmitter 31 is arranged between the second linear layer $\Delta 1$ of receivers and the first linear layer $\Delta'$ of receivers so as to achieve an optimum detection area for all of the potential threats in the environment under consideration.

In one embodiment, the inter-receiver distance of the layers may be different from one layer to another in order to detect various types of threat. In particular, the reference transmitter-receiver distance associated with the layers in order to permit the inter-receiver distance of the layers may increase with the reference transmitter-receiver distance associated with the further-away layers so as to allow the layers furthest from the coast 21 to detect threats with a high target index (the fastest threats requiring more significant prior warning), whereas the layers closest to the coast 21 are provided in order to detect threats with a low target index (the slowest threats for which less significant prior warning is sufficient).

The distance between two adjacent receivers of the layers that are furthest from the coast 21 may thus advantageously be greater than the distance between two adjacent receivers of the layers of receivers that are closest to the coast 21. In the example of FIG. 8B, the spacing between two adjacent receivers of the linear layer $\Delta 1$ is less than the spacing between two adjacent receivers of the linear layer $\Delta'$, which may therefore be at a greater distance from one another than on the line $\Delta 1$. The linear layer $\Delta'$ is associated with a circle of monostatic range $\mathcal{C}'$ larger than the range of the linear layer $\Delta 1$ defined by the circle $\mathcal{C}$ that has to detect slower threats with a lower target index and that therefore return a weaker echo. The offshore receivers on the line $\Delta'$ may thus advantageously detect the fastest threats requiring more significant prior warning (threats with a high target index). Such threats may be for example threats equipped with a propulsion device increasing the index of the target and therefore its echo level.

It should be noted that this type of advantage of the configurations of groups with multiple linear layers, which is well-suited to threats of different indexes and to areas having non-isotropic propagation losses, may also be achieved with two completely or partly circular layers.

Figure 9A:
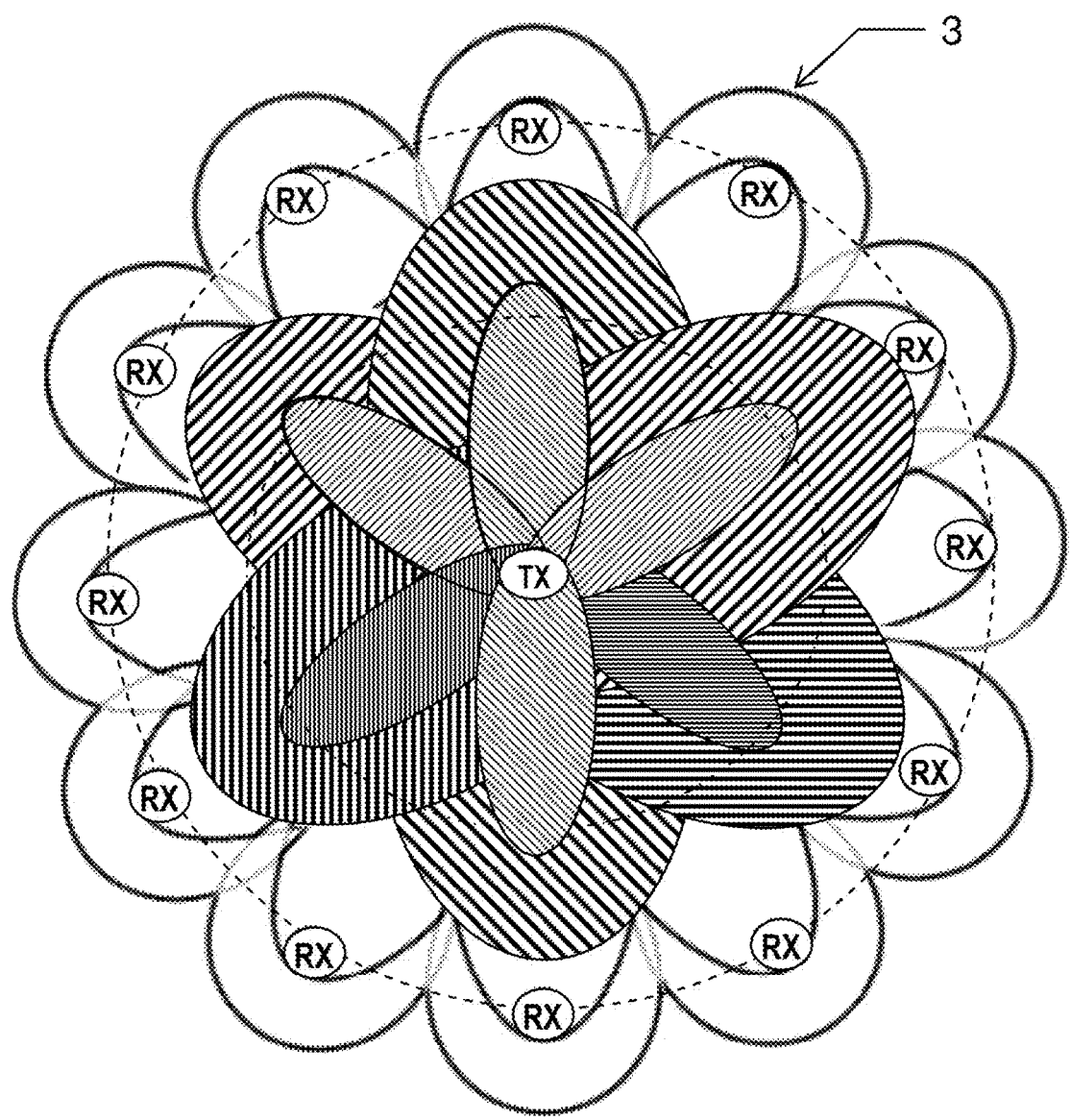
FIG. 9A shows a multilayer detection group having a completely circular configuration, according to one exemplary embodiment.

FIG. 9A shows a multilayer detection group having a completely circular configuration, according to one exemplary embodiment. In the example of FIG. 9A, the detection group with a circular configuration comprises a plurality of concentric layers of receivers, each receiver layer being circular and centered substantially on the transmitter 32 (the layers having different radii). The embodiment of FIG. 9A based on the use of two circles of receivers is suitable for the most difficult threats to detect, and notably allows expanded detection of diver threats if the performance of the TX/RX pair on these threats does not allow a range corresponding to sufficient prior warning with a single layer. The exemplary embodiment of this FIG. 9A allows high coverage redundancy between the elementary detection areas for continuity of service, such redundancy being achieved by the inner layer, the outer layer contributing only very little to this redundancy. The advantage of simultaneous detections by a plurality of receivers is that of allowing better detection probability when the index of the target is not isotropic or in applications of the invention in which it is desirable to detect the target in Doppler with a radial Doppler that is not able to be canceled out at the same time for all of the receivers.

Figure 9B:
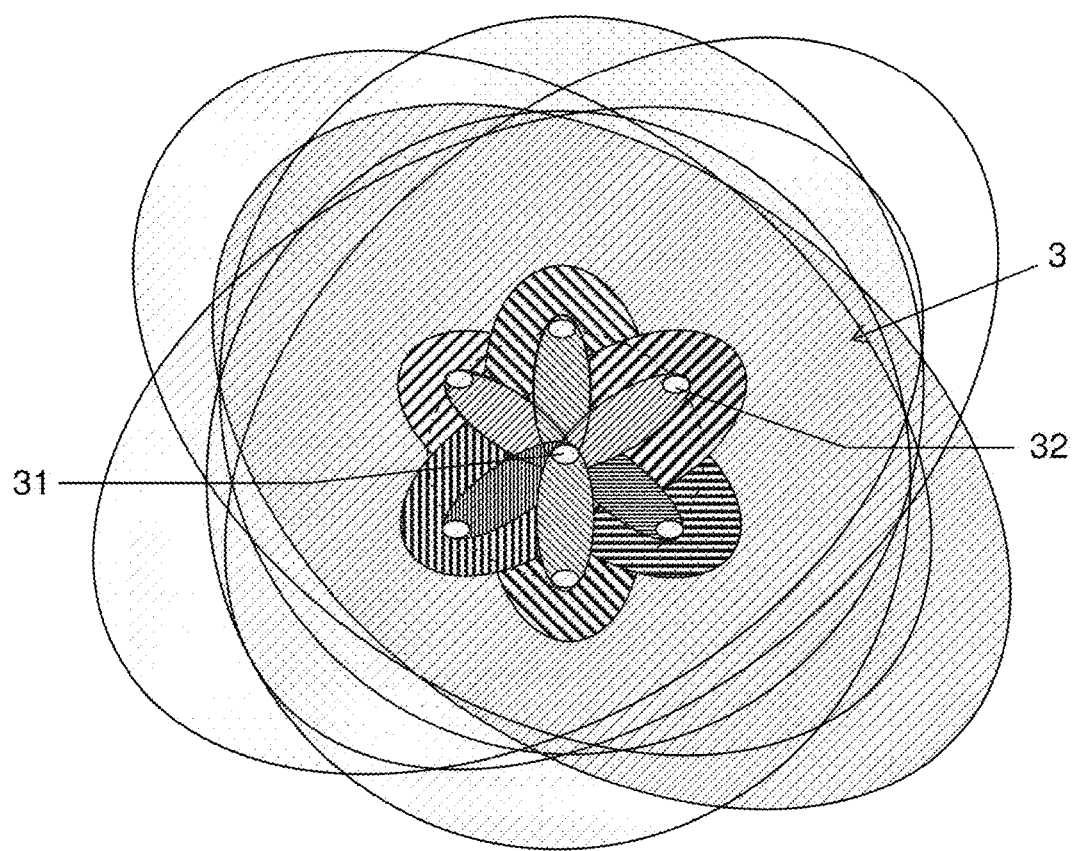
FIG. 9B shows another embodiment of the detection system comprising a detection group with a single layer with a completely circular configuration, showing the detection area for two types of threat.

FIG. 9B shows another embodiment of the detection system comprising a group with a completely circular configuration centered on the transmitter 31 and using a single circle of receivers (corresponding to a single layer) and designed to detect various types of threat. In the example of FIG. 9B, the outermost elementary detection areas are configured so as to detect fast threats, such as threats equipped with propulsion devices, whereas the innermost elementary detection areas are configured so as to detect slower threats with a lower target index, such as divers without devices.

The high coverage of the detection areas between the respective elementary bistatic areas within each of the layers is a significant advantage for detecting targets with a good Doppler radial speed, regardless of the trajectory of the threat.

Figure 9C:
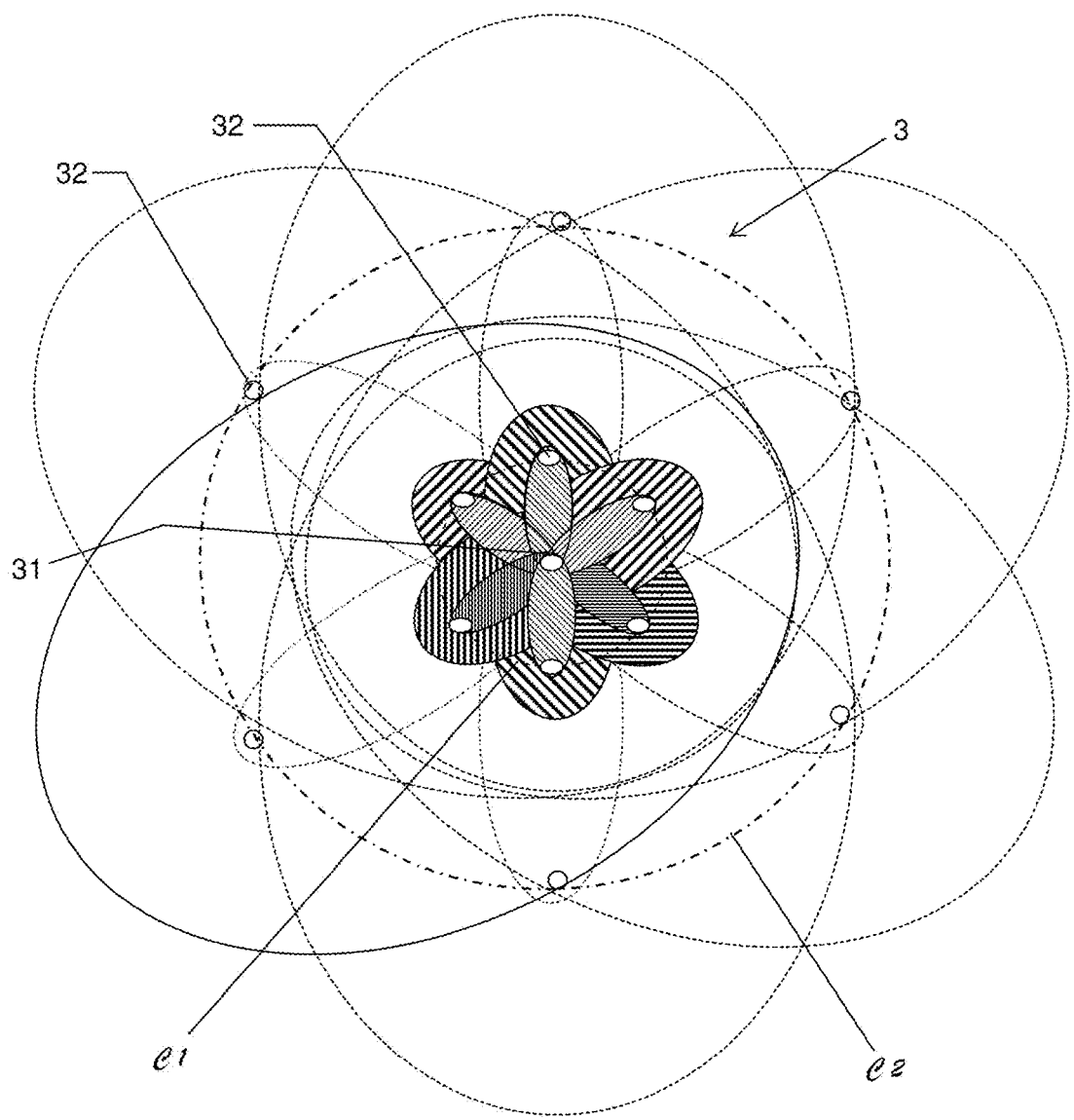
FIG. 9C shows another embodiment of the detection system comprising a group with a completely circular configuration centered on the transmitter and using two layers of receivers each optimized for two types of threat having different ranges.

FIG. 9C shows another embodiment of the detection system comprising a group with a completely circular configuration centered on the transmitter 31 and using two circles of receivers (corresponding to two layers), as in the embodiment of FIG. 9A. In the example of FIG. 9C, the outermost circle of receivers $C_2$ is configured so as to detect fast threats, such as threats equipped with propulsion devices, whereas the innermost circle of receivers $C_1$ is configured so as to detect slower threats, such as divers. In particular:

the inner area of coverage of the inner circular detection area formed by the innermost circle of receivers $C_1$ may be dimensioned similarly to in FIG. 9B for diver threats, which are slow and have a low target index, with redundancy of at least some of the elementary detection areas and an overall detection area 300 without a detection gap, except for the area 321-ZO shown in FIG. 7A;

the outer area of coverage of the outer circular detection area formed by the outermost circle of receivers $C_2$ may be positioned so as to achieve a range greater than that achieved with the configuration of receivers in FIG. 9B, thereby making it possible to achieve the maximum possible range (maximum range) while at the same time complying with the constraint of redundancy and of total coverage of the blind zones of FIG. 7A as defined by equation 4, except for the corresponding area 321-ZO, any point inside the circle formed by the receivers being detected by at least 2 receivers, with different Dopplers.

A person skilled in the art will understand that the invention also applies to partly circular configurations of receivers, the detection system 100 then comprising at least one group having at least one layer of receivers describing a circular arc. Such a group may for example comprise two concentric layers of receivers, each describing a circular arc $C_i$ of radius greater than or equal to an equivalent monostatic range $R_{mono_i}$.

The layers of receivers may have a different number of receivers and/or different intra-receiver distances. In some embodiments, the layers may comprise at least one layer with a multilinear configuration and/or at least one layer with an at least partly circular configuration or else a combination of multilinear layers and of at least partly circular layers.

The layer furthest from the infrastructure denotes the end layer of the system. The range of the protective barrier is linked to the positioning of the line or of the curve linking the receivers of the end layer.

The form described by the receivers 32 of one and the same layer of a multistatic group may be a linear form (straight line for example) or a curved form that may have symmetry about the axis 33.

The layers may have the same axis of symmetry 33.

For one and the same transmitter 31 and one or more contiguous multistatic groups, the detection system 100 may comprise N receivers 32 of range R, or N/2 of range 2/R, over one and the same elementary length of the layer of receivers 32.

Although the description of some embodiments is made primarily with reference to detection groups 3 comprising a single layer of receivers, by way of non-limiting example, a person skilled in the art will understand that the invention is not limited to such an embodiment.

Figure 10:
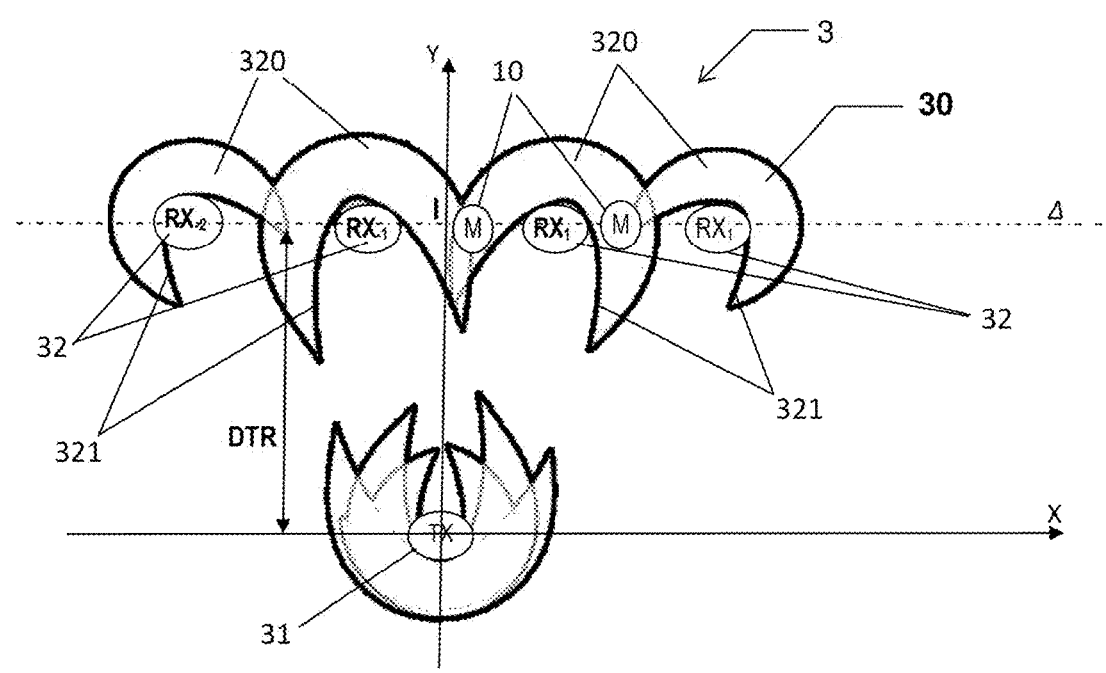
FIG. 10 shows the surface area covered in a multistatic group, according to one exemplary embodiment.

FIG. 10 shows the surface area that is covered in a multistatic group with a configuration identical to FIGS. 2 and 3, but for a threat that is particularly difficult to detect, typically a diver without traction assistance.

In some applications of the invention, there may be provision to detect only slow threats 10 with a very low target index TS. In such applications, it is not necessary to provide a completely tight detection barrier (i.e. without any blind zone). In some embodiments suitable for such applications, the receivers 32 of each multistatic group may be spaced apart, as shown in the example of FIG. 10, such that the multistatic barrier generated by the receivers 32 is far enough away to have a reaction time suitable to implement an intervention on a target M (for example in order to have the time to position a USV in the right direction, knowing that the area of penetration may be far from the control center, the USV then having a conventional DDS relocation means and dissuasion or destruction means), the thickness of the barrier being able to vary.

It may be noted, in this example, that the Cassini ovals are disjunct, this being the case when all of the distances $D_{TRX}$ between the transmitter and the various receivers of FIG. 10 are such that $$\frac{D_{TRX}}{2} > R_{mono}.$$

The distance between the transmitter and the receivers is then far greater than the previous condition of covering the blind zones, thereby ensuring sufficient prior warning.

The alert when the barrier is crossed is enough to react when the target, without traction assistance, is slow. This multistatic group is typically without redundancy or coverage of the blind zones. It forms a system only with other groups, as described below.

Figure 11A:
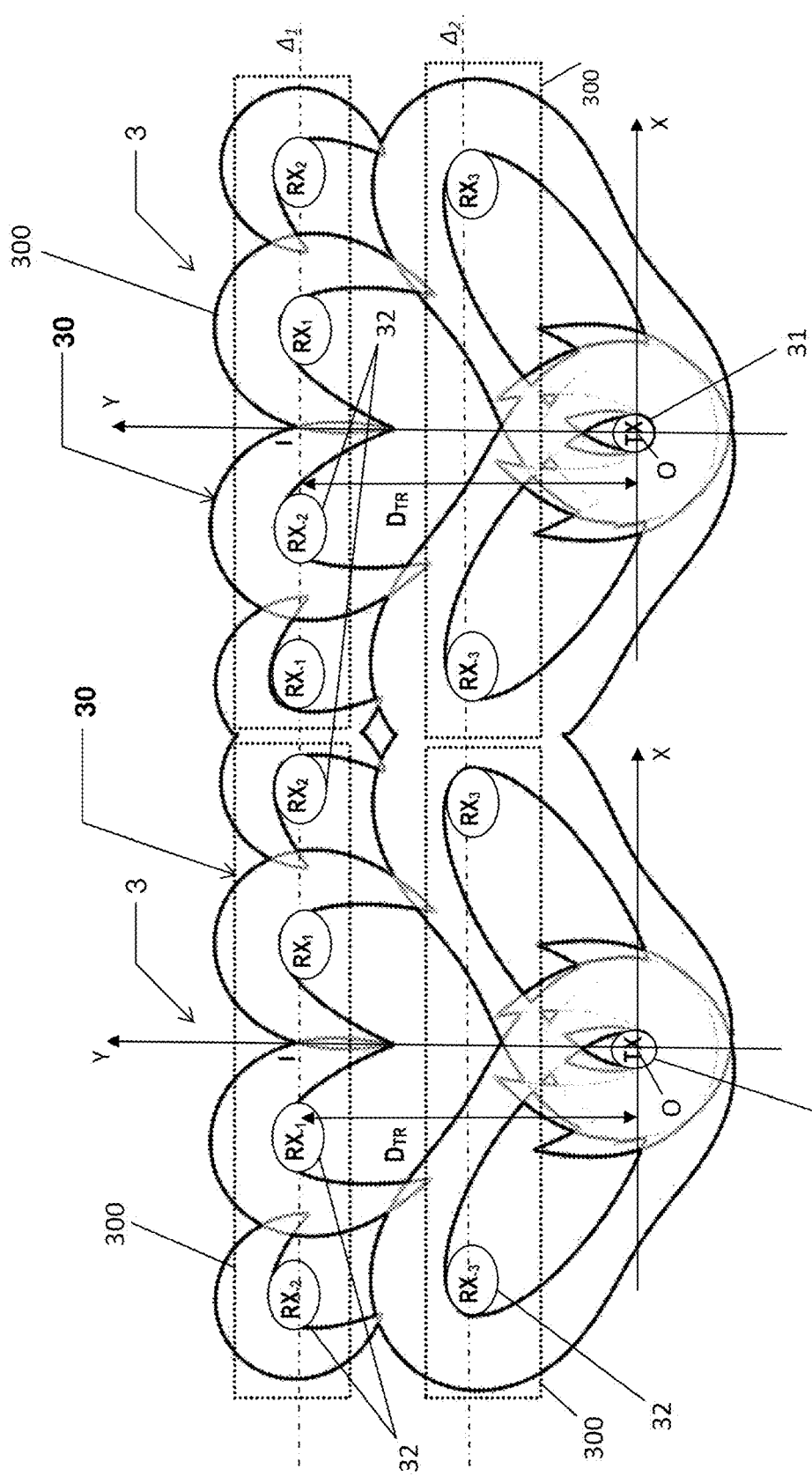
FIG. 11A is a diagram showing a detection system of 2 contiguous multistatic groups, each formed of 2 linear layers of receivers, designed for threats with a low speed and with low target indexes, according to one exemplary embodiment.

FIG. 11A is a diagram showing a detection system 100 comprising 2 contiguous multistatic groups, each formed of two linear layers of receivers, in a multilinear exemplary embodiment bridging part of the area of non-detection of FIG. 10. Such a system is designed for threats with a low speed and with low target indexes. In this embodiment, the system 100 comprises two multistatic groups 3, each group being arranged in two layers 300 in a multilinear configuration. The particular arrangements with 2 layers of receivers 32 (as in the examples of FIGS. 8 and 11A) create a far enough away multistatic barrier that is particularly suitable for threats 10 with a low speed and low TS.

Figure 11B:
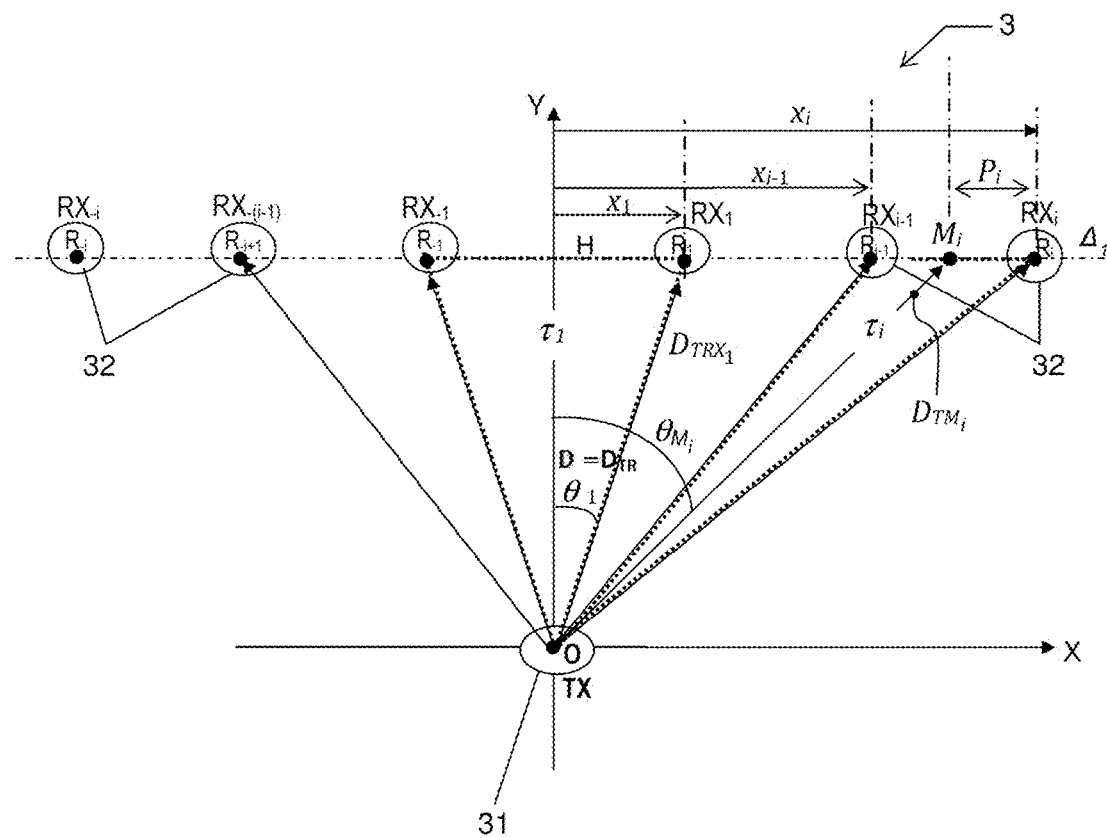
FIG. 11B is a diagram showing a detection system with a linear layer, according to one exemplary embodiment.

FIG. 11B is a diagram showing a detection system designed for threats with a low speed and with low target indexes, according to another exemplary embodiment.

In the remainder of the description, reference will be made to the notations used for such a tight linear configuration, in which detection "gaps" (or inner areas of non-detection) may exist, as indicated in FIG. 11B.

In such embodiments, the midpoint H of coordinates (0, $D_{TR}$) that corresponds to the intersection of the axis of the ordinates OY (coinciding with the axis of symmetry 33) and of the line formed by the receivers 32 of a linear layer may advantageously belong to the curve defined by the range equation of the first receiver $RX_1$ (32) with respect to the axis of symmetry (respectively $RX_{-1}$ by symmetry) in order to guarantee tightness of the minimum protection. The equation of the Cassini oval of $RX_1$ is defined by any point M such that: $TL(TM)+TL(MRX1)<2\ TL(R_{mono})$, M being inside the Cassini oval in the event of strict inequality and on the Cassini oval in the event of equality.

Therefore, the range equation of the first receiver with respect to the axis of symmetry $RX_1$ (respectively $RX_{-1}$ by symmetry) for a point M of coordinates M(x, y) is described by:

$$K \cdot \log((x^2+y^2)^{0.5}) + K \cdot \log((x-x_1)^2 + (y-D_{TR})^2)^{0.5}) < 2 K \cdot \log(R_{mono}) \quad (17)$$

In FIG. 11B, the distance $D_{TR}$ corresponds, as before, to the distance between the axis of the receivers and the transmitter. The desired condition being that a threat M of coordinates (0, $D_{TR}$) is on the range curve of $RX_1$ in "RX as TX" mode, it becomes:

$$\log((0^2+D_{TR}^2)^{0.5}) + \log((0-x_1)^2+(D_{TR}-D_{TR})^2)^{0.5}) = 2 \cdot \log(R_{mono}) \quad (18)$$

that is to say:

$$\log((D_{TR}^2)^{0.5}) + \log(x_1^2)^{0.5}) = 2 \cdot \log(R_{mono}) \quad (19)$$

Equation (19) is also written as:

$$\log(D_{TR}) + \log(x_1) = 2 \cdot \log(R_{mono}),$$

that is to say $\log(D_{TR} \cdot x_1) = \log(R_{mono}^2)$

This gives:

$$D_{TR} \cdot x_1 = R_{mono}^2 \quad (20)$$

That is to say:

$$x_1 = R_{mono}^2/D \quad (21).$$

In equation (21), $D=D_{TR}$ denotes the distance between the transmitter and the line formed by the reference receivers (as shown for example in FIG. 3 or 11B).

Equation (20) corresponds to applications of the detection system without redundancy or coverage of the blind zones of the neighbouring receivers.

Equation (21) is equivalent to equation (20).

Equations (20) and (21) correspond to a situation of overlapping of the detection areas of two adjacent receivers, such that the point of overlap furthest from the transmitter coincides substantially with the point H shown in FIG. 11B, this point H being the middle of the segment defined by the adjacent receivers $RX_{-1}$ and $RX_1$.

The overlap condition expressed by equations (20) and (21) is different from the overlap condition expressed by equation 1, which requires adjacent receivers that are closer to one another. In the case of equation 1, the boundary of the detection area of a given receiver passes through the neighbouring adjacent receivers, while at the same time covering the part of their blind zones situated around these neighbouring receivers. The configuration of the receivers according to equation (1) also makes it possible to ensure fault redundancy for any receiver surrounded by two neighbors on either side.

Equation (21) may also be interpreted geometrically in terms of surface area, the product $x_1 D$ corresponds to the product of the base length $x_1$ and the height D of the triangle $\mathcal{T}_1$ whose apexes are the points 0, $R_1$ and $R_{-1}$ defined as above where:

the point O denotes the origin of the reference frame whose axis is the X-axis (abscissa axis) and the Y-axis (ordinate axis) and coincides substantially with the transmitter TX (31) of the group, the point $R_1$ coincides substantially with the location of the receiver RX1 of the reference pair, and the point $R_{-1}$ coincides substantially with the location of the receiver $RX_{-1}$ of the reference pair.

The surface area, denoted $\mathcal{A}ire(\mathcal{T}1)$ (or $\mathcal{A}ire(\mathcal{T})$), of the triangle $\mathcal{T}_1$ corresponds to half the product $2x_1 D$ of the left-hand term of equation (21). Equation (21) may therefore be reworded as following equation (22):

$$\mathcal{A}ire(\mathcal{T}) = R_{mono}^2 = \mathcal{A}ire(\mathcal{S}) \quad (22)$$

Equation (13) is equivalent to equation (12). The right-hand term of equation (13) corresponds to the surface area of a square $\mathcal{S}$ of side $R_{mono}$ ($\mathcal{A}ire(\mathcal{S}) = R_{mono}^2$).

Thus, according to some embodiments, for a given group, the surface area $\mathcal{A}ire(\mathcal{T})$ may be equal to the surface area $\mathcal{A}ire(\mathcal{S})$ of a square $\mathcal{S}$ having a side equal to the minimum range of the equivalent monostatic sonar $R_{mono}$, that is to say $\mathcal{A}ire(\mathcal{T}) = \mathcal{A}ire(\mathcal{S})$, with:

$\mathcal{A}ire(\mathcal{T})$ denoting the surface area of the reference triangle $\mathcal{T}$ defined similarly to the reference triangle in FIG. 7B, by the triangle formed by the transmitter and the 2 receivers $RX_1$ and $RX_{-1}$.

Such an arrangement of the multistatic group 3 makes it possible to achieve a tight linear detection area at least along the axis formed by the receivers 32 situated at a distance D from the transmitter, without coverage of the blind zones of the group or fault redundancy, and to detect all threats, including the worst threats in the worst range environmental conditions of the equivalent monostatic sonar $R_{mono}$.

In such an embodiment, as $D_{TRX_1}$, depends only on the unknown $x_1$.

The distance $x_1$ of a receiver of the reference pair from the axis of symmetry 33 may thus be at least equal to the value given by equation (25).

Note should also be taken of the following variations depending on the value of $D=D_{TR}$ with respect to $R_{mono}$:

If $D=R_{mono}$, D being the distance between the transmitter TX and the line of receivers, then the distance $x_1$ is equal to D;

If $D = 2/\sqrt{3} * R_{mono}$ then $x_1 = \frac{D\sqrt{3}}{2}$.

The spacing between either one of the 2 reference receivers ($RX_1$ or $RX_{-1}$) and the axis of symmetry is increasingly small while the barrier extends increasingly further (out to sea), depending on the compromise between the range and the barrier surface area necessary for the worst threats, with a potentially tight barrier but an increase in areas of non-detection between the transmitter and the line formed by the receivers.

More generally, it results, from the previous characteristics, that the distance $x_1$ of a receiver of the reference pair from the axis of symmetry 33 may take all possible values, between the value $x_{1_{min}}$ (corresponding to the value of equation 22) and the value $x_{1_{max}}$ (corresponding to the value of equation 25), depending on the desired compromise between the inter-receiver distance and the coverage of the detection areas, while at the same time guaranteeing a continuous detection area downstream of the rectilinear line or of the curve formed by the receivers, that is to say:

$x_{1_{min}} \le x_1 \le x_{1_{max}}$, with $x_{1_{min}} = \frac{D}{\sqrt{2}} \cdot \sqrt{\sqrt{1 + \left(\frac{R_{mono}}{D}\right)^4} - 1}$, and $x_{1_{max}} = \frac{R_{mono}^2}{D}$ Considering the same overlap constraint of the detection areas for the following receiver $RX_2$, separate from the receivers of the reference pair, a threat M situated between the receivers $RX_1$ and $RX_2$ of coordinates (x, $D_{TR}$), M having an abscissa x, will be detected by the receivers $RX_1$ and $RX_2$ if the elementary detection areas of these receivers overlap at this point and therefore:

$Log((x^2+D_{TR}^2)_{0.5})+\log((x-x_1)^2+(D_{TR}-D_{TR})^2)^{0.5})=2 \log(R_{mono})$, which defines the detection of such a point M by $RX_1$.

$Log((x^2+D_{TR}^2)^{0.5})+\log((x-x_2)^2+(D_{TR}-D_{TR})^2)^{0.5})=2 \log(R_{mono})$, which defines the detection of such a point M by $RX_2$.

The above equations give:

$D_{TRX'}(x-x_1)=R_{mono}^2$ $D_{TRX'}(x_2-x)=R_{mono}^2$

Therefore, in such an embodiment, the point M of overlap is in the middle between $RX_1$ and $RX_2$.

The geometric positioning condition of the receiver $RX_2$ of abscissa $x_2$ is therefore written:

$D_{TM2'}(x_2-x_1)/2=R_{mono}^2$, Equation (26)

$M_2$ being the abscissa point $x=(x_1+x_2)/2$, in other words the middle $M_2$ of the segment linking the receivers $RX_1$ and $RX_2$.

By iteration, the abscissa $x_i$ of each receiver $RX_i$ may be determined iteratively depending on the abscissa $x_{i-1}$ of the previous receiver with respect to the axis of symmetry, according to the following equation, by $D_{TMi'}(x_i-x_{i-1})/2=R_{mono}^2$ (27)

The solution to this equation (27) provides a solution without redundancy or coverage with $M_i$ the middle of the segment linking the receivers $RX_i$ and $RX_{i-1}$ as indicated in FIG. 11B.

It should be noted that this formula (27) is separate from formula (7), which involves the distance $D_{TRX_i}$ (distance between TX and $RX_i$) and not the distance $D_{TRM_{i-1,i}}$ (distance between TX and $X_m$, middle of the segment linking the receivers $RX_i$ and $RX_{i-1}$), which is smaller. The distance $x_i-x_{i-1}$ between the two receivers $RX_i$ and $RX_{i-1}$, given by equation (25), is therefore greater, thereby making it possible to optimize the number of receivers while at the same time keeping the tightness of the barrier, in spite of the lack of redundancy and the non-maximum coverage.

Equation (27) may be interpreted in terms of surface area, like equation 8.

FIG. 11B is a geometric view of a multistatic group 3 comprising a linear receiver layer. It shows the triangle $\mathcal{T}_i$ defined as above in FIG. 7B (with apexes O, $R_{i-1}$ and $R_i$). It should be noted that the angle $\theta_{Mi}$ is a smaller angle than the angle $\theta_i$ in FIG. 7B. More precisely, the angle $\theta_{Mi}$ represents the angle between the axis of symmetry 33 (coincident with the Y-axis) and the axis passing through O (point corresponding to the location of the transmitter TX) and through the point at the point $M_i$ corresponding to the middle of the segment defined by the points $R_{i-1}$ (corresponding to $RX_{-1}$) and $R_i$ (corresponding to $RX_i$). The angle $\theta_{Mi}$ thus satisfies the relationship:

$\cos(\theta_{Mi})=D/D_{TRM_i}$ (28)

the distance $D_{TM_i}$ denoting the distance between the point 0 coinciding with the transmitter TX and the midpoint $M_i$.

Equation (27) may thus be expressed on the basis of the area of the triangle $\mathcal{T}i$ as follows:

$\mathcal{A}ire(\mathcal{T}i)_{/\cos(\theta_{Mi})}=R_{mono}^2$ (29)

The arrangement of the receivers/transmitter of each linear layer of a multistatic group may thus be configured by applying the following formula, notably in applications not requiring continuity of service in the event of a fault with some receivers (these possibly being able to be replaced quickly) and being able to tolerate blind zones in the detection area of the group when the reaction means have their own target relocation ability:

$\mathcal{A}ire(\mathcal{T}1)_{/\cos(\theta_{M1})}=\mathcal{A}ire(\mathcal{T}i)_{/\cos(\theta_{Mi})}=$ $\mathcal{A}ire(\mathcal{T}n)_{/\cos(\theta_{Mn})}=$Constant$=R_{mono}^2$ (30)

It should be noted that, in the particular case of the midpoint between $RX_{-1}$ and $RX_1$, this leads to $\theta_{M1}=0$ or $\cos(\theta_{M1})=1$ (the point M1 then coinciding with the point H in FIG. 11B).

As $D_{TM_i}$ depends on $x_{i-1}$ and on the unknown $x=x_i$, equation (27) may be solved numerically as follows:

$$\left(D^2 + \left(\frac{(x+x_{i-1})}{2}\right)^2\right) \cdot \left(\frac{(x-x_{i-1})}{2}\right)^2 = R_{mono}^4$$

That is to say by posing $X=x_i/x_{i-1}$:

$$X^4 + \left(\frac{4D^2}{x_{i-1}^2} - 2\right) \cdot X^2 - \frac{8D^2}{x_{i-1}^2} \cdot X^2 - \frac{4D^2}{x_{i-1}^2} + 1 - \frac{16R_{mono}^4}{x_{i-1}^4} = 0 \quad (31)$$

Thus, in applications of the invention not requiring redundancy for continuity of operation in the event of a defect with one of the receivers 32, the abscissa $x_i$ of the i-th receiver $RX_i$ may be determined according to equation (31) iteratively on the basis of $x_{i-1}$ between $x_i$ and the abscissa $x_{i-1}$ of the previous adjacent receiver $RX_{i-1}$, which are situated on the same side of the group 3 with respect to the axis of symmetry (i being a positive or negative integer; if i is negative, depending on the chosen notation convention, |i−1| and |i| will be considered), and of double the square of the radius of the equivalent monostatic sonar $2R_{mono}^2$ and of the distance $D_{TRM_i}$ between the transmitter and the point $M_{i-1,i}$ situated in the middle of the segment $[RX_{-i}, RX_i]$ according to equation (28), with, as initial condition:

$$x_1 = R_{mono}^2/(D)$$

The detection group 3 may thus detect, over a wide detection area (with or without detection gaps depending on the desired mode of application of the invention), the most critical threats between the transmitter 31 and the line of receivers 32, the line of receivers itself forming a tight barrier.

The receivers $RX_i$ on each side of the axis of symmetry may thus be positioned iteratively starting from the position of the first receiver (|i|=1), and then by iteratively placing each receiver according to the previous receiver with respect to the axis of symmetry.

It should be noted that, as the hypotenuse $D_{TRX_i}=(x_i^2+D_{TR}^2)^{0.5}$ increases as the receivers move away from the axis of symmetry (for $D_{TRX_i}$ corresponding to the distance of the transmitter 31 and the receiver $RX_i$), in one embodiment, the distance between 2 neighbouring receivers $(x_i - x_{i-1})$ decreases with the distance of the receivers from the axis of symmetry. Thus, for N=2p receivers (p receivers on each side of the axis), for positive p:

$$(x_p - x_{p-1}) < (x_{p-1} - x_{p-2}) < \ldots < (x_2 - x_1) \text{ and}$$

for negative p with p=−|p|, it becomes $$(x_{-|p|} - x_{-(|p|-1)}) < (x_{-(|p|-1)} - x_{-(|p|-2)}) < \ldots < (x_{-2} - x_{-1})$$

In some embodiments, the number of receivers in a given multistatic group 3 may correspond to the minimum number that makes it possible to achieve a barrier that is as long as possible while at the same time having a continuous thickness enough to make it possible, regardless of the threats, to have a classification time sufficient to trigger and implement a predefined reaction according to need and protection capabilities.

The barrier length represents the longest length of the detection area along the axis $\Delta 1$ formed by the line of the receivers of the detection system, in a direction perpendicular to the axis of symmetry 33.

The thickness of the barrier represents the shortest distance of the detection area, in the direction defined by the axis of symmetry 33. It thus corresponds to the shortest distance of the detection area that a detected threat is able to breach. This distance defines the detection time, given the speed of the threat is an important parameter of the detection system (dependent on TS). The thickness of the barrier should be great enough to allow the detection and the classification of any type of threat when the barrier is breached by the threat, while at the same time guaranteeing an appropriate reaction time.

Figure 12:
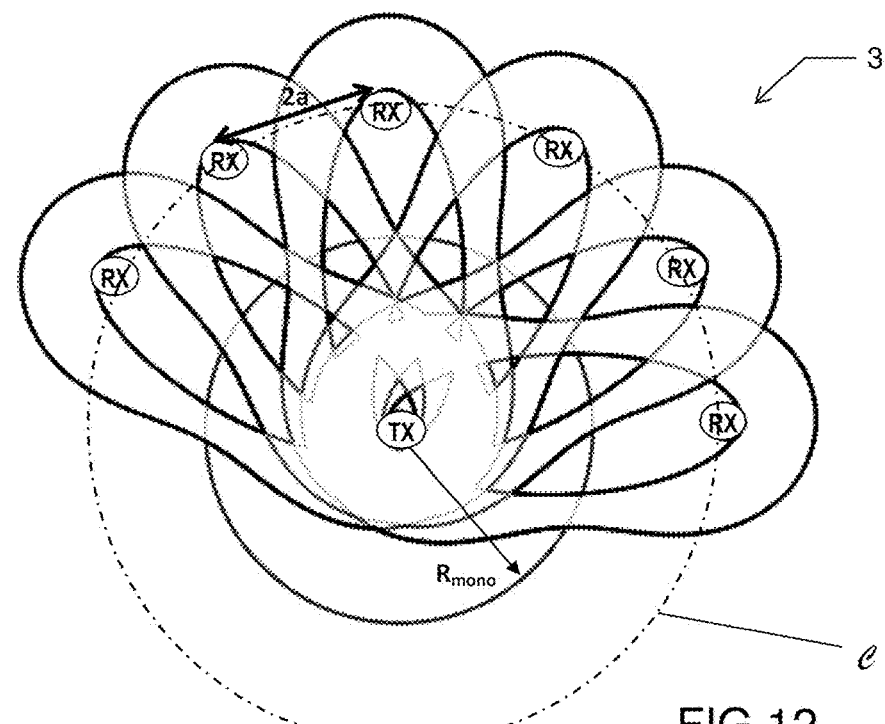
FIG. 12 shows one example of a partly circular detection group, according to one embodiment.

FIG. 12 shows one example of a detection group 3, according to an embodiment in which the receivers 32 are arranged in a circular configuration of a circle $\mathcal{C}$:

In such an embodiment, the reference inter-receiver distance $2a$ may be determined from the square $R_{mono}^2$ of the detection radius $R_{mono}$ of the equivalent monostatic sonar and in this case of the radius $R > R_{mono}$ of the circular form $\mathcal{C}$ described by the receivers 32, which is equal to all of the $D_{TRX_i}$.

In particular, the reference inter-receiver distance $d_{inter}=2a$ (as illustrated in FIG. 12) may correspond to all of the solutions between $R_{mono}^2/R$, corresponding to conditions in which the detection area of a given receiver extends as far as the two adjacent receivers (as expressed by equation (1)), and $2R_{mono}^2/D$ corresponding to the overlap of the detection areas of the adjacent receivers only in the middle of the chord linking the two adjacent receivers (as expressed by equation (20)):

$$R_{mono}^2/R \leq d_{inter} \leq 2R_{mono}^2/D$$

with D corresponding here to the distance between the transmitter and the segment linking the 2 adjacent receivers, with $D = R \cos \theta_1$ and R the distance between the transmitter and one of the two reference receivers (with $R=D_{TRX_i}$).

In the case of a circular layer of receivers of radius R, the distances $D_{TRX_i}=R$ and the distance D on the axis of symmetry is the projection of the radius R, at the angle $\theta_1$:

$$R_{mono}^2/R \leq d_{inter} \leq 2R_{mono}^2/(R \cdot \cos \theta_1)$$

Depending on R and $d_{inter}$, it becomes:

$$D^2 = R^2 - \left(\frac{d_{inter}}{2}\right)^2$$

By posing $$X = \left(\frac{d_{inter}}{2}\right)^2,$$

the equation giving the maximum value of $d_{inter}$ may be expressed in the form of the following second-degree double-square equation in X with $D=D_{TR}$:

$$X(R^2 - X) = R_{mono}^4$$

$$X^2 - R^2 X + R_{mono}^4 = 0$$

That is to say:
This equation has a real solution if:

$$R^4 - 4R_{mono}^4 > 0$$

If $R < R_{mono}\sqrt{2}$, there is no particular solution to the above double-square equation for $d_{inter}$ because all of the receiver positions on the circle are suitable.

For $R>R_{mono}\sqrt{2}$, the two inter-receiver spacing solutions $d_{inter}$ are:

$$d_{inter1} = R\sqrt{2} \cdot \sqrt{1 + \sqrt{1 - \left(\frac{R_{mono}\sqrt{2}}{R}\right)^4}} \text{ and}$$

$$d_{inter2} = R\sqrt{2} \cdot \sqrt{1 - \sqrt{1 - \left(\frac{R_{mono}\sqrt{2}}{R}\right)^4}}$$

Depending on the angle $\theta_1$, it becomes:

$d_{inter} = 2R \sin \theta_1$, $d_{inter} \leq 2R_{mono}^2/R \cos \theta_1$ becomes $2R \sin \theta_1 \leq 2R_{mono}^2/R \cos \theta_1$ Or else:

$\sin 2\theta_1 = 2R_{mono}^2/R^2$ having the following two angles as solutions:

$\theta_{1,1} = \frac{1}{2} \sin^{-1}(2R_{mono}^2/R^2)$ and $\theta_{1,2} = \pi - \frac{1}{2} \sin^{-1}(2R_{mono}^2/R^2)$ (32)

It should be noted that the solution $d_{inter2}$ or the equivalent solution $\theta_{1,1}$ (smallest angle) is the one in which the receivers are closest to one another while at the same time being advantageously far from the transmitter TX in order to guarantee a better prior warning. The area of coverage between the respective detection areas of two adjacent receivers however decreases moving toward their maximum spacing of $2R_{mono}^2/D$. For example, FIG. 10 shows a spacing between adjacent receivers that is slightly smaller than the maximum spacing, with a very partial overlap between the receivers, this spacing however being able to be enough to trigger an alert with good prior warning. The example of FIG. 12 by contrast shows a spacing between adjacent receivers smaller than the maximum spacing, the overlap between neighbouring detection areas being greater. In FIG. 12, the point of overlap of the adjacent detection areas that is furthest from the transmitter is beyond the circle formed by the receivers. The following inequality is thus strictly complied with:

$$\sin\left(\frac{\theta_1}{2}\right) < R_{mono}^2/2R^2$$

that is to say $\theta_1 < 2 \text{Arcsin}(R_{mono}^2/2R^2)$

This solution of angle $\theta_1$ is greater than $\frac{1}{2}$Arcsin $(2R_{mono}^2/R)$.

In another embodiment of the invention, the groups 3 of the system may comprise at least one group having one or more layers of any curved form, such a layer of curved form comprising a set of receivers; the adjacent receivers $RX_i$ and $RX_{i+1}$ form a sequence of unaligned segments (configuration called "piecewise linear"), of form other than linear or circular, the segments being able to be asymmetric, with receivers 32 being able to be situated at a different distance from the transmitter 31. The receivers of such a curved layer may be even or odd in number.

For a layer of a particular curved form formed of receivers situated in one and the same circle with an inter-receiver distance $d_{inter_i} = 2a_i$ that is not constant between two successive adjacent receivers $R_i$ and $R_{i+1}$ whose axis of symmetry passes through the transmitter 31, the inter-receiver distance $2a_i$ may advantageously satisfy, according to equations (1) and (21):

$$R_{mono}^2/R < 2a_i < 2R_{mono}^2/D \tag{33}$$

In such an embodiment with a layer in piecewise linear form, it is also possible to consider the area of the surface $Aire(\mathcal{T}_i)$ of each triangle $\mathcal{T}_i$, as defined above, the angles $\theta_i$ being defined with respect to the distance $D_i$ between the transmitter 31 and the line passing through the points coinciding with the receivers $RX_{i-1}$ to $RX_i$, as shown in FIG. 11B, but with distances $D_i$ that may be different from the distance D of the reference pair. The area $Aire(\mathcal{T}_i)$ may take any intermediate value between threshold values $Aire(\mathcal{T}_i)_{min}$ and $Aire(\mathcal{T}_i)_{max}$, the threshold values depending on $R_{mono}^2$ and on $\cos(\theta_i)$. In particular, the threshold values $Aire(\mathcal{T}_i)_{min}$ and $Aire(\mathcal{T}_i)_{max}$ may be equal, respectively, to:

$Aire(\mathcal{T}_i)_{min} = R_{mono}^2 \cos(\theta_i)/2$ and $Aire(\mathcal{T}_i)_{max} = R_{mono}^2 \cdot \cos(\theta_{Mi})$, that is to say:

$R_{mono}^2 \cos(\theta_i)/2 \leq Aire(\mathcal{T}_i) \leq R_{mono}^2 \cdot \cos(\theta_{Mi})$ All of the corresponding intermediate distances $d_{inter} = 2a$ are possible. Thus, in the case of a circular layer, all of the corresponding intermediate distances $d_{inter} = 2a$ obtained with equation (33) are possible. As shown in FIG. 12, such an example of an intermediate circular configuration is characterized by:

A redundancy, in the event of a fault with one of the receivers, that is not as good as in the embodiments of FIG. 6 or 7, the detection not being provided as far as the line of the receivers, in contrast to the embodiments in FIG. 6 or 7, but as far as the circle of radius $R_{mono} < R$;

"Shaded" areas (or areas of non-detection) of each transmitter/receiver pair that are only partly covered.

In the embodiment of FIG. 7A, the radius R of the circular form $\mathcal{C}$ described by the receivers 32 may be equal to the detection radius $R_{mono}$ of the monostatic sonar ($R = R_{mono}$). The reference inter-receiver distance $2a$ may then be equal to the detection radius $R_{mono}$ by applying equation 5. Six receivers 32 forming a hexagon with a side equal to R may then be used. The maximum multistatic range from the common transmitter 31 is then equal to a parameter equal to R. $(1+\sqrt{5})/2$, the number "$(1+\sqrt{5})/2$" corresponding to the golden ratio.

Figure 13:
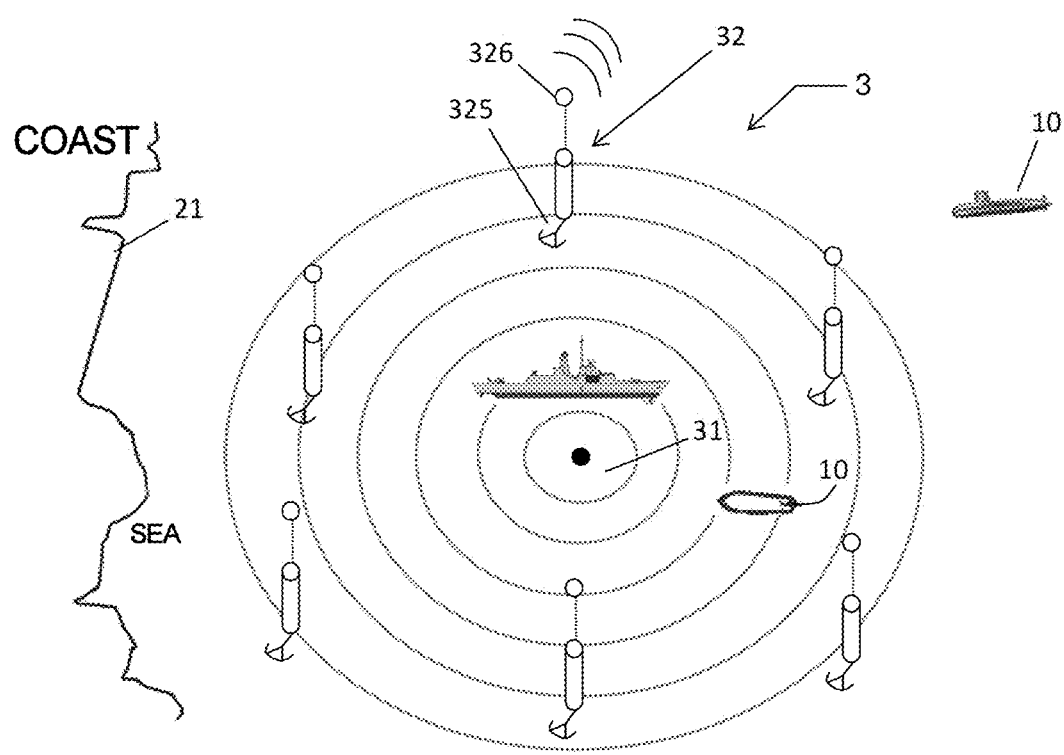
FIG. 13 shows one example of a detection group, according to an embodiment in which the receivers are arranged in a circular configuration.

For a configuration of circular receivers such as those in FIGS. 9, 12 and 13, there may be a requirement for the point of overlap furthest from the transmitter between the respective detection areas of 2 adjacent receivers, and in particular those of the reference pair, to be at least on the circle formed by the receivers whose radius is equal to R, and not in the middle of the segment joining the 2 adjacent receivers, this being the chord and not the circular arc in this case of a circular configuration.

This case is therefore less constrictive in terms of proximity of adjacent receivers than the case of FIG. 7A in which the furthest point of overlap is notably beyond the circle of radius R.

For the circular configuration, the condition for the point of overlap furthest from the transmitter being at a distance R from the transmitter is written, on the basis of equations similar to (18) and (19):

$$\log((0^2+D^2)^{0.5})+\log((0-x_1)^2+(R-D)^2)^{0.5})=2\cdot\log(R_{mono})$$

$$R\cdot\sqrt{x_1^2+(R-D)^2}=R_{mono}^2$$

Using, as above, $\theta_1$ to denote the angle passing through the transmitter TX and the receiver RX1 of the reference pair, the square root term $\sqrt{x_1^2+(R-D)^2}$ corresponding to the chord of a circle of radius R, and the angle $\theta_1$ corresponding to the angle intercepting the chord, it therefore becomes:

$$\sqrt{x_1^2+(R-D)^2}=2R\sin\left(\frac{\theta_1}{2}\right)$$

The desired condition for an overlap of the adjacent detection areas on the circle formed by the receivers or beyond is therefore:

$$\sin\left(\frac{\theta_1}{2}\right)\leq R_{mono}^2/2R^2,$$

Thus, for $\theta_1=60°$, that is to say $2\theta_1=120°$, the configuration comprising therefore just 3 receivers over the entire circle, the following is obtained:

$$\sin\left(\frac{60}{2}\right)=\frac{1}{2}\leq R_{mono}^2/2R^2$$

In the particular case in which $R=R_{mono}^2$, this solution with 3 receivers around this circle is exactly the one for which the point of overlap of the detection areas furthest from the transmitter is situated exactly in the middle of the circular arc defined by 2 of these 3 receivers.

This particular case would correspond to a figure derived from FIG. 7A, by removing three interspersed receivers (for example $RX_2$, $RX_4$ and $RX_6$) out of the 6 receivers in this FIG. 7A, which corresponds to receivers on a circle of radius $R=R_{mono}^2$. For example, the detection areas of the receivers RX1 and RX3 overlap at the position of the interspersed receiver RX2.

According to some embodiments, each receiver 32 of a detection group 3 may be configured so as to receive signals in a frequency band lower than 30 kHz.

The detection system 100, which is dimensioned on the basis of the radius $R_{mono}$ corresponding to the minimum range from all of the possible threats in the environment under consideration of the equivalent monostatic sonar, then makes it possible to detect any type of underwater threat, such as a motorized or non-motorized diver, an SDV, an AUV drone, a mini submarine, etc., regardless of its size and its speed, and regardless of the type of infrastructure 2.

In one embodiment, the detection system 100 may be used to provide self-protection for an infrastructure 2 of surface building type, which is anchored or remains in a fixed area for a given mission time, against any type of underwater threat, without requiring cables attached to the surface building and while keeping a minimum movement capability. In such an embodiment, the detection system 100 may be used for example in littoral positioning for a mission close to coasts.

FIG. 13 shows an example of a detection group 3 according to an embodiment in which the receivers 32 are arranged in a substantially circular configuration or one that is adjusted according to the environment if this is not isotropic. In such an embodiment, the transmitter 31 may be formed by the hull sonar of a military platform (for example from 3 to 9 kHz) or by the sonar of a surface platform such as a low-frequency fish-finding sonar (for example up to approximately 30 kHz). Such a detection group may self-deploy itself by energetically dropping autonomous receivers 32 throughout the duration of the mission for which the surface platform in the area under consideration is dedicated, such receivers 32 transmitting their data to the surface platform through any communication means (for example radio (VHF, satellite, Wi-Fi or Wimax)).

In one particular embodiment, the detection system 100 may comprise two directive receivers such as acoustic buoy or helicopter sonar type, deployed behind and as far as possible from the transmitter 31, situated on each side of the boat, placed on the floor or submerged at a depth suitable for acoustic propagation with a surface channel, allowing processing with access to all of the hydrophones and adaptive processing achieving the capability of receiving the echo even during direct reception from the transmitter 31 (RX as TX capability mentioned above). The transmitter-receiver distance D may advantageously be equal to the length of the boat.

Such a detection system 100 may therefore be used as a self-protection surveillance system for a military or civilian surface platform that is stationary or remaining in a given area. The receivers 32 may be autonomous receivers arranged in this area, with or without a cable attached to the surface platform. The transmitter 31 of the group may be any military or fish-finding sonar of the surface platform (single insonification source), with or without a cable.

Figure 14:
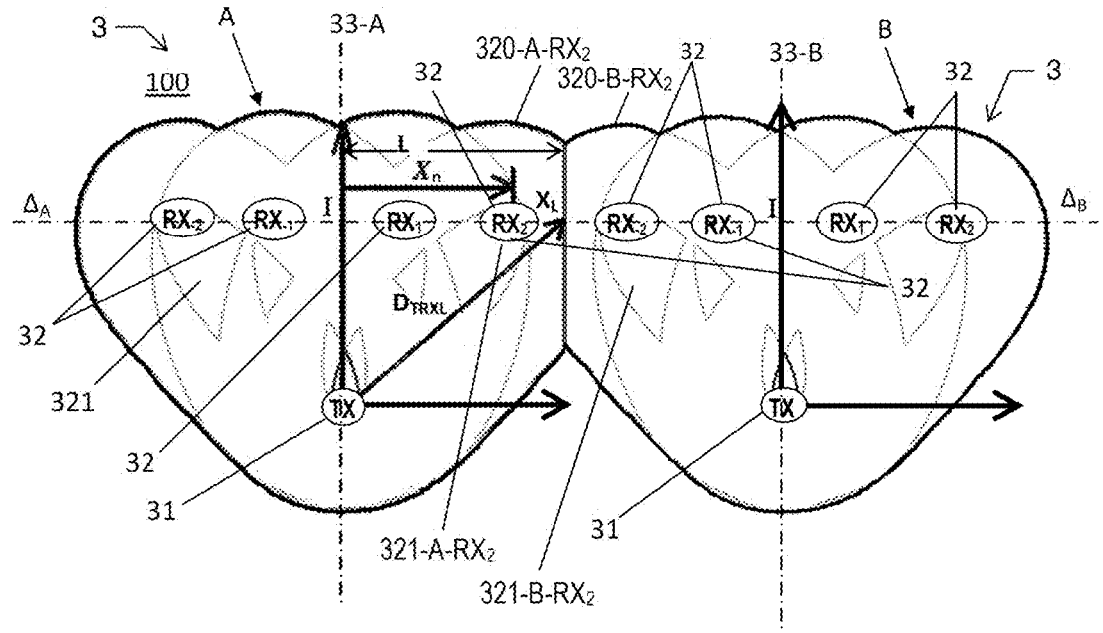
FIG. 14 shows a detection system comprising two contiguous detection groups, according to an embodiment with a linear configuration.

FIG. 14 shows a detection system comprising two detection groups 3 (denoted by A and B) with a linear configuration, corresponding to the embodiments of FIG. 2 or 3, the two groups being arranged between one another so as to jointly form a detection area offering adequate protection. According to one feature, the elementary detection areas 320-A-$RX_2$ and 320-B-$RX_{-2}$ of at least some of the end receivers ($RX_2$ for the group 3-A and $RX_{-2}$ for the group 3-B) of a given detection group (A for example) at least partly overlap with the end receivers of an adjacent detection group (B for example).

In particular, the detection areas of the adjacent multistatic groups 3, as shown in FIG. 14, may overlap so that the end receiver 32 (for example on the left) of a given group (for example the right-hand group) takes the position that an additional receiver of the adjacent group could have had, at the end of the given group situated on the same side as the adjacent group. The position of the receiver $RX_{-2}$ of the right-hand group 3-B may thus correspond to the position that a receiver $RX_3$ of the group 3-A could have had, for example according to equation (5).

The groups 3 may thus be arranged contiguously so that the detection system covers a continuous detection area, without blind zones, thereby making it possible to implement any type of reaction (for example, calculate launching of a grenade, send a USV, guide a drone or destructive torpedo of "hard kill" type).

In particular, the distance L between the axis of symmetry 33-A of a given detection group (A for example) and a point of intersection $X_L$ between this group A and the adjacent group B, situated on the segment linking the adjacent end receivers $RX_2$ of the group A and $RX_{-2}$ of the adjacent group B, is a function of the square $R_{mono}^2$ of the detection radius of the equivalent monostatic sonar, of the distance between the point of intersection $X_L$ and the transmitter of the given group ($D_{TRX_L}$).

In particular, the distance L satisfies:

$$D_{TRX_L} \cdot 2(L-X_n) = R_{mono}^2 \qquad (34)$$

$X_n$ denotes the abscissa of the receiver 32 furthest from the group A ($X_2$ in FIG. 14). $X_L$ thus represents the point of intersection of the two lines $\Delta_A$ and $\Delta_B$ formed by the receivers of the 2 adjacent groups A and B.

In FIG. 14, it should be noted that the receiver $RX_{-2}$ of the group B (left-hand group) occupies the optimum space that a 3rd receiver would have on the group A (left-hand group), thereby determining the spacing between 2 groups. This makes it possible to normalize the thickness of the barrier while at the same time ensuring robustness to faults: for example, if the receiver $RX_2$ of the group A is faulty, the receiver $RX_{-2}$ of the group B is able to take over by operating in multistatic mode, not just with the transmitter 31-B of its own group B but also with the transmitter 31-A of the adjacent group A whose transmission may be synchronous with an orthogonal code.

In some embodiments, the signals of at least some of the receivers may be used by a classification unit to classify the detected targets, each receiver being configured so as to operate at least acoustically simultaneously in passive and active mode, each receiver in passive mode preferably processing frequencies lower than the frequencies processed in active mode, passive acoustic classification being able to be performed by slaving from the active tracking, the acoustic range or the non-acoustic range (such as electric and/or magnetic) being at least equal to half the maximum distance between two neighbouring receivers, belonging or not belonging to one and the same group and being able to ensure, when the threat passes between them, that an item of electromagnetic information is provided that confirms classification as an actual threat, such as a threat with metal arms or an engine for example.

In particular, the passive acoustic range may be at least equal to half the greatest distance between two receivers, that is to say equal to a (which corresponds, in a linear configuration, to $x_1$).

In particular, each receiver may be configured so as to continuously listen to the signals emitted in passive mode by a target detected on the basis of the direction of detection of the target in active mode. Each receiver may notably be configured so as to continuously listen to the signals emitted in passive mode, by continuously slaving the listening beam, the detection system being able to be configured so as to perform a spectral classification analysis on the basis of the direction of detection of the target in active mode, the detection of the target in active mode being performed at higher frequencies than the frequencies of the passive mode.

The active tracking may advantageously be used to slave the acoustic pointing tracking beam through an audio output, through the integration of the spectral analysis of the signal, and/or through other possible sensors (including non-acoustic sensors) for optimum identification/classification of the target.

As the detection in active mode gives the distance and the bearing during the tracking and therefore the radial Doppler, it becomes possible to de-Dopplerize the signal in this slaved beam and therefore to perform the spectral integration of the signal more efficiently (over a longer duration and directly giving the signature center frequency of the threat).

In some embodiments, the detection system 100 may be configured so as to classify the detected targets. The system 100 may comprise a classification unit configured so as to use signals transmitted by one or more sensors, arranged for example on the receivers, in order to classify the target 10.

Figure 15:
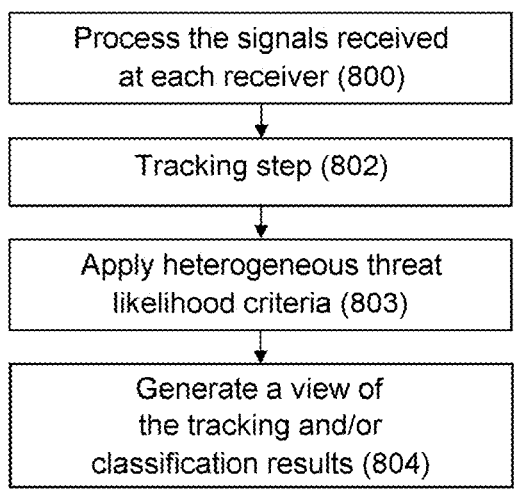
FIG. 15 shows the detection method according to some embodiments.

FIG. 15 shows the detection method implemented by the processing unit 7, in an embodiment in which the detection system 100 operates with target tracking, target classification and alert.

Figure 16:
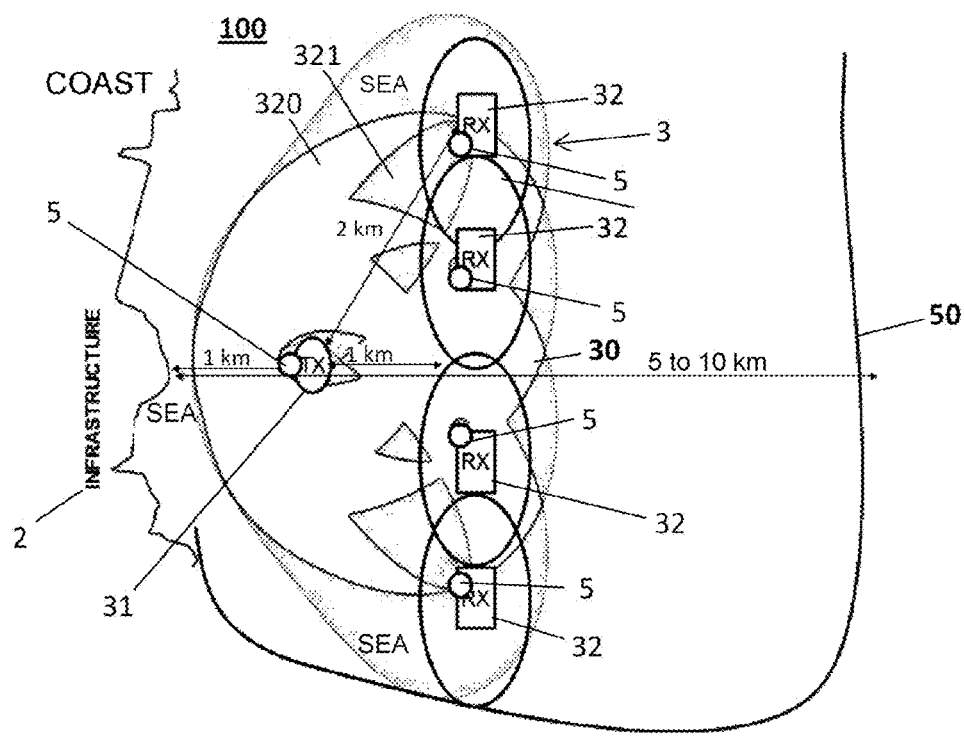
FIG. 16 shows one exemplary embodiment of the detection system for a group of 4 receivers.

The system 100 may furthermore comprise at least one sensor 5 arranged on the receivers 32, as shown in FIG. 16. The sensors may include sensors such as a magnetic sensor and/or an acoustic sensor and/or a non-acoustic sensor. Non-acoustic sensors that may be used comprise for example extremely low frequency electric (ELFE) sensors, underwater electric potential (UEP) sensors, and magnetic acoustic detection (MAD) sensors.

The method may comprise a detection step 800 involving processing the received signals by way of the receivers (the receivers being able to be acoustic or non-acoustic). The detection step is specific to each receiver 32 of a given group and may provide a set of heterogeneous detected events, the detected acoustic events corresponding at least to the transmitter of the corresponding group, and also being able to correspond to neighbouring transmitters that do not disrupt detection. Neighbouring transmitters do not disrupt detection:
  when they are situated further than the transmitter 31 of the group under consideration, which itself does not disrupt detection, notably with use of adaptive processing allowing the "RX as TX" mode, or
  when they are situated at distances such that the reverberation in the same useful frequency band is able to be neglected in relation to that of the transmitter of the group under consideration.

Various code transmitters may emit orthogonal codes, such that it is possible to distinguish the echoes at the coherent processing output with the copies of the corresponding codes, even if they are in the same frequency band. The events detected at each of the transmissions may comprise the detection of a threat and/or false alarms.

The tracking step 802 associates with one another the events detected from successive transmissions that may correspond to a movement of one and the same threat coming or not coming from the same receiver 32, in a given group, due to the transmission of the transmitter corresponding to this group, and may then merge the tracks of 2 neighbouring groups that may correspond to the same threat.

In step 803, heterogeneous threat likelihood criteria are associated with each tracking, these criteria being characteristic of a given threat observed by sensors supplying heterogeneous observable values (for example size, speed, acoustic or non-acoustic values, etc.).

In step 804, the tracking and classification results obtained for the various groups are compiled and possibly merged so as to view them on a map of the area to be monitored, and an alert may be triggered if a high threat likelihood is achieved.

The detection system 100 may also be used as a surveillance system with at least 2 barrier levels comprising the barrier 30 and, upstream thereof, an additional barrier (50) to the barrier 30, created by way of sensors 5 positioned on at least some of the detection elements of the system 100 (on the transmitter 31 and/or on one or more receivers 32).

FIG. 16 illustrates an exemplary embodiment using a group of 4 receivers, for which two barrier 30 and 50 distances are obtained: the first one (30) for the worst slow threats, typically non-motorized divers, the second one (50) for motorized devices, notably detected further away by virtue of the low frequency that is used.

The additional barrier 50 that is further away makes it possible to address the quickest and therefore most noisy threats, with a faraway alert capability so as to keep a sufficient reaction time. The barrier that is further away may be acoustic and passive and designed to trigger a first long-distance alert over a long length, using opto-acoustic and/or optical rangefinding sensors (for example over more than 10 km).

In the example of FIG. 16, optical rangefinding sensors 5 are positioned on each receiver 32 and the transmitter 31. The transmitter 31 is positioned 1 km away from the coast that separates the marine area from the infrastructure 2 to be protected, the transmitter 31 is at a distance DTR of 1 km from the line Δ of the receivers 32. The detection area 30 forms a second-level detection barrier, whereas the same optical rangefinding sensors generate a faraway first-level barrier 50 upstream of the barrier 30, extending for example up to a distance ranging from 5 to 10 km from the coast. A two-level barrier is thus formed, the first-level faraway barrier 50 being particularly suited to fast and noisy threats.

In some embodiments, the processing system 7 may furthermore comprise a Doppler function 6 for measuring the speed of the detected targets 10, the receivers 32 then being configured so as to receive echoes during transmission (operation in "Rx as Tx" mode). The positioning of the receivers 32 according to the invention makes it possible to optimally minimize the blind zones.

Figure 17:
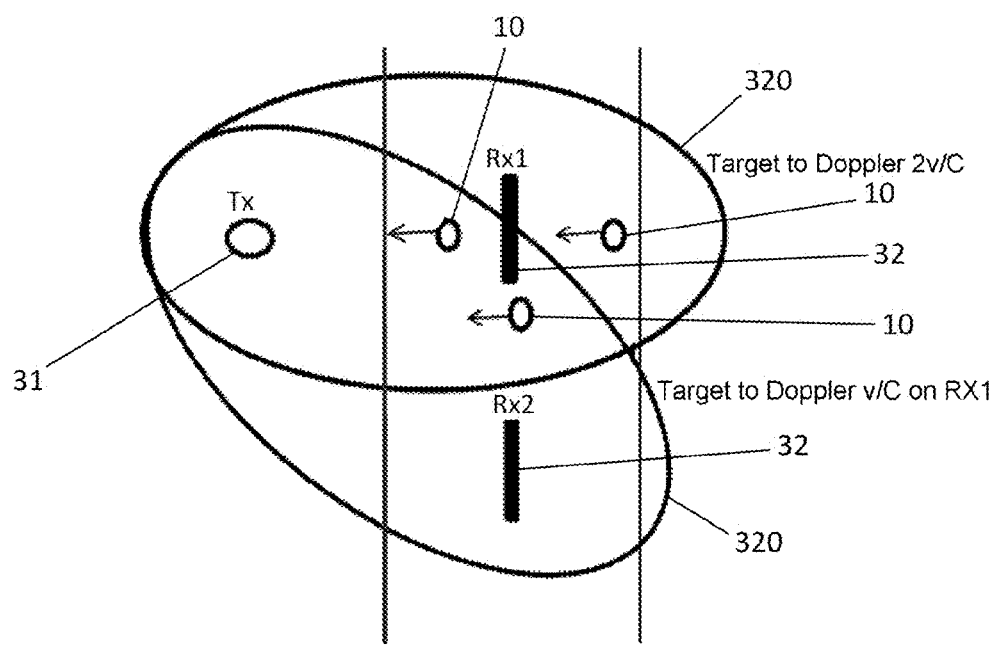
FIG. 17 illustrates the advantages of the detection system in an operating mode with Doppler.

FIG. 17 illustrates the advantages of the detection system 100 in an operating mode with Doppler. In FIG. 17, only the detection areas 320 are shown so as to simplify the depiction.

In conventional monostatic barriers, on each receiver of FIG. 17 there is also placed a transmitter that disrupts its close neighbors.

In the multistatic detection system 100 according to the invention, for each multistatic group, a single transmitter 31 is positioned at a distance from the receivers 32 and upstream thereof. In an operating mode using a Doppler-sensitive transmission and processing code, a zero Doppler is observed on the straight line TX-RX1. However, inside the detection barrier 30, another receiver RX2 is able to receive Doppler. It should be noted that, in applications of the invention in which it is necessary to space the barrier from the coast for better prior alert warning, it is not necessary to space the transmitter to the same extent.

In addition, to detect the most critical threat 10 passing just between 2 receivers 32, a Doppler therefore exists, whereas, in conventional monostatic solutions, a Doppler strictly does not exist when a threat passes orthoradially (perpendicular to the axis formed by 2 monostatic sonars and passing through the barrier using the shortest route).

The multistatic detection system 100 according to the embodiments of the invention is based on a number of transmitters 31 far lower than that used in conventional monostatic implementations, for an at least equivalent reaction time for the smallest threats and a higher reaction time for the largest threats, while at the same time reducing the transmission strategy constraints (as there are fewer transmitters). In the embodiments in which the receivers are configured so as to perform "Rx as Tx", all of the transmitters 31 of the system 100 are able to transmit independently of one another, or even at the same time using orthogonal codes. In conventional monostatic implementations, even if each sonar is capable of rejecting any transmission from its neighbors, it is deaf (blinded) because it emits itself over an area cT/2 (c being the speed of sound and T the duration of the transmission pulse). The multistatic detection system according to the invention may make it possible to further improve performance by increasing the duration of the transmission pulse T. Since the transmitters no longer disrupt reception, the blind zones 321 are greatly reduced and tend to approach the straight line linking the transmitter 31 and the receiver 32 under consideration.

The embodiments thus allow multistatic detection over a wide area, both beyond the barrier but also between the barrier of receivers (RX) and the transmitter (TX), by virtue of the overlap of the elementary detection areas of the neighbouring receivers through intersection of their blind areas (also called "blind zone" or "blanking" area). For each bistatic transmitter/receiver pair, the detection area behind the transmitter is symmetrical with the detection area in front of the receiver (the term "behind" as used here makes reference to the part of the detection area extending in the direction of the sensitive infrastructure, whereas the term "in front" makes reference to the opposite direction, toward the sea). The overlap between the detection areas of the various bistatic pairs, in some embodiments, allows continuous target tracking, which may thus be achieved over a wide surface area virtually without a detection gap. It is possible to implement analysis of the behavior of the target through active acoustic tracking, and/or guidance of the reaction, which may be continuous when the tracking is continuous.

When the target passes through the barrier at a close enough distance, the barrier surveillance system of the invention may additionally confirm a classification of the threat type and trigger an alert with a low false alarm level in order to support an appropriate reaction. The classification criteria may comprise various types of criteria, such as passive acoustic classification criteria, but also non-acoustic classification criteria (for example electric and magnetic) that are highly indicative in order to reject any false alarm that would be due to marine life. These criteria are more effective the more the distance between two receivers means that the target has to pass close to at least one of the receivers at the barrier. These criteria are more operationally useful the more the multistatic reception barrier is offshore from the area to be protected (in such a case, the system according to the invention makes it possible to add a multistatic distribution to the distance between the transmitter and the infrastructure to be protected).

It should be noted that, in the embodiments using a configuration of receivers 32 with redundancy in the event of a fault, even a threat 10 that may know the exact position of the receivers 32 and that may follow an ellipse around the receiver/transmitter pair closest to the threat would be detected with Doppler on the ellipse of the neighbouring receiver.

It should be noted that the invention is not limited to a particular number of multistatic groups, and may include a variable number of groups 3 depending on the application.

Figure 18:
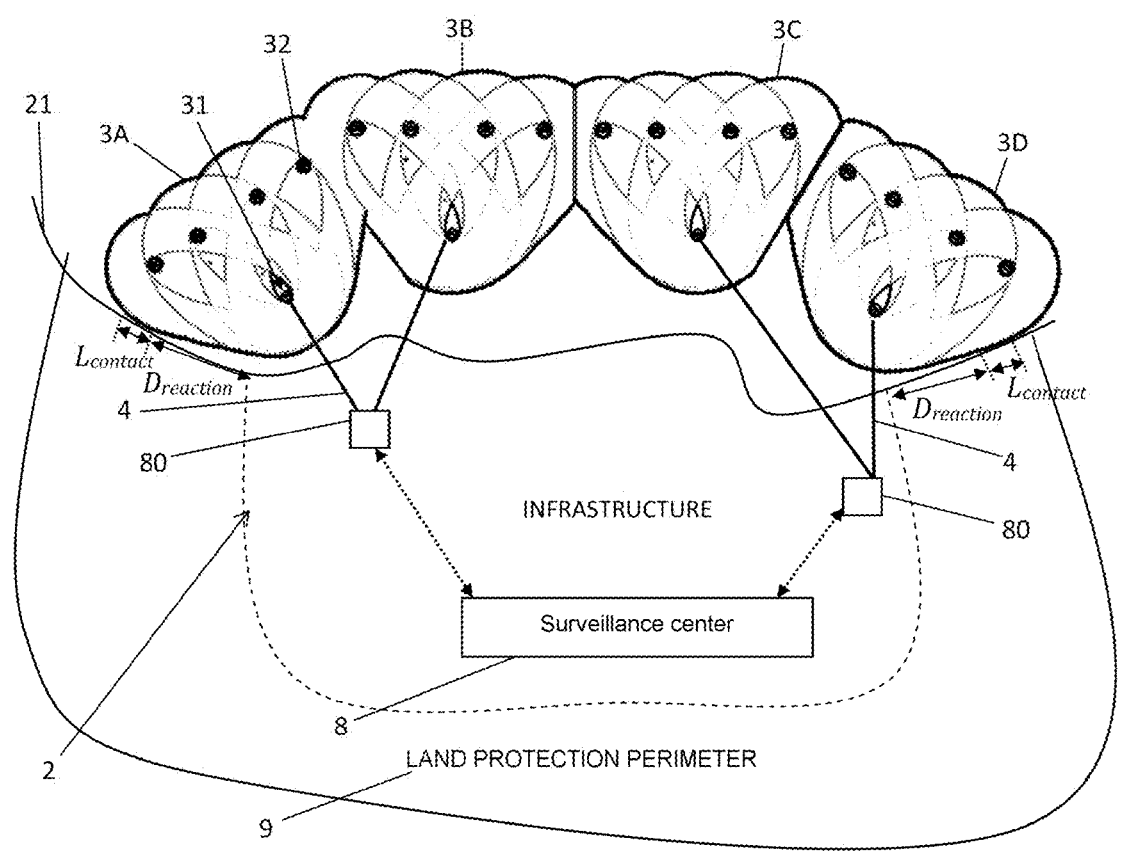
FIG. 18 is a diagram showing a detection system with 4 multistatic groups with a linear configuration, according to one exemplary embodiment.

FIG. 18 illustrates an embodiment in which the system comprises 4 multistatic groups 3. The x-axis (or Δ axis) of each group may or may not be aligned with those of the other adjacent groups depending on the configuration of the sensitive area in which the infrastructure 2 is located, and in particular close the area forming a protective barrier on either side, in FIG. 18 with groups 3A and 3D. Of course, it is possible to insert as many groups as necessary between groups 3B and 3C, since the neighbouring groups do not acoustically disrupt one another. It is thus possible to form protective areas that follow the form of the infrastructure to be protected without a limit on the number of groups with a protective area of several tens of km or more. The protection may be supplemented by a surveillance center 8 positioned close to the infrastructure and to a land protection perimeter 22. The surveillance center 8 may be connected to technical shelter rooms 80.

Moreover, in preferred embodiments in which the sensitive area extends broadly on either side of the coast, the detection areas 3-A and 3-D of the outermost groups of the barrier (groups situated toward the furthest points of the coast to be protected) close the barrier and have to make contact with the coast 21 at a sufficient distance $D_{reaction}$ from the sensitive area to allow sufficient time for the reaction. In such embodiments, each end group may advantageously be arranged such that its detection area 30 makes contact with the coast 21 over a length $L_{contact}$(contact length between the detection area 30 of the end group 3 and the coast) and at a sufficient distance $D_{reaction}$ from the area to be protected to allow a timely reaction. In particular, the distance $D_{reaction}$ may advantageously be greater than or equal to the product of the maximum threat speed and the predefined prior warning time in order to promote an effective reaction to this threat.

Figure 19A:
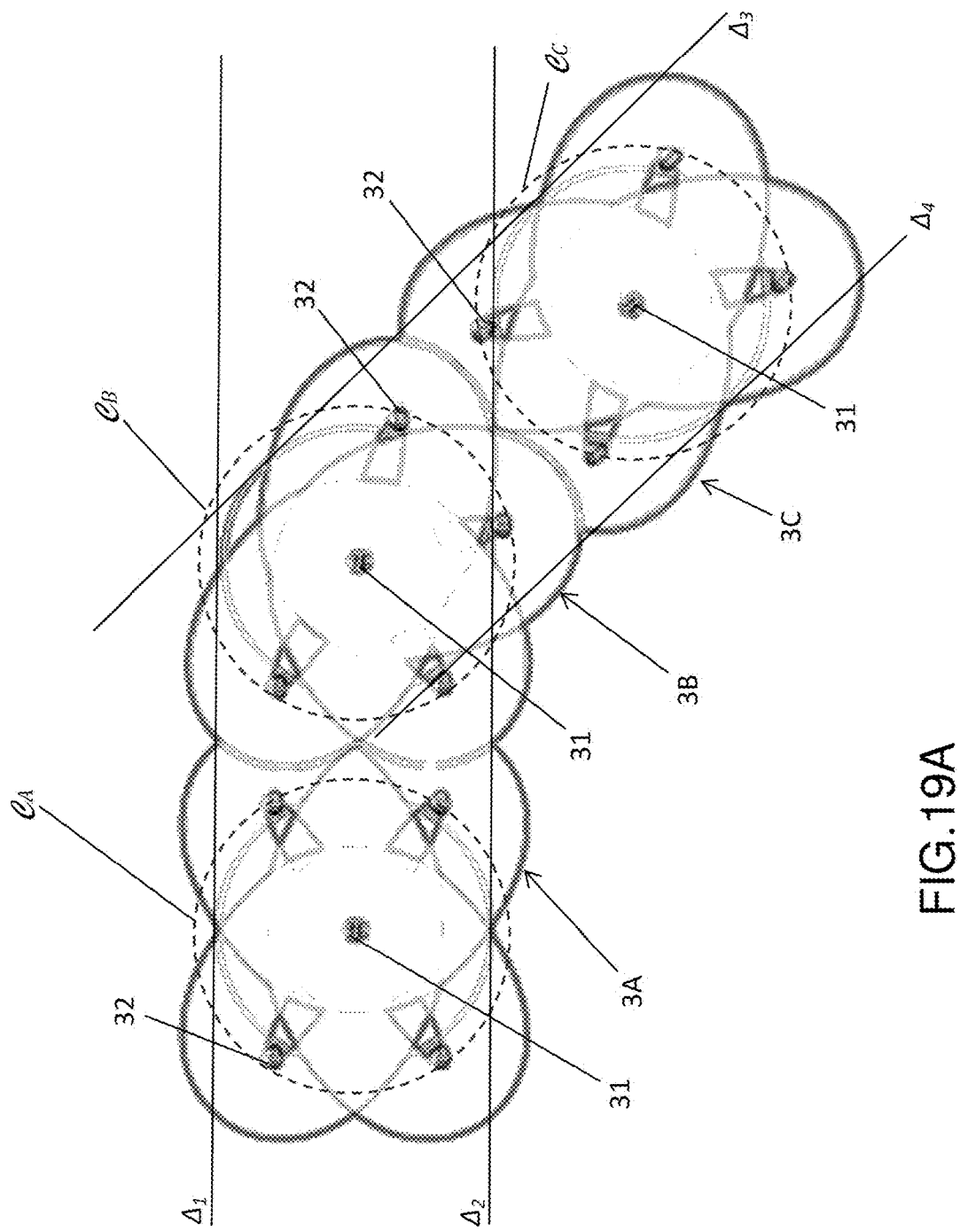
FIG. 19A is a simplified diagram showing a detection system with 3 multistatic groups with a circular configuration, according to one exemplary embodiment.

FIG. 19A is a simplified view of an example of a multistatic system comprising 3 multistatic groups 3-A, 3-B, 3-C with a circular configuration, with an irregular spacing of the adjacent receivers along the circle, and having an axis of symmetry, the receivers 32 of each group describing a circle $C_A$, $C_B$, or $C_C$, each circle being centered on the transmitter 31 of each group, and having a radius slightly larger than the equivalent monostatic range $R_{mono}$. The successive transmitters 31 of the various groups may form a sequence of aligned or unaligned segments. The distance between two transmitters 31 of two adjacent groups and the form of the successive segments may be chosen so as to optimize the protection depending on the shape of the sensitive infrastructure to be protected and/or on the configuration of the coast and/or on the slope of the surrounding seabeds. In the example of FIG. 19A, the blind zones of the receivers are at least partly covered by the elementary detection areas of the neighbouring receivers of the same group or ones of the neighbouring groups, thereby allowing virtually gap-free detection, the detection gaps being situated only near each receiver. In addition, the barrier thus formed comprises coverage redundancy for at least some of the receivers and allows reduced and tightness continuity of service in the event of a fault within receivers. The threats may be detected inside the circles and the interfaces between the groups by a plurality of receivers, including in the area situated between two groups. What is thus achieved is an example of a barrier virtually free from detection gaps and with coverage redundancy, the barrier comprising two rectangular barrier areas having an overall constant minimum thickness, including in the embodiments in which they are inclined with respect to one another. Thus:

Groups 3-A and 3-B generate a rectangular barrier between the straight lines Δ1 and Δ2

Groups 3-B and 3-C generate a rectangular barrier between the straight lines Δ3 and Δ4.

It should be noted that:

group 3B is suitable for inclination between the above two rectangular barrier sections over a wide range of possible inclination values, by shifting, on the circle $C_B$, the two receivers interfacing with group 3-C with respect to the receivers interfacing with the group 3-A;

The straight lines Δ1 to Δ4 are all tangent to the circle of radius $R_{mono}$ centered on the various transmitters, thereby allowing a good configuration forming a barrier with adjacent circular groups 1TX/4RX, as described below.

Figure 19B:
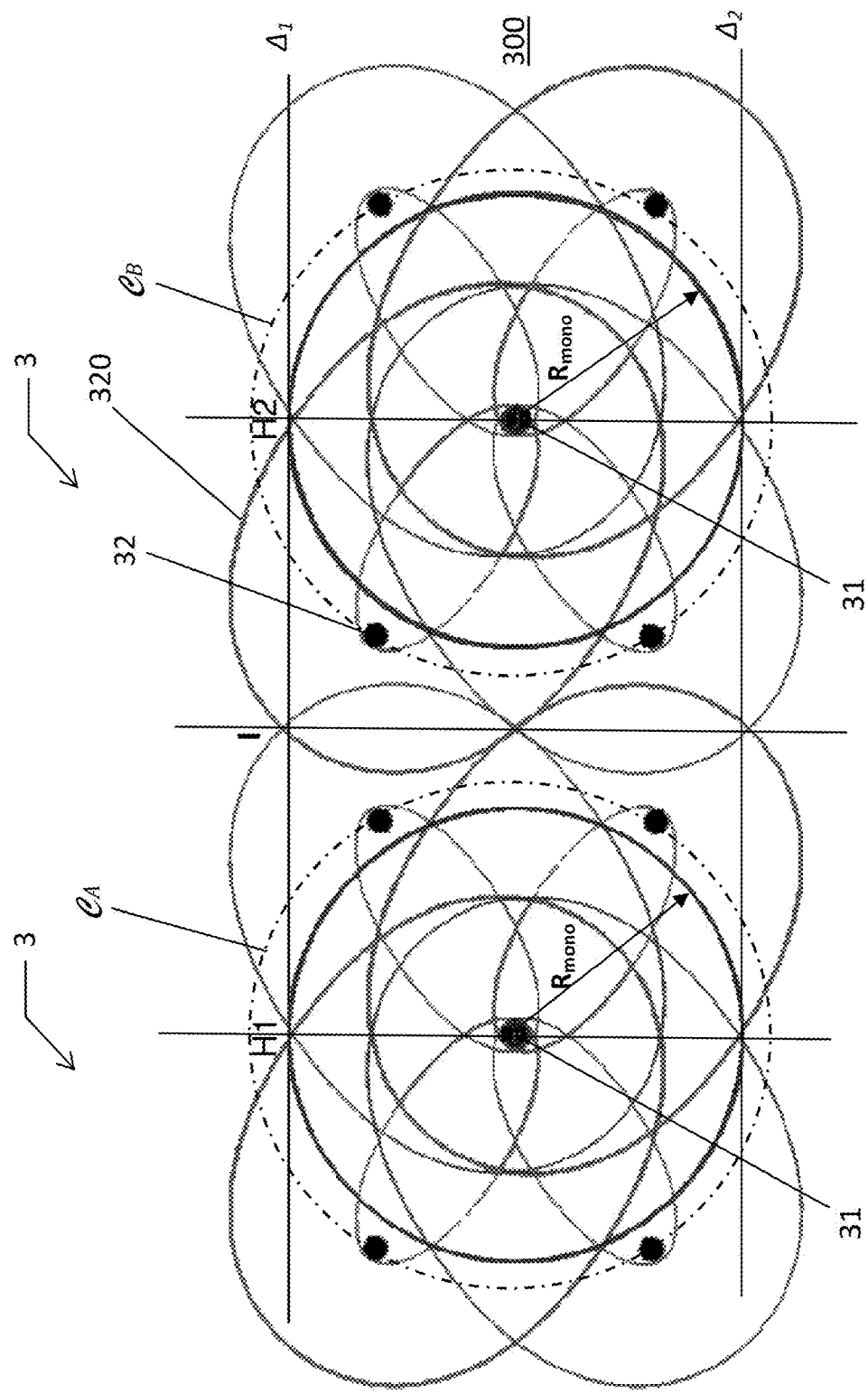
FIG. 19B is a simplified diagram showing two adjacent detection groups, according to one embodiment.

FIG. 19B is a diagram of the detection system 100 in an embodiment using two adjacent circular detection groups jointly generating a detection area 300 that has symmetry about the axis passing through the transmitters, and with complete redundancy inside each circle $R_{mono}$, and partial redundancy between the groups, and without a detection gap, the rectangular area forming a barrier between the straight lines Δ1 and Δ2 being detected completely.

More precisely, in the example of FIG. 19B, the receivers of the two groups situated respectively on the circle $C_A$ or the circle $C_B$ are located at a distance from the transmitter 31 greater than the equivalent monostatic range $R_{mono}$, the angle between an transmitter and two receivers on a circle being wider than that of the hexagonal configuration of FIG. 7A (angle of 60°). The overall detection area 300 passes both through points H1 and H2 and the point I situated at the intersection between the detection areas 30 of the two groups and the straight line Δ1. Each point H1 and H2 corresponds to the point of intersection between the straight line Δ1 and the axis passing through one of the two transmitters that is perpendicular to the barrier of the group 3 under consideration, these points also being situated on the circle of radius $R_{mono}$ centered on the transmitter of the same group and tangent to the straight line Δ1.

The overall detection area 300 forms a complete and gap-free barrier whose thickness is equal to $2 \cdot R_{mono}$ and whose length is equal to the distance between the 2 transmitters 31 of the two groups, that is to say to the distance of the segment [H1H2]. This barrier thus corresponds to a rectangular surface area S′ which, when it is returned to $2 \cdot R_{mono}^2$, for a configuration corresponding to FIG. 19B with 1 transmitter and four receivers for each group, gives:

$$\frac{S'}{2 \cdot R_{mono}^2} = 2.7$$

The surface area $2 \cdot R_{mono}^2$ may be interpreted as the rectangular part of the barrier surface area formed by a chain of monostatic transmitters separated from one another by $\sqrt{2} \cdot R_{mono}$ and of thickness $\sqrt{2} \cdot R_{mono}$, therefore each providing a full and rectangular surface area of $2 \cdot R_{mono}^2$. The rectangular part of the detection area is the characteristic of the barrier that has to provide a minimum barrier thickness for a desired distance or detection time for the threat. Thus, in comparison with a conventional monostatic system, the advantage in terms of cost depends on the cost of a receiver in comparison with that of an transmitter. Another significant advantage is that the threat has, at any redundancy point in the barrier, a radial Doppler that is not able to cancel out for a mobile threat with respect to at least one of the bistatic pairs.

Figure 19C:
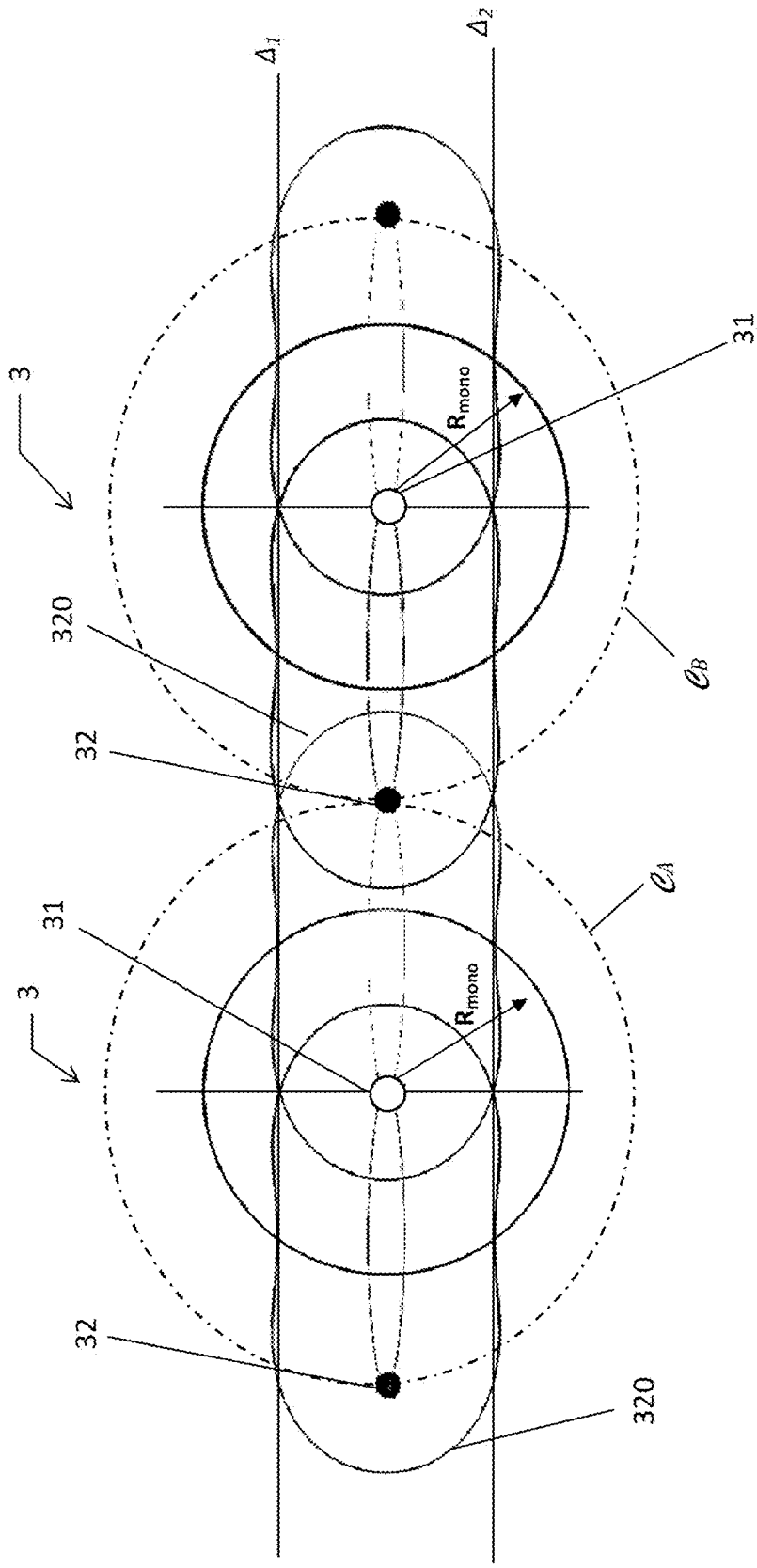
FIG. 19C is a diagram showing two adjacent detection groups forming a simplified barrier, according to another exemplary embodiment.

FIG. 19C is a diagram of a detection system comprising at least two adjacent detection groups generating a barrier (the system may comprise other similar groups that are not shown, the complete barrier of the system in this case being longer), according to one embodiment. Each group comprises 2 receivers and the transmitter of each group shares each of the two receivers with the transmitters of the adjacent groups situated on either side.

Each of the two receivers 32, which are surrounded by transmitters 31 on either side, use the two transmissions to generate a detection area that is identical by symmetry.

The overall detection area formed by the sequence of such adjacent groups may be adapted to the needs of the implementation of the invention by breaking the alignment between the two segments that each join the two receivers of each of the two adjacent groups, thereby making these detection areas revolve around the receiver shared between these two groups.

Such a group configuration allows a detection area that is extended in length, symmetrical about the axis formed by the transmitters and forming a detection area by using additionally a single transmitter and a single receiver for each group. Specifically, in this embodiment, all of the receivers are shared between two transmitters. However, there is no capability of redundancy in such a configuration, which is minimal in terms of hardware and particularly suitable for a piecewise rectangular barrier shape. The blind zones (blanking) are partly covered at the interface area between two groups. As a result, the detection area is virtually gap-free, which is then not a problem in practice, in particular in "RX as TX" mode. The receivers 32 surrounded by transmitters 31 on either side are able to distinguish their respective transmissions, including in the same frequency band, in order to generate detection areas 30 that are identical by symmetry. The detection area may be adapted to the needs of the application of the invention by making it revolve around receivers shared between two transmitters.

More generally, the detection system 100 may comprise groups sharing at least one receiver (called common receiver), the common receivers being able to use the transmissions of one or more transmitters that are close enough and that belong to neighbouring groups and all use the same frequency band and orthogonal signals.

As shown in FIG. 19C, the overall detection area 300, forming a complete and gap-free barrier, therefore has a minimum thickness 2B equal to the distance between the straight lines $\Delta 1$ and $\Delta 2$ and a length that is the distance between the 2 transmitters 31.

The length of the group formed by an transmitter and two receivers is therefore 2R.

Such a configuration guarantees a barrier whose thickness is at least 2B throughout so as to provide a minimum reaction time over a distance 2B>Dmin with $D_{min}$>($V_{menace}/T_{reac}$).

An optimum and simplified piecewise linear barrier may be formed of groups having a barrier length 2R that is as great as possible.

In order that the two points of intersection of the detection areas of the two adjacent groups of FIG. 19C that are furthest from their transmitters form a barrier of thickness 2B at the distance R from their respective transmitters, each of these two points has to belong to the Cassini oval of product $R^2_{mono}$, with the same condition by symmetry:

$$B \cdot \sqrt{B^2 + R^2} = R^2_{mono}$$

By symmetry, the condition is identical at the transmitter for a barrier of thickness 2B.

If the transmitter and the receiver are too far apart from one another, the Cassini ovals tend to shrink in the middle thereof and then separate. The most critical point is therefore in the middle of the segment defined by the transmitter and the receiver and on the straight line $\Delta_1$ so as to provide a barrier thickness 2B at the distance R/2. The distance between this critical point of the straight line $\Delta_1$ and the transmitter, or identically between this critical point of the straight line $\Delta_1$ and the receiver, is therefore:

$$\sqrt{B^2 + R^2/4}$$

To belong to the Cassini oval of product $R^2_{mono}$, the following condition then has to be satisfied:

$$B^2 + R^2/4 = R^2_{mono}$$

Or else: $R^2 = 4R^2_{mono} - 4B^2$

By substituting $R^2$ in the first condition, it is possible to deduce, from the above equations, the double-square equation as the following $X = B^2$:

$$3X^2 - 4XR^2_{mono} + R^4_{mono} = 0$$

This double-square equation admits two solutions, including an unhelpful one corresponding to R=0 and the second one, which is therefore the optimum solution defined by $B_{opt}$ and $R_{opt}$ as follows:

$$B_{opt} = R_{mono}/\sqrt{3} \text{ and } R_{opt} = \sqrt{8/3} R_{mono} \sim 1.63 R_{mono}$$

This optimum solution corresponds to the embodiment of FIG. 19C.

The rectangular surface area S' covered by this simple configuration with 1 transmitter and 2 receivers, arranged in an optimum form so as to form a multistatic barrier, is therefore:

$$S' = 2B_{opt} \cdot 2R_{opt} = 8\frac{\sqrt{2}}{3} R^2_{mono} \sim 3.771\ R^2_{mono}$$

This multistatic barrier thus corresponds, for each group, to the rectangular part S' of its detection surface area, which may be compared to the value $2 \cdot R^2_{mono}$, which is the rectangular part (in this particular case square) of the surface area of a monostatic group of range $R_{mono}$, the monostatic groups being spaced from one another by $R_{mono} \sqrt{2}$:

$$\frac{S'}{2R^2_{mono}} = 1.886$$

The multistatic barrier according to the embodiment of FIG. 19C is formed by a sequence of sets of 1 transmitter/2 receivers, each with 2 receivers shared with the neighbouring groups on either side. As the spacing between the transmitter TX and each receiver RX is equal to $1.6 R_{mono}$, the spacing between two successive transmitters is therefore $3.26\ R_{mono}$. This multistatic barrier is therefore advantageous in terms of surface area by a ratio substantially equal to 1.886 in comparison with a monostatic barrier formed of 1 transmitter/1 receiver that are collocated and spaced by $R_{mono} \sqrt{2}$.

Moreover, the length of the bistatic rectangular barrier per pair TX/RX of $3.26\ R_{mono}$ constitutes a significant advantage in comparison with the spacing $R_{mono}\sqrt{2}$ for a monostatic barrier.

It should be noted that it is possible to space the monostatic sonars so as to have the same minimum barrier thickness $2B_{opt} = 2\ R_{mono}/\sqrt{3}$ as the above optimum multistatic solution. The spacing between monostatic sonars is then:

$$2R_{mono}\sqrt{\frac{2}{3}}$$

and the rectangular surface area that is obtained is:

$$2R_{mono}\sqrt{\frac{2}{3}} \cdot 2R_{mono}/\sqrt{3} = \frac{4}{3}\sqrt{2}\, R_{mon}^2 \sim 1.886\, R_{mono}^2$$

This value is less optimal than the initial monostatic solution of square surface area $2\, R^2_{mono}$ spaced by $R_{mono}\sqrt{2}$ and of identical thickness $R_{mono}\sqrt{2}$.

This last monostatic solution of the same thickness $2B_{opt}=2\, R_{mono}/\sqrt{3}$ as the multistatic solution is very precisely half as good in terms of length and therefore in terms of surface area as the multistatic surface area of FIG. 19C:

$$S' = 2B_{opt} \cdot 2R_{opt} = 8\frac{\sqrt{2}}{3} R_{mono}^2 \sim 3.771\, R_{mono}^2$$

As each multistatic group shares its 2 receivers with its 2 neighbors, this amounts to adding, per group, only 1 transmitter and 1 receiver per multistatic group, that is to say the equivalent in terms of hardware of a monostatic sonar for a double barrier length that is therefore twice as advantageous in multistatic mode for the same barrier thickness.

The arrangement in FIG. 19C, in contrast to the arrangement in FIG. 19B, is not redundant: if an transmitter 31 breaks down, there is a gap in the protective barrier, as is the case for a monostatic barrier.

As is the case for the monostatic barrier, detection in active mode based on the Doppler of the threat may be difficult if the threat passes perpendicular to the barrier at the receiver, as indicated in FIG. 17. Specifically, the radial Doppler is strictly zero on the transmitter/receiver axis (TX/RX axis) and low on either side of this axis. However, the distance to the receiver RX passes through a minimum that promotes detection in passive mode or during non-acoustic operation.

Such a multistatic barrier that is extended in length for slow threats with a low detection index is particularly advantageous when it is useful to also optimize detection of threats with a higher index, as far as possible from the infrastructure, and therefore the fastest threats to be detected. An excessively small spacing between the receivers may then become needless and expensive, and detection of these threats with a higher index at a greater distance from the coast may advantageously be achieved by adding receivers further from the infrastructure 2.

Figure 19D:
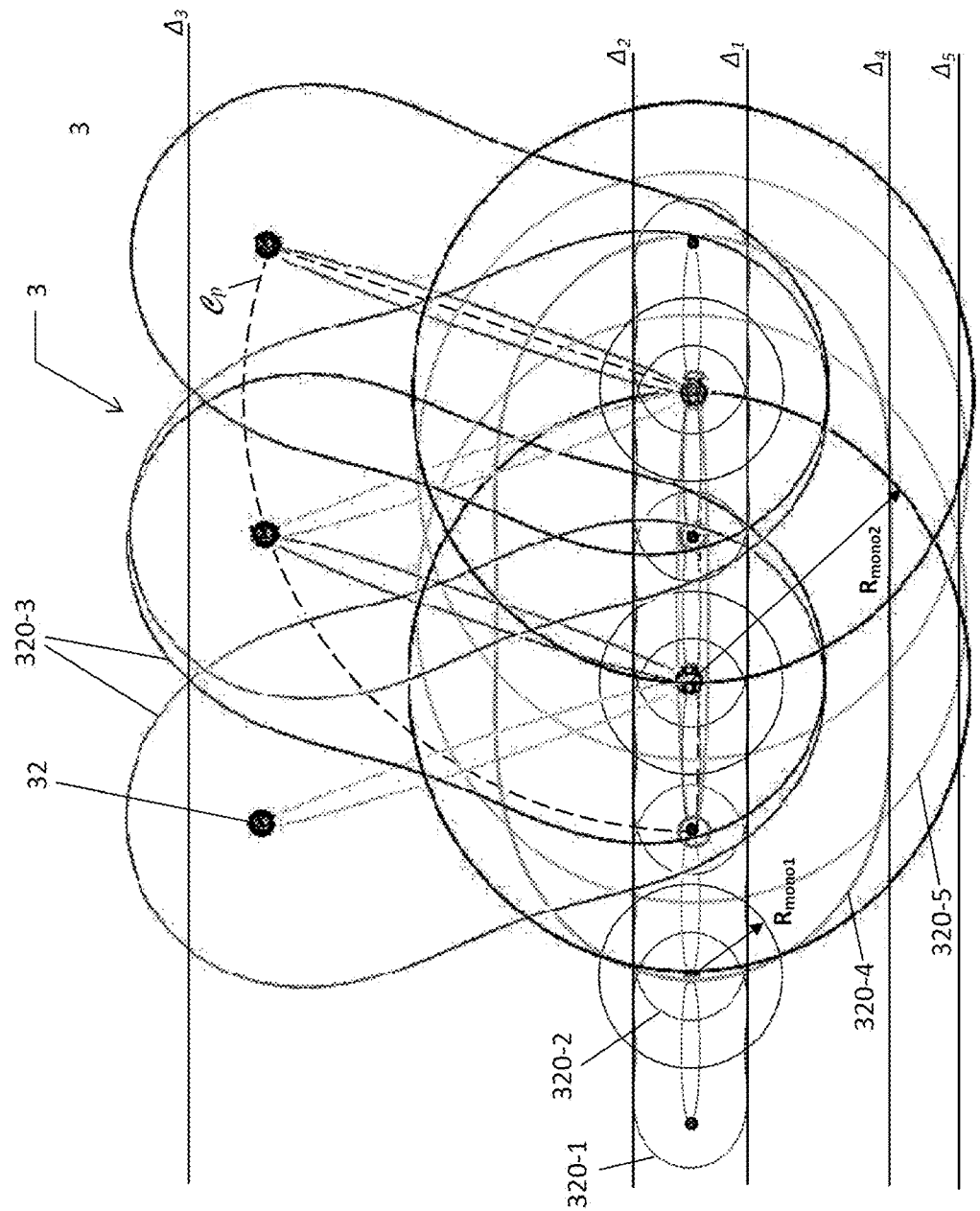
FIG. 19D is a diagram showing a multistatic group comprising two layers arranged so as to detect threats of different indexes, according to one embodiment.

FIG. 19D shows an example of a multilayer detection barrier, comprising a first layer of receivers identical to that of FIG. 19C designed to detect threats with a low index, and a second layer of receivers further from the coast than the first one and formed of receivers shared by at least two groups (such a receiver simultaneously belongs to these two groups), the second layer being designed to detect targets 10 having higher target indexes and located much further away. In this embodiment, the term "layer" makes reference to a set of receivers of the detection system 100, considered in its entirety, the receivers for the most being shared between groups using the transmissions of a plurality of transmitters. Such a set of receivers has geometric distribution characteristics suitable for the shape of the area to be monitored.

Such an arrangement allows the detection system to detect threats of different indexes, which may have different speeds. For example:
- a diver threat may have a very low index, but its average speed without a traction assistance device typically remains of the order of 1 knot;
- a large propulsion device threat for fast transport, a large drone or a mini submarine may have an index of approximately 10 to 20 dB higher and may travel much faster, typically up to approximately 6 knots in the littoral area; such threats have to be detected 6 times further away.

A monostatic system in a shallow environment, at low frequencies, has outward/return losses in $2K \log R_{mono_1}$. Such a monostatic system has a range $R_{mono_2}$ on a higher-index target, the index deviation $\Delta(TS)$ in relation to the initial range $R_{mono_1}$ being such that:

$$2{*}K \log R_{mono_2} = 2{*}K \log R_{mono_1} + \Delta(TS) \qquad (35)$$

For two layers having to satisfy the same coverage constraints for the detection areas as mentioned above (with or without coverage redundancy, with or without a detection gap for example), by applying the above equations defining the spacings $d_{inter}$ between two adjacent receivers and the respective radii R of these two layers, the products $(d_{inter} \cdot R)_1$ and $(d_{inter} \cdot R)_2$ being respectively proportional to $R_{mono_1}$ and $R_{mono_2}$, it becomes:

$$2{*}K \log(R_{mono_2}/R_{mono_1}) = 2{*}K \log(d_{inter} \cdot R)_2/(d_{inter} \cdot R)_1 = \Delta(TS) \qquad (36)$$

Thus, in the embodiments in which the center of the circles described by the concentric layers of a given group coincides substantially with the transmitter, for propagation losses equal to K times the logarithm of the distance of the propagation paths TL, the ratio between the product $d_{inter1}R_1$, of the inter-receiver distance associated with a layer and the radius $R_1$ of this layer and the product $d_{inter2}R_2$ of the inter-receiver distance $d_{inter2}$ associated with another layer and the radius $R_2$ of this other layer may be determined depending on the maximum detection index deviation $\Delta(TS)$ of the possible targets, according to equation (36).

Taking into account the geometry of FIG. 19D, applying equation (36) and considering $d=D(TX,RX)$ to be the distance between each transmitter and a receiver, then the inter-receiver distance $d_{inter1}$ of the first layer satisfies:

$$d_{inter1}=2d \text{ with a radius } R_1=d$$

The inter-receiver distance $d_{inter2}$ of the second layer satisfies:

$$d_{inter2}=2d \text{ with a radius } R_2=3d$$

Considering that the two detection areas associated with the layers of FIG. 19D have the same coverage constraints, and are notably configured without redundancy, it appears directly that the two layers each address, for conventional shallow propagation losses, and for low frequencies at 17 log R, threats having a different index with an index deviation given by:

$$\Delta(TS)=2{*}K \log(d_{inter} \cdot R)_2/(d_{inter} \cdot R)_1 = 34 \log(6/2) = 16.2 \text{ dB}$$

It should be noted in FIG. 19D that the radii $R_{mono_1}$ and $R_{mono_2}$ indeed also differ by a ratio of 3.

The above formula giving the index deviation $\Delta(TS)$ therefore makes it possible to determine the index range of threats that the detection system is able to address on the basis of its geometry or, by contrast, to dimension the geometry of the layers of the detection system according to the range of threats to be detected on the basis of transmitters and receivers having a given performance.

The multilayer multistatic system 100 of FIG. 19D, for its first layer, makes it possible to have detection areas 320-1 and 320-2 for the receiver to the left and to the right of each transmitter 31, respectively, each being close to a hippodrome form that is particularly well-suited to forming a detection barrier situated between the straight lines Δ1 and Δ2, with a coverage area for a given receiver, since each receiver uses the two transmitters around it.

The barrier of the first layer may be particularly suitable for detecting threats with a low index, for example divers, over a virtually constant thickness of approximately $2B_{opt} = 2R_{mono}/\sqrt{3} \sim 1.155\ R_{mono}$ and an advantageous inter-transmitter distance of $2R_{opt} = 2\ \sqrt{8/3}\ R_{mono} \sim 2*1.63\ R_{mono} \sim 3.266\ R_{mono}$ rather than $1.414\ R_{mono}$ in conventional monostatic solutions. This results in a barrier rectangular surface area gain of $3.771R^2_{mono}$ rather than $2R^2_{mono}$ for circles of monostatic systems conventionally $\sqrt{2}$ apart. The above ratio of 1.89 is also satisfied.

In the example of FIG. 19D, each receiver of the second layer is situated, in this example, on an axis perpendicular to the line described by the receivers 32 of the first layer (which also passes through the transmitters 31) and passing substantially through a receiver of the first layer, the transmitter-receiver distance for a receiver of the second layer being three times greater than the transmitter-receiver distance of the first line of receivers. In this example, the receivers of the second layer are dedicated to detecting threats having an index 16.2 dB higher than the index of diver threats (similarly to the embodiment in FIG. 19C), and correspond to threats having an index 16.2 dB higher, therefore to threats provided with larger devices able to travel much faster than a diver without traction assistance.

Each receiver 32 of the second layer is advantageously able to process the transmissions of a plurality of transmitters 31 and is shared between the adjacent groups (i.e. belongs simultaneously to a plurality of adjacent groups), the transmitters of these groups being able to use codes that are orthogonal to one another, thereby allowing the transmitters to use the same frequency band. It should be noted that, in FIG. 19D, only the detection areas 320-3 of this second layer with the 2 transmitters closest to each receiver are shown. By contrast, each transmitter 31 usefully insonifies at least two receivers 32, which, as in this example, may form a reference pair forming a minimum layer for each group, this minimum layer being able to be considered to be linear or partly circular, as indicated by the circular arc $C_P$ in FIG. 19D. The detection area 320-3 of the second layer of receivers are far wider than the areas 320-1 and 320-2 of the first layer and also allow the receivers of this second layer, which are typically situated offshore from the coast 21, also to detect the line formed by the transmitters from the other side (therefore toward the coast).

It should be noted that the best detection of the threats devices, having an index 16.2 dB higher than the indexes of the divers detected in the areas 320-1 and 320-2 between the line of the transmitters and the coast, is achieved with bistatic pairs formed by:

all of the adjacent transmitter/receiver pairs of the first layer, which are therefore situated at a distance $d_{inter1}$; such pairs make it possible to achieve a virtually circular detection area of 320-5 type that is repeated at every interval $d_{inter1}$ and that thus form an effective gap-free detection barrier toward the coast for fast threats, as far as the straight line Δ5, thereby facilitating interception thereof for an appropriate reaction;

all of the transmitter/receiver pairs of the first layer that are separated by a distance $3 \cdot d_{inter1}$; such pairs make it possible to achieve a hippodrome detection area 320-4 that is repeated at every interval $d_{inter1}$ and that forms a highly regular elongate form so as to extend the barrier as far as the straight line Δ4 for targets having higher target indexes.

Between the straight lines Δ3 and Δ5, the detection barrier has a thickness 6 times greater for a target at 6 knots than the detection barrier situated between the straight lines Δ1 and Δ2, while the increase of 16.2 dB for the target index in this example would allow only a range increase in monostatic mode, by definition in accordance with a ratio $R_{mono_2}/R_{mono_1} = 3$ in this example.

This already significant detection index deviation between the two types of threat corresponds to the target index range that is able to be addressed effectively by the detection system in the embodiments in which the detection areas are of the same type, that is to say gap-free and without redundancy for these two threats, and uses two layers of receivers. The threat with a high index is detected continuously in a gap-free manner by a multistatic group by adding 1 transmitter with a single receiver but using 2 shared receivers, over a distance 6 times greater than the distance of FIG. 19C corresponding to the first layer for low indexes with 1 transmitter TX/1 receiver RX per multistatic group.

In total, for two layers tight to threats of indexes that differ by as much as 16.2 dB, 1TX/2RX only is added per group, with a detection range ratio of a factor 6 typically corresponding to their respective speeds, thereby allowing an identical reaction time.

By comparison, a conventional system, that is to say a monostatic system, makes it possible to achieve just a ratio of 3 in terms of range, and the spacing is not able to be adapted simultaneously for both types of threat. The advantage of a multilayer multistatic solution, according to the embodiment of FIG. 19D, is therefore highly significant. In addition, the low frequency makes it possible to contemplate ranges that are limited to a small extent by absorption in practice.

It should be noted that similar properties may be achieved for configurations of the detection system in which each layer is configured so as to detect a target having a minimum given index and in which at least some of the receivers of all of the groups are arranged in at least two main lines of receivers, the adjacent receivers of the first line being separated from one another by a distance $d_{inter_1}$ and the reference transmitter-receiver distance of the first line being denoted by $D_{TRX1}$, the adjacent receivers of at least one other line of receivers being separated from one another by a distance $d_{inter_2}$ and the reference transmitter-receiver distance of this other line being denoted by $D_{TRX2}$, the first line being arranged between the infrastructure and the other line. Specifically, for propagation losses equal to K times the logarithm of the distance of the propagation paths TL, the ratio between the product $d_{inter1} \cdot D_{TRX1}$ corresponding to the first line and the product $d_{inter2} \cdot D_{TRX2}$ of this other line may be determined depending on the maximum detection index deviation Δ(TS) of the possible targets:

$$2K \log((d_{inter_2} \cdot D_{TRX2})/(d_{inter_1} \cdot D_{TRX1})) = \Delta(TS) \qquad (37)$$

Figure 20:
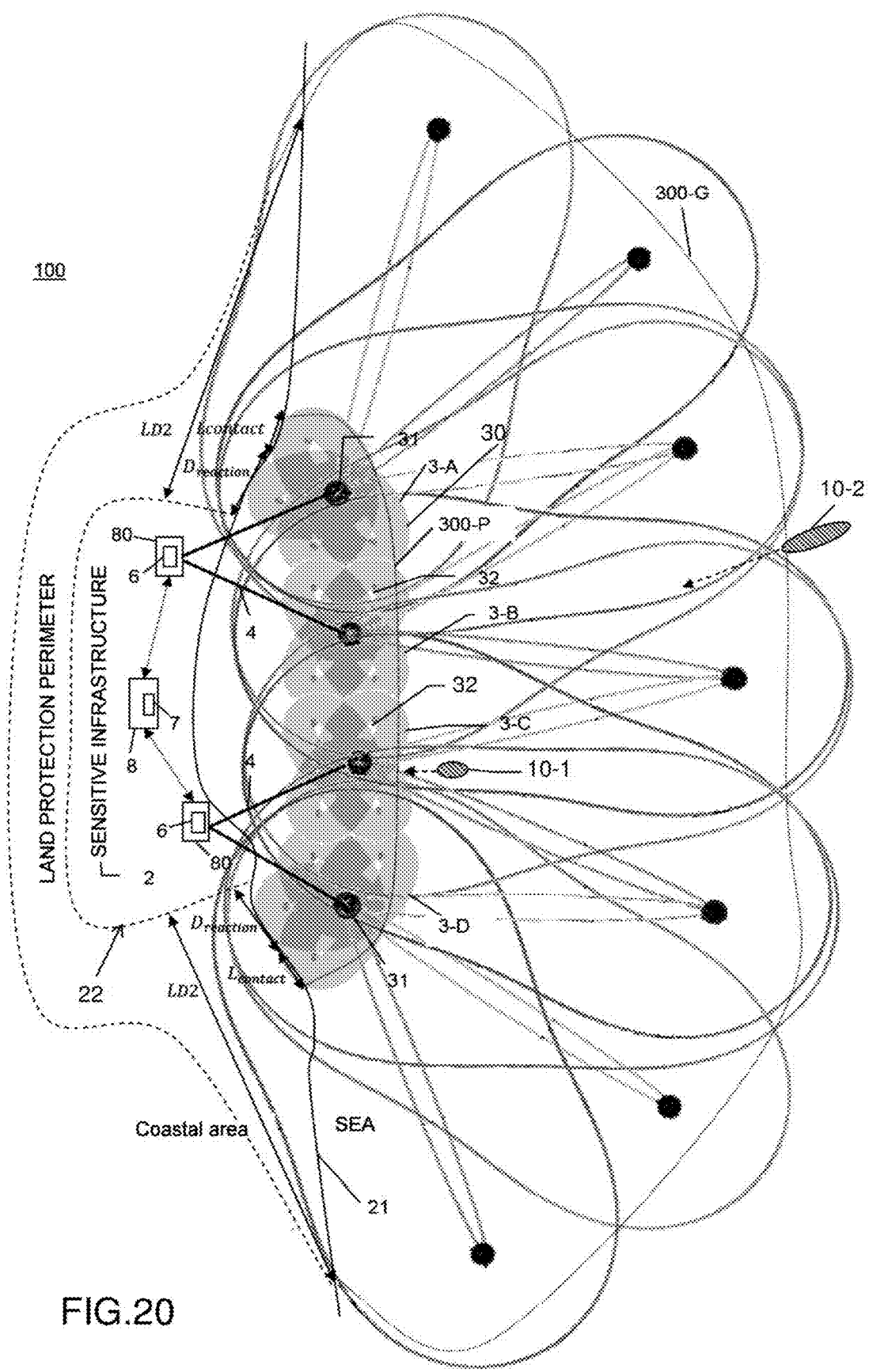
FIG. 20 is a diagram showing a detection system with 4 groups with circular configurations, the system being arranged so as to form two barriers, one of the barriers being formed from the circular groups and the other barrier being formed using receivers shared by the groups.

FIG. 20 shows an example of a multistatic system comprising 4 multistatic groups 3-A, 3-B, 3-C and 3-D, with a circular configuration, which are joined in succession as to form a barrier. The transmitters 31 of the various groups may describe a suitable form protecting the infrastructure.

The number of groups may notably depend on the form of the infrastructure to be protected. The number of receivers per group is equal to 4 in FIG. 20. In the embodiment of FIG. 20, a second layer of receivers is used, this second layer comprising receivers shared by the adjacent groups. Each receiver 32 of the second layer may use the transmissions of a plurality of transmitters. By contrast, each transmitter may usefully insonify at least two equidistant receivers, forming the reference pair of the second layer of the group comprising the transmitter. It may additionally be observed that:

- in the rightmost area of the barrier, a receiver is shared, belonging simultaneously to groups 3-B and 3-C. There are therefore in total only 7 receivers in the second layer, whereas there are 4 groups each actually having a reference pair of receivers equidistant from the associated transmitter;
- some transmitters usefully insonify receivers other than the receivers of the reference pair of their group, these receivers then using the transmissions of at least two transmitters. This is the case for the transmitters closing the barrier on the coast on either side, that is to say 3-D and 3-A.

Similarly to FIG. 19D, FIG. 20 shows the benefit of combining two reception layers per multistatic group, which therefore makes it possible to optimize the detection area for threats having different high detection indexes with the same transmitters.

Such an arrangement of the detection system 100 is advantageous in comparison with the conventional multi-monostatic solution since the spacing between two TX/RX groups is not able to be optimized simultaneously for both types of threats, but leads, for multi-monostatic gap-free detection, at least on one layer, to regular paving of the plane with the minimum spacing necessary for the threat that is the most difficult to detect, which is far more expensive.

As in the embodiment in FIG. 18, a surveillance center 8 may be provided close to the infrastructure and to a land protection perimeter 22, this surveillance center 8 being able to be connected to machine rooms 80.

The detection areas 3-A and 3-D of the outermost groups of the barrier (groups situated toward the furthest points of the coast to be protected) close the barrier and may advantageously make contact with the coast 21 over a length $L_{contact}$ (contact length between the detection area 30 of the end group 3 and the coast for the most difficult threat to detect which is addressed by the first layer) and at a sufficient distance $D_{reaction}$ from the area to be protected 22 (area marked in dashed lines in FIG. 19 and surrounding the infrastructure, the surveillance center 8 and the machine rooms 80), given the speed of this threat in water. In particular, the distance $D_{reaction}$ may advantageously be greater than or equal to the product of the maximum speed of threat and the predefined prior warning time in order to promote an effective reaction to this threat. It should be noted that, in the embodiments using a land protection perimeter, the threat is not able to penetrate close to the sensitive infrastructure 2 to be protected via the coast due to this land protection perimeter.

Similarly, for the largest threat addressed furthest away by the second layer, the surveillance system allows detection at a sufficient distance LD2 from the start of the area to be protected, such that a maximum-speed threat is detected with the same prior warning time as a slow diver threat without traction assistance.

This length may include, besides the distance allowing quick detection on an alert Doppler, a reaction distance 6 times greater than that for the threat that is 6 times slower, thereby allowing an identical reaction time for these two very different threats.

The invention is not limited either to a particular setting of the receivers 32 in a marine environment, or to a particular mode of communication between the receivers 32 and the transmitter 31. The receivers 32 may for example be placed on the floor for a chosen duration and transmit the pre-processed detection results, via cable or via radio.

The invention is not limited either to the surveillance applications mentioned above, and incorporates any type of sensitive area surveillance associated with an infrastructure accessible by water.

For example, the embodiments of the invention may be used to perform surveillance in sensitive areas associated with any type of infrastructure 2 (coastal surveillance, industrial surveillance, surveillance offshore from a platform). The infrastructure 2 may be for example an industrial, tourist, military or civilian infrastructure with a marine front or implementation (for example a military port). The detection system according to the embodiments of the invention is suitable for any type of submerged threat 10, for example underwater threats at a speed higher than a non-motorized diver. The geometric distribution of the receivers of the groups 3 makes it possible to form long barriers, in which the blind areas are highly limited or even absent, and allow the threats 10 to be detected at a distance far enough from the infrastructure 2, thereby allowing a sufficient reaction time.

In an application of the invention using just one multistatic group 3 with a circular configuration, it is possible to perform distributed circular surveillance for the receivers 32, the transmitter 31 being arranged on an oil or gas platform, regardless of the depth of the platform (shallow or deep for example).

In another application of the invention, the detection system 100 may be used as a discrete surveillance system by default, the system 100 triggering the active transmission function only in the event of a passive alert from the distributed low-frequency multistatic barrier of the invention.

The invention lastly applies to any type of sensitive area defined with respect to an infrastructure corresponding to a structure or to a set of structures arranged on land or on a platform or on a boat/partly or completely submerged, regardless of its dimensions and its configuration.

The invention claimed is:

1. An acoustic detection system for detecting at least partly submerged targets in a sensitive area defined with respect to an infrastructure, wherein the system comprises at least one multistatic detection group, each multistatic detection group defining a detection area, and comprising:
   - a submerged transmitter emitting at low frequencies;
   - a plurality of submerged receivers comprising at least two receivers, each receiver of a given group forming, with the transmitter of said group, a bistatic pair, each bistatic pair generating an elementary detection area surrounding a blanking zone, the blanking zone being associated with a bistatic pair corresponding to a non-detection area, the detection area of said group being formed by all of the elementary detection areas of said receivers of the group, said receivers being arranged in at least one layer,
   wherein the blanking zone around each receiver in a given detection group being at least partly covered by the elementary detection areas of the two neighboring receivers of the detection system, and wherein, for at least one group of the system, the form described by the receivers of at least one layer of the group is an at least partly circular form of given radius, the inter-receiver distance between two adjacent receivers of said layer depending on a reference transmitter-receiver distance D, said reference transmitter-receiver distance D representing a distance from the transmitter of the group to the rectilinear segment linking said two adjacent receivers of the layer.

2. The detection system as claimed in claim 1, wherein the at least partly circular form described by at least one layer of receivers formed of at least two receivers is centered substantially on the transmitter, and in that the receivers of said layer have at least one axis of symmetry passing through the transmitter.

3. The system as claimed in claim 1, wherein the product $R \cdot d_{inter}$ of the inter-receiver distance $d_{inter}$ between two adjacent receivers of said layer and the radius R of the form described by the receivers of said layer is greater than or equal to the square $R_{mono}^2$ of the detection radius $R_{mono}$ of the equivalent monostatic sonar for a target of minimum given index:

$$R_{mono}^2 \leq R \cdot d_{inter}.$$

4. The system as claimed in claim 1, wherein the inter-receiver distance $d_{inter}$ between two adjacent receivers of said layer by the radius R of the form described by the receivers of said layer is less than or equal to double the square of the detection radius $R_{mono}$ of the equivalent monostatic sonar $2 \cdot R_{mono}^2$ divided by the distance D from the transmitter to the rectilinear segment formed by said two adjacent receivers, for a target of minimum given index:

$$d_{inter} \leq 2 \cdot R_{mono}^2 / D.$$

5. The system as claimed in claim 1, wherein it comprises at least one group, the receivers of said layer of the group, of at least partly circular form, being arranged on a circle of radius R equal to the detection radius $R_{mono}$ of an equivalent monostatic sonar for a target of minimum given index, said layer of the group comprising 6 receivers forming a regular hexagon with a side equal to the radius of the circle, the maximum multistatic range from the transmitter being equal to the product of the radius of said circle R and the golden ratio, and in that, for any target having the minimum given index and situated inside this circle, the target is detected by at least two receivers.

6. The detection system as claimed in claim 1, wherein each receiver is configured so as to receive signals in a frequency band lower than 30 kHz.

7. The detection system as claimed in claim 1, wherein it comprises at least two groups, and in that the elementary detection areas of at least some of the end receivers of a given detection group at least partly overlap with the end receivers of an adjacent detection group.

8. The detection system as claimed in claim 7, wherein it comprises at least one shared common receiver belonging simultaneously to at least two adjacent groups.

9. The detection system as claimed in claim 1, wherein it comprises at least one sensor chosen from among the group consisting of a magnetic sensor, an acoustic sensor, a non-acoustic sensor, and in that it comprises a classification unit configured so as to use information derived from the signals of the sensor or sensors to classify the target.

10. The detection system as claimed in claim 9, wherein the signals of at least some of the receivers are used by said classification unit to classify the detected targets, and in that each receiver is configured so as to operate at least acoustically simultaneously in passive and active mode, each receiver in passive mode processing frequencies lower than the frequencies processed in active mode, a passive acoustic classification being performed by slaving the active tracking, the acoustic or non-acoustic range being at least equal to half the maximum distance between two neighboring receivers, so as to perform classification at least when the target passes between them.

11. The detection system as claimed in claim 1, wherein it comprises at least one group having at least two layers of receivers, the receiver layers being arranged at different reference transmitter-receiver distances D.

12. The detection system as claimed in claim 11, wherein it comprises layers of receivers that are linear or at least partly circular and concentric, the linear layers comprising receivers aligned substantially in a line, some receivers being shared between two groups.

13. The system as claimed in claim 12, wherein the center of the circles described by the concentric layers of a given group coincides substantially with the transmitter, and in that, for propagation losses equal to K times the logarithm of the distance of the propagation paths TL, the ratio between the product $d_{inter1} R_1$ of the inter-receiver distance associated with a layer and the radius $R_1$ of this layer and the product $d_{inter2} R_2$ of the inter-receiver distance $d_{inter2}$ associated with another layer and the radius $R_2$ of this other layer is determined according to the maximum detection index deviation $\Delta(TS)$ of the possible targets:

$$2K \log((d_{inter2} \cdot R_2)/(d_{inter1} \cdot R_1)) = \Delta(TS).$$

14. The detection system as claimed in claim 1, wherein it comprises at least one multistatic group, and in that the transmitter of the group is a low-frequency transmitter, of hull sonar of a surface ship type, the receivers being positioned around the surface ship and communicating with the surface ship in radio mode.

15. The detection system as claimed in claim 1, wherein it comprises a group whose transmitter is not omnidirectional, and in that, in order to determine the positioning of each receiver $RX_i$, the detection radius of the equivalent monostatic sonar is a function of the angle $\theta i$ denoting the angle of insonification of the transmitter toward said receiver $RX_i$ with respect to the direction of maximum transmission of the transmitter.

* * * * *